United States Patent Office 3,189,604
Patented June 15, 1965

3,189,604
6-FLUOROMETHYL STEROID COMPOUNDS AND PROCESS
Philip F. Beal III and John E. Pike, Kalamazoo, Mich., assignors to The Upjohn Company, Kalamazoo, Mich., a corporation of Delaware
No Drawing. Filed June 16, 1960, Ser. No. 36,471
19 Claims. (Cl. 260—239.55)

This application is a continuation-in-part of our copending application Serial No. 1,421 filed January 11, 1960, now abandoned.

This invention relates to certain novel steroids, more particularly to 6α-fluoromethyl-11β,17α,21-trihydroxy-4-pregnene-3,20-dione, 6α-fluoromethyl-17α,21-dihydroxy-4-pregnene-3,11,20-trione, 6α-fluoromethyl-11β,17α,21-trihydroxy-1,4-pregnadiene - 3,20 - dione, 6α-fluoromethyl-17α,21-dihydroxy-1,4-pregnadiene - 3,11,20 - trione. 6-fluoromethyl - 11β,17α,21 - trihydroxy-4,6-pregnadiene-3,20-dione, 6-fluoromethyl-17α,21-dihydroxy-4,6-pregnadiene-3,11,20-trione, 6 - fluoromethyl - 11β,17α,21 - trihydroxy-1,4,6-pregnatriene-3,20-dione, 6-fluoromethyl-17α,21-dihydroxy-1,4,6-pregnatriene-3,11,20-trione, the 9α-halo, especially the 9α-fluoro, compounds corresponding otherwise thereto, 21-esters of each, the corresponding 21-fluoro and 21-desoxy compounds including the 17-acylates thereof, and intermediates in the production thereof. It further relates to the 2α-alkyl, 16α-alkyl, 16β-alkyl, 16α-hydroxy and 16α-acyloxy derivatives of these compounds, and in those compounds wherein the 16-substituent is α-hydroxy, to the 16α,17α-acetonides thereof.

The novel compounds of this invention and a process for their production can be illustrated by the following formulae:

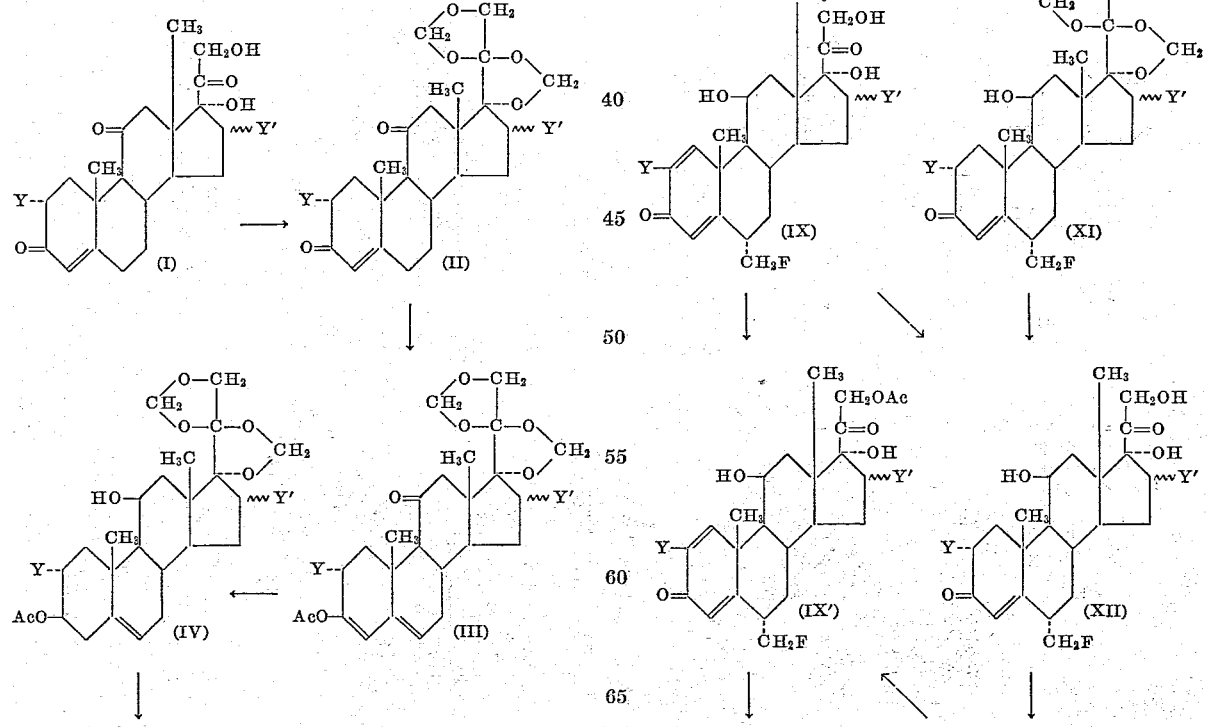

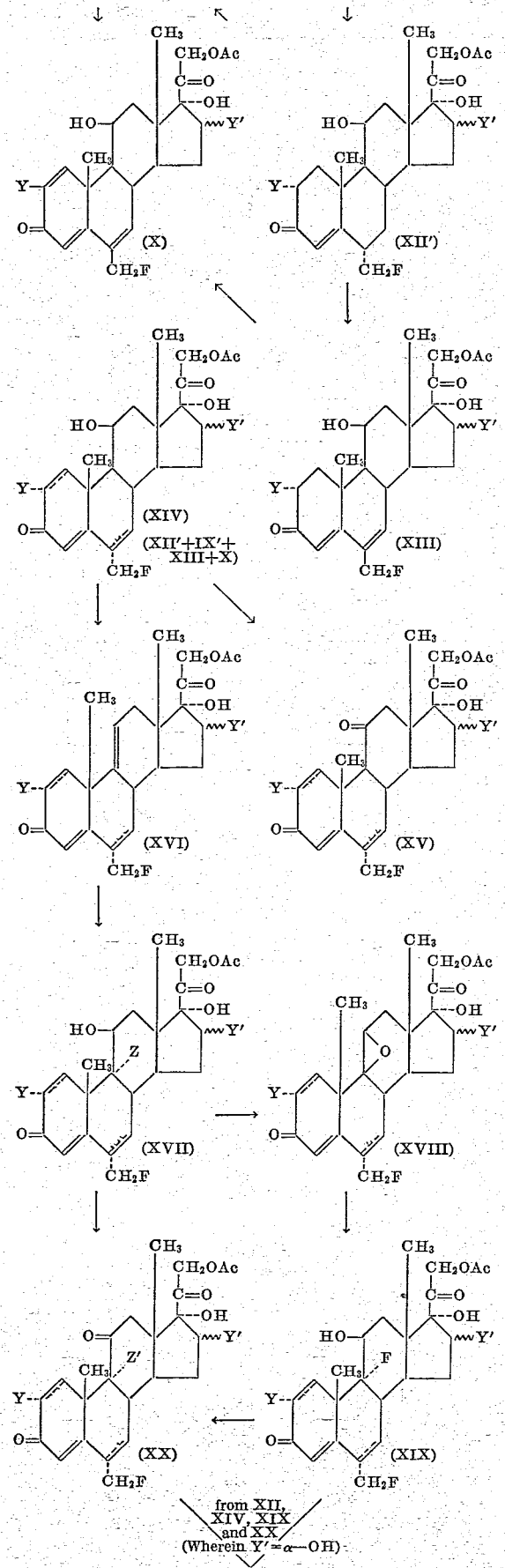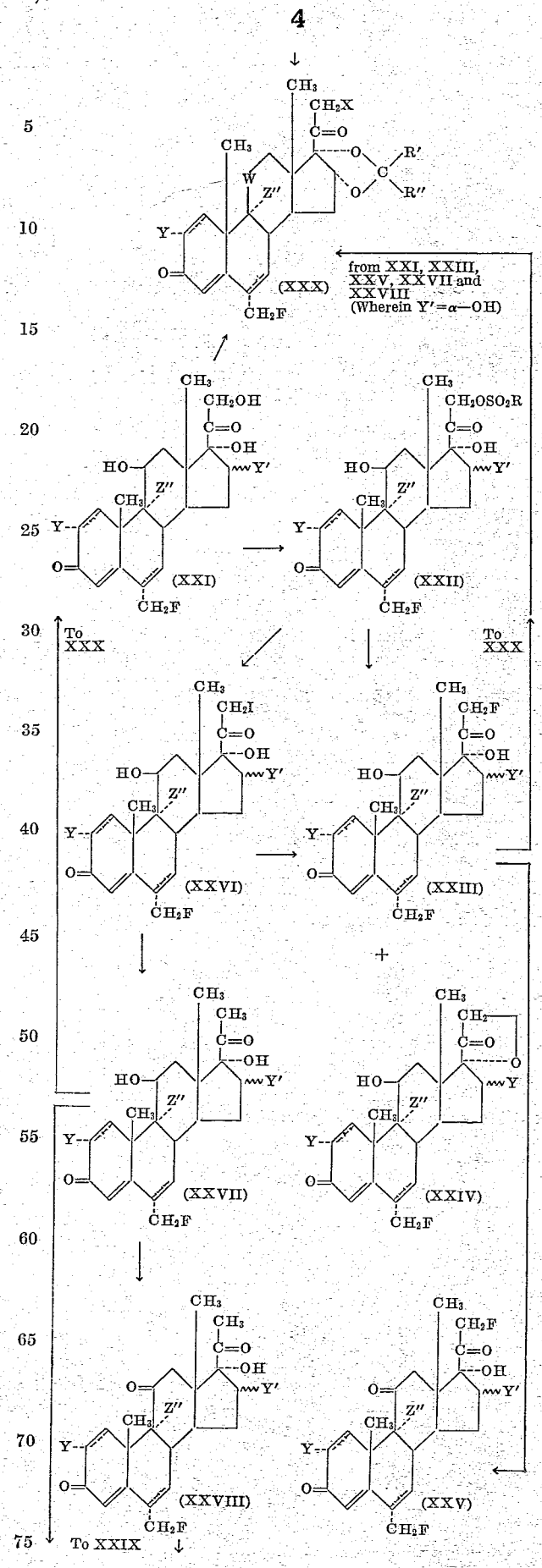

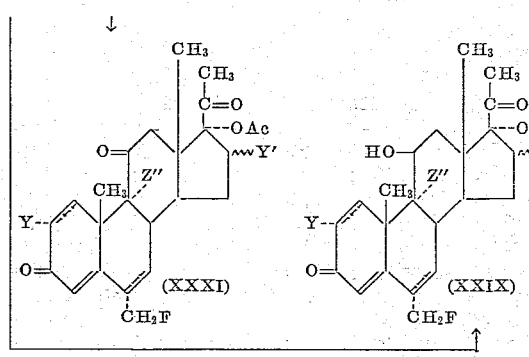

wherein Ac is the acyl radical of a hydrocarbon carboxylic acid containing from 1 to 12 carbon atoms, inclusive; R is an organic (alkyl or aryl) radical containing up to and including 10 carbon atoms; R' and R" are selected from the group consisting of hydrogen, a lower-alkyl radical, a monocyclic aromatic radical, a monocyclic aromatic lower-alkyl radical, a monocyclic heterocyclic radical, and a monocyclic heterocyclic lower-alkyl radical; R' and R" when taken together are alkylene; W is selected from the group consisting of the carbonyl radical (>C=O) and the β-hydroxy-methylene radical

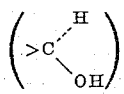

X is selected from the group consisting of hydrogen, hydroxy, acyloxy and fluorine; Y is selected from the group consisting of hydrogen and methyl; Y' in Formulae I to XII is selected from the group consisting of hydrogen, α-methyl, and β-methyl; Y' in Formulae XII to XXXI is selected from the group consisting of hydrogen, α-methyl, β-methyl, and α-hydroxy; Z is a halogen having an atomic weight from 35 to 127, inclusive, i.e., chlorine, bromide or iodine; Z' is a halogen having an atomic weight from 19 to 127, inclusive, i.e., fluorine, chlorine, bromine, or iodine; Z" is hydrogen, fluorine or chlorine. The broken lines appearing inside the rings in Formulae XIV to XXXI indicate $\Delta^1$- and $\Delta^6$-double bonds which may or may not be present and represent $\Delta^4, \Delta^{1,4}, \Delta^{4,6}$, and $\Delta^{1,4,6}$-compounds.

As used in this application, the Roman numeral following the name of a compound (or compounds) indicates the relation of the compound (or compounds) to the reaction scheme depicted above.

The novel compounds of this invention, 6α-fluoromethyl-11β,17α,21-trihydroxy-4-pregnene-3,20 - dione, 6α-fluoromethyl - 17α,21 - dihydroxy-4-pregnene-3,11,20-trione, 6α-fluoromethyl - 11β,17α,21 - trihydroxy-1,4-pregnadiene-3,20-dione, 6α-fluoromethyl - 17α,21 - dihydroxy-1,4-pregnadiene-3,11,20-trione, 6-fluoromethyl - 11β,17α, 21 - trihydroxy - 4,6 - pregnadiene - 3,20 - dione, 6 - fluoromethyl-17α,21-dihydroxy - 4,6 - pregnadiene-3,11,20-trione, 6 - fluoromethyl - 11β,17α,21 - trihydroxy - 1,4,6-pregnatriene-3,20-dione, 6 - fluoromethyl - 17α,21 - dihydroxy-1,4,6-pregnatriene-3,11,20-trione, the 9α - halo, especially the 9α-fluoro, compounds corresponding otherwise thereto, 21-esters of each, the corresponding 21-fluoro-and 21-desoxy compounds, including the 17-acylates thereof, the 2α-alkyl, 16α-alkyl, 16β-alkyl, 16α-hydroxy and 16α-acyloxy derivatives of these compounds and in those compounds wherein the 16-substituent is α-hydroxy, the 16α,17α-acetonides thereof, are highly potent cortical hormones having anti-inflammatory, salt and water regulating, pituitary inhibiting, progestational and anti-anabolic activities with improved ratio of therapeutic activity to undesirable side-effects, e.g., gastrointestinal disturbances, edema, etc., known to exist with similar known physiologically active steroid compounds. Many of the higher molecular weight esters, particularly those resistant to hydrolysis and/or more insoluble in body fluids, provide compounds having more prolonged activity than the corresponding 21-hydroxy compounds. The above-named compounds are useful in the treatment of various inflammatory conditions of the skin, eyes, respiratory tract and the bones and internal organs due to bacterial or viral infections, contact dermatitis and allergic reactions, rheumatoid arthritis, and possess improved therapeutic ratios of anti-inflammatory activity to undesirable side-effects, compared to the corresponding compounds lacking the 6α-fluoromethyl group. For this purpose the compounds of this invention may be incorporated and administered to mammals, birds and animals, in the various ointments, creams, lotions, sprays, tablets, suspensions and solutions for systemic and/or topical application well known in the art. They may be combined with the known antibiotics, especially the penicillins, neomycin, tetracycline, chloromycetin, and novobiocin and with anti-fungal agents, such as griseofulvin.

Other compounds of this invention, as well as being useful as intermediates in the production of the above-described compounds also possess useful physiological activity. The compounds represented by Formulae XVI, XVII and XVIII of the flow-sheet set forth above possess progestational, glucocorticoid, mineralocorticoid, and anti-inflammatory activity. The compounds represented by Formulae II, III, IV, V, VI, VII, VIII and XI exhibit diuretic activity.

The compounds represented by Formula XXIV, e.g., 6α - fluoromethyl - 11β - hydroxy - 17α,21 - epoxy - 4-pregnene - 3,20 - dione, 6α - fluoromethyl - 11β - hydroxy-17α,21 - epoxy - 9α - fluoro - 1,4 - pregnadiene - 3,20-dione and 6 - fluoromethyl - 11β,16α - dihydroxy - 17α, 21 - epoxy - 9α - fluoro - 1,4,6 - pregnatriene - 3,20 - dione are formed as by-products during the synthesis of the closely related 21-fluoro-17α-hydroxy compounds embraced by Formula XXIII, e.g., 6α-fluoromethyl-11β,17α-dihydroxy - 21 - fluoro - 4 -pregnene - 3,20 - dione, 6α-fluoromethyl - 11β,17α - dihydroxy - 9α,21 - difluoro - 1,4-pregnadiene - 3,20 - dione and 6 - fluoromethyl - 11β,16α, 17α - trihydroxy - 9α,21 - difluoro - 1,4,6 - pregnatriene-3,20-dione. The 17α,21-epoxy compounds of Formula XXIV possess marked diuretic activity.

The novel compounds of the present invention are prepared from the known cortisone (or the 2α-methyl, 16α-methyl, and 16β-methyl derivatives thereof) (I) by the following reactions: The 17α,21-dihydroxy-20-keto steroids (I) are converted by treatment with formaldehyde in the presence of a strong acid (hydrochloric, perchloric, sulfuric and the like acids) to the corresponding 17:20, 20:21 - bismethylenedioxy - 4 -pregnene - 3,11-dione (II).

The next step of the process of this invention involves enol acylation of 17:20, 20:21-bismethylenedioxy-4-pregnene-3,11-dione (II) with an alkenyl acylate in the presence of an acid catalyst, e.g., isopropenyl acetate in the presence of p-toluenesulfonic acid, or other enol acylating agent, to produce a 17:20, 20:21-bismethylenedioxy-3,5-pregnadien-11-one 3-acylate (III). Reacting the thus produced 17:20, 20:21-bismethylenedioxy-3,5-pregnadien-11-one 3-acylate (III) with sodium borohydride or other appropriate reducing agent followed by reacylation yields a 17:20, 20:21-bismethylenedioxy-5-pregnene-3β,11β-dihydroxy 3-acylate (IV).

The next step of this invention comprises hydroxymethylating the thus obtained 17:20, 20:21-bismethylenedioxy-5-pregnene-3β,11β-diol 3-acylate (IV) at the 6-position by reacting the compound under conventional "oxo" reaction conditions with carbon monoxide and hydrogen under superatmospheric pressure to produce 17:20, 20:21 - bismethylenedioxy - 6α - hydroxymethyl - 5α-pregnane-3β,11β-diol 3-acylate (V).

The next step of the process of this invention involves the reaction of the thus produced 17:20, 20:21-bismethylenedioxy - 6α - hydroxymethyl - 5α - pregnane - 3β, 11β-diol 3-acylate (V) under conventional tosylating conditions with an organic sulfonyl halide, e.g., p-toluenesulfonyl chloride, to yield the corresponding tosyloxymethyl derivative, then displacing the tosyloxy group by means of an alkali metal fluoride, e.g., anhydrous potassium fluoride, to yield, after alkaline hydrolysis, 17:20, 20:21 - bismethylenedioxy - 6α - fluoromethyl - 5α - pregnane-3β,11β-diol (VI).

The next step of the process is an oxidation employing conventional Oppenauer conditions in which the 17:20, 20:21 - bismethylenedioxy - 6α - fluoromethyl - 5α-pregnane-3β,11β-diol (VI) is reacted with an aluminum alkoxide, e.g., aluminum isopropoxide in the presence of a ketone, e.g., acetone or cyclohexanone, to give the corresponding 17:20, 20:21 - bismethylenedioxy - 6α - fluoromethyl-11β-hydroxy-5α-pregnan-3-one (VII).

The thus-produced 17:20, 20:21-bismethylenedioxy-6α-fluoromethyl-11β-hydroxy-5α-pregnan-3-one (VII) can be converted to 6α-fluoromethyl-11β,17α,21-trihydroxy-4-pregnene-3,20-dione (XII) via two different routes. (1) Dehydrogenating 17:20, 20:21-bismethylenedioxy-6α-fluoromethyl-11β-hydroxy-5α-pregnan-3-one (VII) in the 1,2- and 4,5-positions by means of selenium dioxide gives the corresponding 17:20, 20:21-bismethylenedioxy - 6α - fluoromethyl - 11β - hydroxy - 1,4 - pregnadien-3-one (VIII); hydrolyzing the thus-produced 17:20, 20:21 - bismethylenedioxy - 11β - hydroxy - 1,4 - pregnadien-3-one (VIII) with formic acid to obtain the corresponding 6α - fluoromethyl - 11β,17α,21 - trihydroxy-1,4-pregnadien-3,20-dione (IX) and hydrogenating at the 1,2-position the thus-produced 6α-fluoromethyl-11β, 17α,21 - trihydroxy - 1,4 - pregnadiene - 3,20 - dione (IX) by subjecting the said compound to fermentation with a microorganism chosen from the group consisting of ATCC 6947 (Arthrobactertumescens); NRRL B-1332; ATCC 3352 (S. olivaceous); ATCC 3313 (S. cellulosae) to produce the corresponding 6α-fluoromethyl-11β,17α, 21-trihydroxy-4-pregnene-3,20-dione (XII). (2) Alternatively, halogenating 17:20,20:21-bismethylenedioxy-6α-fluoromethyl-11β-hydroxy-5α-pregnan-3-one (VII) in an acidic medium with bromine and dehydrohalogenating the thus-obtained product with sodium iodide produces 17:20,20:21 - bismethylene - 6α - fluoromethyl-11β-hydroxy-4-pregnen-3-one (XI). When the halogen employed is bromine it is convenient to acidify the reaction medium with hydrogen bromide. Hydrolyzing the thus obtained 17:20,20:21-bismethylenedioxy-6α-fluoromethyl-11β-hydroxy-4-pregnen-3-one (XI) with formic acid or other strong acid produces 6α-fluoromethyl-11β, 17α,21-trihydroxy-4-pregnene-3,20-dione (XII).

6α - fluoromethyl - 11β,17α,21 - trihydroxy - 4 - pregnene-3,20-dione (XII) and 6α-fluoromethyl-11β,17α,21-trihydroxy-1,4-pregnadiene-3,20-dione (IX) or their 21-acylates (XII′ and IX′), preferably the 21-acetates, can be converted to a number of physiologically active steroids as will be described. For example, 6α-fluoromethyl - 11β,17α,21 - trihydroxy - 4 - pregnene - 3,20-dione 21-acylate (XII′) can be dehydrogenated in the 1,2-position with selenium dioxide or a fungus capable of dehydrogenating at the 1,2-position under conventional 1-dehydrogenation conditions without otherwise degrading the steroid nucleus, e.g., of the genus Septomyxa, to produce 6α-fluoromethyl-11β,17α,21-trihydroxy-1,4-pregnadiene-3,20-dione (IX). This compound, in turn, can be esterified to produce its 21-esters (IX′) according to methods known in the art. 6α-fluoromethyl-11β, 17α,21 - trihydroxy - 4 - pregnene - 3,20 - dione 21-acylate (XII′) can also be converted directly to its 6-dehydro analogue, 6-fluoromethyl-11β,17α,21-trihydroxy-4,6-pregnadiene-3,20-dione 21-acylate (XIII), by heating under reflux with chloranil. The thus-obtained 6-fluoromethyl - 11β,17α,21 - trihydroxy - 4,6 - pregnadiene-3,20-dione 21-acylate (XIII) can be dehydrogenated at the 1,2-position with selenium dioxide or a fungus of the genus Septomyxa to give 6-fluoromethyl-11β,17α,21-trihydroxy-1,4,6-pregnatriene-3,20-dione. This compound can be esterified to produce its 21-esters (X) by following 21-acylation procedures known in the art. 6-fluoromethyl - 11β,17α,21 - trihydroxy - 1,4,6 - pregnatriene-3,20-dione 21-acylate (X) can also be produced directly by heating under reflux with chloranil the corresponding 1,4-pregnadiene compound, 6α-fluoromethyl-11β,17α,21-trihydroxy-1,4-pregnadiene-3,20-dione 21-acylate (IX′).

6α - fluoromethyl - 11β,17α,21 - trihydroxy-4-pregnene-3,20-dione 21-acylate (XII′), 6α-fluoromethyl-11β,17α,21-trihydroxy-1,4-pregnadiene-3,20-dione 21-acylate (IX′), 6 - fluoromethyl - 11β,17α,21-trihydroxy-4,6-pregnadiene-3,20-dione 21-acylate (XIII) and 6-fluoromethyl-11β,17α, 21 - trihydroxy - 1,4,6-pregnatriene-3,20-dione 21-acylate (X), represented collectively by Formula XIV, can be oxidized with a N-haloamide or N-haloimide, e.g., N-bromoacetamide in pyridine or like amine, or with chromic acid or sodium dichromate, according to methods known in the art, to produce the corresponding 11-keto compounds (XV) which, in turn can be hydrolyzed in the manner known in the art to produce the corresponding 21-hydroxy compounds.

The 9α-halo compounds of the present invention are prepared in the manner disclosed in U.S. Patent 2,852,511 as follows: dehydrating a 6α-fluoromethyl-11β,17α,21-trihydroxy-4-pregnene-3,20-dione 21-acylate (XIV) or the corresponding 1-dehydro, 6-dehydro and 1,6-bisdehydro analogues thereof with an N-haloamide in pyridine followed by anhydrous sulfur dioxide, produces 6α-fluoromethyl-17α,21 - dihydroxy - 4,9(11) - pregnadiene-3,20-dione 21-acylate (XVI) or the corresponding 1-dehydro, 6-dehydro and 1,6-bisdehydro analogues thereof. Addition of a hypohalous acid, i.e., hypochlorous, hypoiodous or hypobromous acid, to these latter compounds produces the corresponding 6α - fluoromethyl - 11β,17α,21 - trihydroxy-9α-halo-4-pregnene-3,20-dione 21-acylate, 6α-fluoromethyl - 11β,17α,21-trihydroxy - 9α-halo-1,4-pregnadiene-3,20-dione 21-acylate, 6α-fluoromethyl-11β,17α,21-trihydroxy-9α-halo-4,6-pregnadiene-3,20-dione 21-acylate and 6-fluoromethyl - 11β,17α,21 - trihydroxy - 9α-halo-1,4,6-pregnatriene-3,20-dione 21-acylate, respectively (XVII), which by treatment with a base, e.g., anhydrous potassium acetate, yields the corresponding epoxy compounds (XVIII), i.e., 6α-fluoromethyl-9β,11β-epoxy-17α,21-dihydroxy-4-pregnene-3,20-dione 21-acylate, 6α-fluoromethyl-9β,11β - epoxy - 17α,21 - dihydroxy-1,4-pregnadiene-3,20-dione 21-acylate, 6-fluoromethyl-9β,11β-epoxy-17α,21-dihydroxy-4,6-pregnadiene-3,20-dione 21-acylate and 6-fluoromethyl - 9β,11β - epoxy-17α,21-dihydroxy-1,4,6-pregnatriene-3,20-dione 21-acylate, respectively. Treatment of these epoxy compounds with hydrogen fluoride or other hydrogen fluoride releasing agents produces 6α-fluoromethyl - 11β,17α,21-trihydroxy-9α-fluoro-4-pregnene-3,20-dione 21-acylate, 6α-fluoromethyl-11β,17α,21-trihydroxy-9α-fluoro-1,4-pregnadiene-3,20-dione 21-acylate, 6-fluoromethyl - 11β,17α21 - trihydroxy - 9α - fluoro-4,6-pregnadiene-3,20-dione 21-acylate and 6-fluoromethyl-11β,17α,21-trihydroxy - 9α - fluoro - 1,4,6-pregnatriene-3,20-dione 21-acylate, respectively (XIX). Oxidation of these latter compounds, preferably the 21-acetate, with chromic acid in acetic acid provides 6α-fluoromethyl-17α,21-dihydroxy-9α-fluoro-4-pregnene-3,11,20-trione 21-acylate, 6α-fluoromethyl - 17α,21 - dihydroxy - 9α - fluoro-1,4-pregnadiene-3,11,20 - trione 21-acylate, 6-fluoromethyl-17α,21-dihydroxy - 9α - fluoro-4,6-pregnadiene-3,11,20-trione 21-acylate and 6-fluoromethyl-17α,21-dihydroxy-1,4,6-pregnatriene-3,11,20-trione 21-acylate, respectively (XX). Hydrolysis of the esters represented by Formula XX with a base by conventional means, e.g., aqueous sodium hydroxide or sodium bicarbonate, provides the free alcohols 6α-fluoromethyl - 17α,21 - dihydroxy-9α-fluoro-4-pregnene-3,11,20-trione, 6α - fluoromethyl - 17α,21-dihydroxy-9α-fluoro-1,4-pregnadiene - 3,11,20-trione, 6-fluoromethyl-17α,21-dihydroxy - 9α - fluoro - 4,6-pregnadiene-3,11,20-trione and 6 - fluoromethyl-17α,21-dihydroxy-9α-fluoro-1,4,6-pregnatriene-3,11,20-trione and the remaining compounds represented collectively by XX.

The esters of XIX are similarly hydrolyzed to the corresponding 21-hydroxy compounds.

The 6α-fluoromethyl-21-fluoro compounds of this invention are prepared by treating 6α-fluoromethyl-11β,17α,21-trihydroxy-4-pregnene-3,20-dione and the additional compounds represented by Formula XXI or the corresponding 11-keto compounds, with an organic sulfonyl halide such as methanesulfonyl chloride, toluenesulfonyl bromide, benzenesulfonyl chloride, naphthalenesulfonyl chloride, or the like, in the manner disclosed in U.S. Patent 2,838,543 to obtain the corresponding 21-sulfonate ester (XXII), e.g., 6α-fluoromethyl-11β,17α,21-trihydroxy-4-pregnene-3,20-dione 21-methanesulfonate or 21-p-toluenesulfonate; treating the thus-produced 21-alkyl or aryl sulfonates with sodium iodide in acetone solution to obtain the corresponding 21-iodo compounds (XXVI), e.g., 6α-fluoromethyl - 11β,17α - dihydroxy - 21-iodo-4-pregnene-3,20-dione and 6α-fluoromethyl-11β,17α-dihydroxy-21-iodo-9α-fluoro-1,4-pregnadiene-3,20-dione; treating the thus obtained 21-iodo compounds with silver fluoride, preferably in acetonitrile solution, to obtain the corresponding 21-fluoro compounds embraced by Formula XXIII, e.g., 6α-fluoro - 11β,17α - dihydroxy-21-fluoro-4-pregnene-3,20-dione, 6α - fluoromethyl-11β,17α-dihydroxy-9α,21-difluoro-1,4-pregnadiene-3,20-dione and 6-fluoromethyl-2-methyl-11β,17α-dihydroxy-9α-chloro-21-fluoro-1,4,6-pregnatriene-3,20-dione; and if desired, oxidizing the thus obtained 21-fluoro compounds with chromic anhydride, N-bromoacetamide, N-bromosuccinimide, or the like, to give the corresponding 11-keto compounds (XXV), e.g., 6α-fluoromethyl - 17α-hydroxy-21-fluoro-4-pregnene-3,11,20-trione, 6α - fluoromethyl - 17α - hydroxy-9α,21-difluoro-1,4-pregnadiene-3,11,20-trione and 6-fluoromethyl-2-methyl-17α-hydroxy - 9α - chloro - 21-fluoro-1,4,6-pregnatriene-3,11,20-trione. Alternatively, the 21-sulfonates (XXII) preferably the 21-methanesulfonates, can be treated directly with potassium fluoride in dimethyl sulfoxide, e.g., at 100° C. for a period of 18 hours or longer, to produce directly the 6α-fluoromethyl-21-fluoro compounds (XXIII) in addition to minor amounts of the 6α-fluoromethyl-17α,21-epoxy compounds (XXIV), e.g., 6α-fluoromethyl-11β,17α-dihydroxy-21-fluoro-4-pregnene-3,20-dione (XXIII) plus 6α-fluoromethyl - 11β - hydroxy - 17α,21 - epoxy-4-pregnene-3,20-dione (XXIV). The corresponding 11-keto analogues of the compounds embodied in Formula XXIII, are prepared by oxidizing the 11β-hydroxy group of compounds represented by Formula XXIII.

The 21-unsubstituted compounds of this invention (XXVII and XXVIII) are prepared by treating a 21-iodo compound included in Formula XXVI, e.g., 6α-fluoromethyl-11β,17α-dihydroxy-21-iodo-4-pregnene-3,20 - dione and 6-fluoromethyl-16β-methyl-11β,17α-dihydroxy - 9α-fluoro-21-iodo-1,4,6-pregnatriene-3,20-dione, with a reducing agent such as sodium thiosulfate, sodium bisulfite, potassium thiosulfate, or the like, in an aqueous-organic solvent mixture, to obtain the corresponding 21-unsubstituted compound (XXVII) and if desired oxidizing the thus obtained 21-unsubstituted compound with chromic anhydride, N-bromoacetamide, N-bromosuccinimide or the like, to give the corresponding 11 - keto compound (XXVIII), e.g., 6α-fluoromethyl-17α-hydroxy-4-pregnene-3,11,20-trione and 6-fluoromethyl-16β-methyl-17α - hydroxy-9α-fluoro-1,4,6-pregnatriene-3,11,20-trione.

The 17-acylates (XXIX and XXXI) of the 21-unsubstituted compounds (XXVII and XXVIII) of this invention are prepared by esterifying the corresponding 17-hydroxy steroids, e.g., with the anhydride of the selected acid or with formic acid, in the manner for esterifying difficultly esterifiable hydroxy steroids disclosed in U.S. Patent 2,805,230. This esterification can readily be accomplished by reacting the starting steroid with the selected anhydride in the presence of an acid catalyst, e.g., p-toluenesulfonic acid. Following this procedure, 6α-fluoromethyl-11β,17α-dihydroxy-9α-fluoro-4 - pregnene - 3,20-dione (XXVII) and 6-fluoromethyl-2α-methyl-17α - hydroxy-4,6-pregnadiene-3,11,20 - trione (XXVIII) heated with acetic anhydride, p-toluenesulfonic acid and acetic acid yield the corresponding 6α-fluoromethyl-11β,17α-dihydroxy-9α-fluoro-4-pregnene-3,20 - dione 17 - acetate (XXIX) and 6-fluoromethyl-2α-methyl-17α-hydroxy - 4,6-pregnadiene-3,11,20-trione 17-acetate (XXXI).

The 16α,17α-acetal derivatives of the compounds of this invention (XXX) are prepared from the steroids represented by Formulae XII, XIV, XIX, XX, XXI XXIII, XXV, XXVII and XXVIII, wherein Y′ is a α-hydroxy, (prepared as in Example 76B) by treating a suspension or solution of the selected steroid in an aldehyde or ketone (either alone or in a suitable solvent when the aldehyde or ketone is a solid) with an acid catalyst such as perchloric acid, p-toluenesulfonic acid, hydrochloric acid or the like, neutralizing the acid and recovering the acetal derivative thus produced. For example, acetone solutions of 6α-fluoromethyl-11β,16α,17α,21-tetrahydroxy-4 - pregnene-3,20-dione (XII) and 6α-fluoromethyl-11β,16α,17α,21-tetrahydroxy-9α-fluoro-1,4 - pregnadiene - 3,20 - dione (XXI) when reacted with perchloric acid yield 6α-fluoromethyl-11β,16α17α,21-tetrahydroxy - 4 - pregnene - 3,20-dione 16α,17α-acetonide (XXX) and 6α-fluoromethyl-11β,16α,17α,21-tetrahydroxy-9α-fluoro-1,4 - pregnadiene-3,20-dione 16α,17α-acetonide (XXX).

The compounds of this invention represented by Formula IX can be prepared by an alternative process not requiring the formation of 17:20,20:21-bismethylenedioxy derivatives. The compounds represented by Formula IX can be prepared as follows: oxidizing 3β,11β,17α,21-tetrahydroxy-5-pregnen-20-one 3,21-diacetate (1) (prepared according to U.S. Patent 2,899,448) with chromic acid to produce the corresponding 11-keto compound (2); hydrolyzing the thus-produced 3β,17α,21-trihydroxy-5-pregnene-11,20-dione 3,21-diacetate (2) with potassium hydroxide or potassium carbonate in aqueous methanol at room temperature for a period of about 24 hours to yield 3β,17α,21-trihydroxy-5-pregnene-11,20-dione (3); refluxing the thus produced 3β,17α,21-trihydroxy-5-pregnene-11,20-dione (3) for about 6 hours under a water take-off head with ethylene glycol in benzene containing p-toluenesulfonic acid to give the corresponding 20-ethylene ketal (4); dissolving the thus-obtained 3β,17α,21-trihydroxy-5-pregnene-11,20-dione 20-ethylene ketal (4) in acetic anhydride and pyridine overnight at room temperature to yield 3β,17α,21-trihydroxy-5-pregnene-11,20-dione 20-ethylene ketal 3,21-diacetate (5); hydroxymethylating the thus obtained 3β,17α,21-trihydroxy-5 - pregnene - 11,20-dione 20-ethylene ketal 3,21-diacetate (5) at the 6-position of the non-conjugated double bond by reacting said compound with carbon monoxide and hydrogen in the presence of an operative catalyst, e.g., cobalt carbonate, under superatmospheric pressure to produce 6α-hydroxymethyl-3β,17α,21-trihydroxy-5α-pregnane-11,20-dione 20 - ethylene ketal 3,21-diacetate (6); reacting the thus-produced 6α-hydroxymethyl-3β,17α,21-trihydroxy-5α-pregnane - 11,20-dione 20-ethylene ketal 3,21-diacetate (6) with an organic sulfonyl halide, e.g., p-toluenesulfonyl chloride, to obtain the corresponding 6-tosyloxymethyl derivative (7); reacting said 6-tosyloxymethyl compound (7) with an alkali metal fluoride, e.g., potassium fluoride, to give 6α-fluoromethyl-3β,17α,21-trihydroxy-5α - pregnane - 11,20-dione 20-ethylene ketal 3,21-diacetate (8); reducing the thus-produced 6α-fluoromethyl-3β,17α,21-trihydroxy - 5α-pregnane-11,20-dione 20-ethylene ketal 3,21-diacetate (8) with lithium aluminum hydride to yield 6α-fluoromethyl-3β,11β,17α,21-tetrahydroxy-5α-pregnan-20-one 20 - ethylene ketal (9); dissolving the thus obtained 6α-fluoromethyl-3β,11β,17α,21-tetrahydroxy-5α-pregnan-20-one 20 - ethylene ketal (9) in acetic anhydride and pyridine with standing overnight at room temperature to reesterify and restore the acetate groups at the 3 and 21-positions; partially hydrolyzing the thus-obtained 6α - fluoromethyl-3β,11β,17α,21-tetrahydroxy-5α-pregnan-20-one 20 - ethylene ketal 3,21-diacetate (9) with potassium bicarbonate in aqueous methanol to give 6α-fluoromethyl-3β,11β,17α,-21-tetrahydroxy-5α-pregnan-20-one 20-ethylene ketal 21-acetate (10); oxidizing (Oppenauer) the thus produced 6α-fluoromethyl-3β,11β,17α,21-tetrahydroxy-5α -pregnan-20-one 20-ethylene ketal 21-acetate (10) with a ketone, e.g., acetone, and an aluminum alkoxide, e.g., aluminum isopropoxide, to yield the corresponding 6α-fluoromethyl-11β,17α,21-trihydroxy-5α-pregnan-3-one 20-ethylene ketal 21-acetate (11); removing the 20-ethylene ketal group from the thus produced 6α-fluoromethyl-11β,17α,21-trihydroxy-5α-pregnan-3-one 20-ethylene ketal 21 - acetate (11) by heating said compound in aqueous acetone with dilute sulfuric acid on a steam bath to give 6α-fluoromethyl-11β,17α,21-trihydroxy-5α-pregnan-3,20 - dione 21-acetate (12) and dehydrogenating the thus-obtained 6α-fluoromethyl-11β,17α,21-trihydroxy-5α - pregnan - 3,20-dione 21-acetate (12) in the 1,2- and 4,5-positions by means of selenium dioxide to obtain 6α-fluoromethyl-11β,17α,21-trihydroxy-1,4-pregnadiene-3,20-dione 21 - acetate (IX).

Following the procedure outlined above for the preparation of 6α-fluoromethyl-11β,17α,21-trihydroxy-1,4-pregnadiene-3,20-dione 21-acetate (IX), but instead of 3β,11β,17α,21-tetrahydroxy-5-pregnen-20-one 3,21-diacetate (1), substituting a corresponding 2α-methyl, 16α-methyl or 16β-methyl derivative thereof as starting compound, there is thus produced the corresponding 2α-methyl, 16α-methyl or 16β-methyl substituent of 6α-fluoromethyl-11β,17α,21 - trihydroxy - 1,4 - pregnadiene - 3,20-dione 21-acetate (IX).

The following preparations and examples are illustrative of the process and products of this invention.

PREPARATION 1

*17:20,20:21-bismethylenedioxy-4-pregnene-3,11-dione (II)*

A mixture of 200 g. of 4-pregnene-17α, 21-dihydroxy-3,11,20-trione (cortisone) (I), 4000 ml. of chloroform, 2500 ml. of 38% aqueous formaldehyde and 2000 ml. of concentrated hydrochloric acid was stirred at room temperature for a period of about 20 hours. The chloroform layer was separated, washed twice with water, sodium bicarbonate solution and again with water. The chloroform extract was dried with sodium sulfate, the solvent evaporated and the residue crystallized from methanol to give 136 g. of light colored crystalline solid 17:20,20:21-bismethylenedioxy-4-pregnene - 3,11 - dione with a melting point of 244 to 248° C. and a rotation [α]_D of plus 82° in chloroform. A second crop of 9 g. (after recrystallization) was obtained from the mother liquor to bring the total yield to 145.2 g. (65%).

PREPARATION 2

*17:20,20:21-bismethylenedioxy-2α-methyl-4-pregnene-3,11-dione (II)*

Following the procedure of Preparation 1, but substituting 2α-methyl-17α,21-dihydroxy-4-pregnene-3,11,20-trione (I) (J. Amer. Chem. Soc. 77, 6401 [1955]) as the starting steroid compound, there is thus produced crystalline 17:20,20:21-bismethylenedioxy-2α-methyl-4-pregnene-3,11-dione (II).

PREPARATION 3

*17:20,20:21-bismethylenedioxy-16α-methyl-4-pregnene-3,11-dione (II)*

Following the procedure of Preparation 1, but substituting 16α-methyl-17α,21-dihydroxy-4-pregnene-3,11,20-trione (I) (J. Amer. Chem. Soc. 80, 3160 [1958]) as the starting steroid, there is thus produced 17:20,20:21-bismethylenedioxy-16α-methyl-4-pregnene-3,11-dione (II).

PREPARATION 4

*17:20,20:21-bismethylenedioxy-16β-methyl-4-pregnene-3,11-dione (II)*

Following the procedure of Preparation 1, but substituting 16β-methyl-17α,21-dihydroxy-4-pregnene-3,11,20-trione (I) (J. Amer. Chem. Soc. 80, 4435 [1958]) as the starting steroid, there is thus produced 17:20,20:21-bismethylenedioxy-16β-methyl-4 - pregnene - 3,11 - dione (II).

EXAMPLE 1

*17:20,20:21-bismethylenedioxy-5-pregnene-3β,11-diol 3-acetate (IV)*

85.9 g. of 17:20,20:21-bismethylenedioxy-4-pregnene-3,11-dione (II), 750 ml. of isopropenyl acetate, 2.5 g. of p-toluenesulfonic acid monohydrate and 1000 ml. of toluene were placed in a 3 liter flask fitted with a stirrer, heating mantle and condenser. The heating of the mixture was regulated so that 200 ml. of distillate was collected over a 2 hour period. An additional 500 ml. of toluene and 750 ml. of isopropenyl acetate was added and 1200 ml. of distillate collected over a 4 hour period. The reaction mixture was then concentrated to a volume of about 200 ml. on a water bath held at a temperature of 70 to 80° C. 1000 ml. more of toluene was added and the solution concentrated to a volume of about 200 ml. under vacuum. Benzene was added to the residue and the organic solution washed first with 5% aqueous sodium bicarbonate solution then water and dried with sodium sulfate. The benzene solution was stirred with 40 g. each of Florisil and Magnesol (synthetic magnesium silicates) for a period of about 1 hour and then filtered. Evaporation of the solvent and crystallization of the resulting residue gave 48.1 g. (51% yield) of 17:20,20:21-bismethylenedioxy-3,5-pregnadien-11-one 3-acetate (III) with a melting point of 170–182° C. 70 g. of III, prepared in this manner, was dissolved in 1750 ml. of dioxane and the resulting solution cooled to 0° to 5° C. To this solution, over a period of 30 minutes, 70 g. of sodium borohydride dissolved in 700 ml. of 0.1 N sodium hydroxide was added. After a period of about 50 hours at room temperature the excess sodium borohydride was decomposed by the addition of 50% aqueous acetic acid. 900 ml. of water was added and after prolonged cooling at 0° C. the product was collected by filtration, washed with water and dried. This solid was suspended in 500 ml. of pyridine, warmed to 30° C. and filtered. 150 ml. of acetic anhydride was added to the filtrate and the reaction mixture heated on a steam bath for about 1.5 hours. After cooling, the solution was poured into 3000 ml. of ice water, allowed to stand at 0–5° C., collected by filtration, washed and dried to give 52.68 g. (74% yield) of 17:20,20:21-bismethylenedioxy-5-pregnene-3β,11β-diol 3-acetate (IV) with a melting point of 187 to 195° C. Two recrystallizations from acetone and Skellysolve B (hexanes) raised the melting point to 198–199° C.

*Anal.*—Calcd. for $C_{25}H_{36}O_7$: C, 66.94; H, 8.09. Found: C, 66.75; H, 7.99. The infrared spectrum supports the assigned structure.

Following the procedure of Example 1, but substituting 17:20,20:21-bismethylenedioxy-2α-methyl-4 - pregnene - 3,11-dione (Preparation 2) as the starting steroid, there is thus produced 17:20,20:21-bismethylenedioxy-2α-methyl-5-pregnene-3β,11β-diol 3-acetate (IV).

Following the procedure of Example 1, but substituting 17:20,20:21-bismethylenedioxy-16α-methyl-4 - pregnene - 3,11-dione (Preparation 3) as the starting steroid, there is thus produced crystalline 17:20,20:21-bismethylenedioxy-16α-methyl-5-pregnene-3β,11β-diol 3-acetate (IV).

Following the procedure of Example 1, but substituting 17:20,20:21 - bismethylenedioxy-16β-methyl-4-pregnene - 3,11-dione (Preparation 4) as the starting steroid, there is thus produced 17:20,20:21 - bismethylenedioxy-16β-methyl-5-pregnene-3β,11β-diol 3-acetate (IV).

In the same manner as in Example 1, but employing instead of isopropenyl acetate another alkenyl acylate, is productive of the corresponding 17:20,20:21-bismethylenedioxy-5-pregnene-3β,11β-diol 3-acylate.

EXAMPLE 2

*17:20,20:21-bismethylenedioxy-11β-hydroxy-6α-hydroxymethyl-5α-pregnane 3-acetate (V)*

A 2000 ml. autoclave was charged with 36.4 g. of 17:20,20:21-bismethylenedioxy-5-pregnene-3β,11β - diol 3-acetate (IV), 1150 ml. of toluene and 9.1 g. of cobalt carbonate. After flushing the autoclave three times with carbon monoxide, the carbon monoxide pressure was raised to 650 pounds per square inch, and hydrogen was introduced until the gas pressure reached 1360 pounds per square inch. The reaction mixture in the autoclave was heated at 180° C. with agitation for a period of about 18 hours. The gases were vented and the reaction mixture removed from the autoclave. Following filtration through Celite (diatomaceous earth) the toluene was evaporated in vacuo and the residue boiled for 1 hour in 1000 ml. of ethanol. The solution was filtered through Celite and the alcohol evaporated in vacuo. Crystallization of the residue from a mixture of acetone and Skellysolve B gave 15.8 g. (crop 1) of 17:20,20:21-bismethylenedioxy-6α-hydroxymethyl-5α-pregnene-3β,11β-diol 3-acetate (V) with a melting point of 193 to 199° C. The mother liquors were chromatographed on a column of synthetic magnesium silicate, and eluted with acetone:Skellysolve B mixtures of increasing polarity. Elution with 20–30% acetone:Skellysolve B gave an additional amount of 17:20,20:21-bismethylenedioxy-6α-hydroxymethyl-5α - pregnene - 3β,11β-diol 3-acetate. Crystallization of the combined fractions from acetone:Skellysolve B gave a further 4.9 g. (crop 2) of product with a melting point of 193 to 199° C. Two crystallizations from acetone:Skellysolve B yielded purified 17:20,20:21-bismethylenedioxy - 6α - hydroxymethyl-5α-pregnane-3β,11β-diol 3-acetate (V) having a melting point of 202 to 204° C.

*Analysis.*—Calcd. for $C_{26}H_{40}O_8$: C, 64.98; H, 8.39. Found: C, 64.63; H, 8.65. The infrared spectrum provided confirmation of the assigned structure.

Following the procedure of Example 2, but substituting 17:20,20:21-bismethylenedioxy-2α-methyl - 5 - pregnene-3β,11β-diol 3-acetate as the starting compound, there is thus produced 17:20,20:21-bismethylenedioxy - 2α-methyl-6α-hydroxymethyl-5α-pregnane-3β,11β-diol 3-acetate (V).

Following the procedure of Example 2, but substituting 17:20,20:21-bismethylenedioxy-16α-methyl-5 - pregnene-3β,11β-diol 3-acetate as the starting compound, there is thus produced crystalline 17:20,20:21-bismethylenedioxy-16α-methyl-6α-hydroxymethyl-5α-pregnane-3β,11β-diol 3-acetate (V); substitution of the 16β-methyl isomer as starting material yields 17:20,20:21-bismethylenedioxy-16β-methyl-6α-hydroxymethyl-5α-pregnane-3β,11β-diol 3-acetate (V).

In the same manner as in Example 2, but substituting another 3-acylate for the starting 17:20,20:21-bismethylenedioxy-5-pregnene-3β,11β-diol 3-acetate there is thus produced the corresponding 17:20,20:21-bismethylenedioxy-6α-hydroxymethyl-5α-pregnane-3β,11β-diol 3 - acylate (V).

EXAMPLE 3

*17:20,20:21-bismethylenedioxy-6α-fluoromethyl-3β,11β-dihydroxy-5α-pregnane (VI)*

1.2 g. of 17:20,20:21-bismethylenedioxy-6α-hydroxymethyl-5α-pregnane-3β,11β-diol 3-acetate (V), 1.2 g. of p-toluenesulfonyl chloride and 20 ml. of pyridine were allowed to stand at room temperature for a period of about 18 hours. The reaction mixture was then poured into sodium bicarbonate solution and the organic material extracted with benzene. The extracts were washed successively with water, ice-cold dilute sulfuric acid, water, sodium bicarbonate solution, water and then dried with sodium sulfate. Removal of the solvent gave a light colored crystalline tosylate, which on recrystallization from a mixture of acetone and Skellysolve B yielded 1.25 g. of product with a melting point of 200 to 208° C. 1.2 g. of the tosyloxymethyl derivative, 17:20,20:21-bismethylenedioxy-6α-(p-toluenesulfonoxymethyl)-5α - pregnane-3β,11β-diol 3-acetate with a melting point of 200 to 208° C., 2.0 g. of anhydrous potassium fluoride and 20 ml. of diethylene glycol were heated with stirring at a temperature of 205 to 215° C., under nitrogen for about 1 hour. After cooling, 20 ml. of dioxane and a solution prepared from 0.5 g. of potassium hydroxide in 10 ml. of water were added to the reaction mixture and the resulting solution allowed to stand at room temperature for a period of about 18 hours. The reaction mixture was poured into water and extracted with ethyl acetate. The combined extracts were washed with water until neutral, dried with sodium sulfate and the solvent removed. The residue was dissolved in 25 ml. of methylene chloride and chromatographed on a column of 100 g. of Florisil synthetic magnesium silicate and the column eluted with mixtures of acetone and Skellysolve B of increasing polarity. Crystalline material was obtained from 20–30% acetone:Skellysolve B eluates. These were combined and recrystallized from methanol to give 240 mg. (crop 1) of 17:20,20:21-bismethylenedioxy-6α-fluoromethyl - 5α-pregnane-3β,11β-diol (VI) with a melting point of 215 to 217° C. Crystallization of the mother liquors from acetone:Skellysolve B gave 140 mg. (crop 2) with a melting point of 215 to 217° C. and 130 mg. (crop 3) with a melting point of 213 to 215° C. of the same product. The infrared spectra of all crops were the same and the total yield was 510 mg. (61% yield). Further recrystallization from acetone:Skellysolve B yielded purified 17:20,20:21-bismethylenedioxy - 6α - fluoromethyl - 5α-pregnane-3β,11β-diol (VI) having a melting point of 217 to 219° C.

*Analysis.*—Calcd. for $C_{24}H_{37}O_6F$: C, 65.45; H, 8.41; F, 4.32. Found: C, 65.08; H, 8.21; F, 4.57. The infrared spectrum supports the assigned structure.

Following the procedure of Example 3, but substituting 17:20,20:21-bismethylenedioxy-2α-methyl-6α - hydroxymethyl-5α-pregnane-3β,11β-diol 3-acetate as the starting compound, there is thus produced 17:20,20:21-bismethylenedioxy-6α-fluoromethyl-2α-methyl-5α - pregnane - 3β,11β-diol (VI).

Following the procedure of Example 3, but substituting 17:20,20:21-bismethylenedioxy-16α-methyl-6α - hydroxymethyl-5α-pregnane-3β,11β-diol 3-acetate as the starting compound, there is thus produced crystalline 17:20,20:21-bismethylenedioxy-6α-fluoromethyl-16α-methyl-5α - pregnane-3β,11β-diol (VI).

Following the procedure of Example 3, but substituting 17:20,20:21-bismethylenedioxy-16β-methyl-6α - hydroxymethyl-5α-pregnane-3β,11β-diol 3-acetate as the starting compound, there is thus produced 17:20,20:21-bismethylenedioxy-6α-fluoromethyl-16β-methyl-5α - pregnane - 3β,11β-diol (VI).

EXAMPLE 4

*17:20,20:21-bismethylenedioxy-6α-fluoromethyl-11β-hydroxy-5α-pregnan-3-one (VII)*

380 mg. of 17:20,20:21-bismethylenedioxy-6α-fluoromethyl-5α-pregnane-3β,11β-diol (VI), 20 ml. of cyclohexanone and 30 ml. of toluene were placed together in a flask and heated until about 10 ml. of distillate was collected. 500 mg. of aluminum isopropoxide was added and the mixture refluxed for 4 hours. After cooling, the organic layer was washed first with ice-cold dilute hydrochloric acid, then with water until the washings were neutral, dried with sodium sulfate and the organic solvents removed by steam distillation. After cooling at 0° C. the solid material was collected by filtration, washed and dried to give 380 mg. of product having a melting point of 190 to 205° C. Crystallization from a mixture of acetone and Skellysolve B hexanes gave 240 mg. of a light colored compound with melting point of 208 to 212° C. An additional crystallization from the same solvent mixture yielded purified crystalline 17:20,20:21-bismethylenedioxy - 6α - fluoromethyl-11β-hydroxy-5α-pregnan-3-one (VII) having a melting point of 211–213° C.

*Anal.*—Calcd. for $C_{24}H_{35}O_6F$: C, 65.75; H, 7.99; F, 4.34. Found: C, 65.74; H, 8.19; F, 4.53.

Following the procedure of Example 4, but substituting (1) 17:20,20:21 - bismethylenedioxy-6α-fluoromethyl-2α-methyl-5α-pregnane-3β,11β-diol (2) 17:20,20:21-bismethylenedioxy - 6α-fluoromethyl-16α-methyl-5α-pregnane-3β,11β-diol and (3) 17:20,20:21-bismethylenedioxy-6α-fluoromethyl - 16β-methyl-5α-pregnane-3β,11β-diol as starting compounds, there are thus produced, respectively (1) 17:20,20:21 - bismethylenedioxy - 6α - fluoromethyl-2α-methyl-hydroxy-5α-pregnan-3-one (VII), (2) 17:20,20:21 - bismethylenedioxy - 6α-fluoromethyl-16α-methyl-11β-hydroxy-5α-pregnan-3-one (VII) and (3) 17:20,20:21-bismethylenedioxy - 6α - fluoromethyl - 16β - methyl-11β-hydroxy-5α-pregnan-3-one (VII).

EXAMPLE 5

*17:20,20:21-bismethylenedioxy-6-fluoromethyl-11β-hydroxy-1,4-pregnadien-3-one (VIII)*

200 mg. of 17:20,20:21-bismethylenedioxy-6α-fluoromethyl-11β-hydroxy-5α-pregnan-3-one (VII), 400 mg. of selenium dioxide, 0.1 ml. of acetic acid and 20 ml. of tertiary butanol were heated together under reflux for a period of about 48 hours. After the first 24 hours of refluxing, 400 mg. of selenium dioxide was added to the reaction mixture and the same amount again added about 10 hours later. After cooling the mixture was filtered through Celite (diatomaceous earth) and Magnesol (synthetic magnesium silicates). The filtrate was evaporated to dryness and the residue taken up in ethyl acetate, which was washed successively with potassium bicarbonate solution, freshly prepared ice-cold ammonium sulfide solution, ice-cold ammonia, dilute hydrochloric acid, potassium bicarbonate solution, water and dried with sodium sulfate. Evaporation of the ethyl acetate gave 281 mg. of a crystalline solid, which was dissolved in methylene chloride and chromatographed on a 20 g. column of Florisil previously wetted with Skellysolve B and the column eluted with acetone:hexane of increasing polarity. 93 mg. of crystalline material was obtained from the 15 to 20% acetone:Skellysolve B hexane eluates; crystallization from a mixture of acetone and Skellysolve B yielded 67 mg. of 17:20,20:21-bismethylenedioxy - 6α - fluoromethyl - 11β - hydroxy-1,4-pregnadien-3-one (VIII) with a melting point of 255 to 265° C. This material demonstrated an infrared spectrum in keeping with the structure postulated for the compound.

*Anal.*—Calcd. for $C_{24}H_{31}FO_6$: C, 66.36; H, 7.14. Found: C, 66.40; H, 7.41.

Following the procedure of Example 5, but substituting (1) 17:20,20:21 - bismethylenedioxy-6α-fluoromethyl-2α-methyl-11β-hydroxy-5α-pregnan-3-one, (2) 17:20,20:21-bismethylenedioxy - 6α - fluoromethyl-16α-methy-11β-hydroxy-5α-pregnan-3-one and (3) 17:20,20:21-bismethylenedioxy - 6α - fluoromethyl-16β-methy-11β-hydroxy-5α-pregnan-3-one as starting compounds, there are thus produced, respectively, (1) 17:20,20:21-bismethylenedioxy-6α - fluoromethyl-2-methyl-11β-hydroxy-1,4-pregnadien-3-one (VIII), (2) 17:20,20:21-bismethylenedioxy-6α-fluoromethyl - 16α - methy - 11β-hydroxy-1,4-pregnadien-3-one (VIII) and (3) 17:20,20:21-bismethylenedioxy-6α-fluoromethyl - 16β - methyl - 11β-hydroxy-1,4-pregndien-3-one (VIII).

EXAMPLE 6

*6α-floromethyl-11β,17α,21-trihydroxy-1,4-pregnadiene-3,20-dione (IX)*

Nitrogen was bubbled through 10 ml. of 60% formic acid solution during 5 minutes of heating on a steam bath. Then 60 mg. of 17:20,20:21-bismethylenedioxy-6α-fluoromethyl - 11β - hydroxy-1,4-pregnadien-3-one (VIII) was added to the hot formic acid while heating on the steam bath was continued for 15 minutes, during which period nitrogen was continuously introduced. After cooling, the solution was poured into ice:sodium bicarbonate solution and the organic material extracted with methylene chloride. The extract was washed with water, dried with sodium sulfate and the solvent evaporated. The crystalline solid weighing 57 mg. was dissolved in 20 ml. methanol (previously purged for a period of about 20 minutes with nitrogen) and an aqueous solution of potassium bicarbonate (100 mg. in 10 ml. of water also purged with nitrogen) added and the resulting solution stirred for about 48 hours at room temperture. Acetic acid was added to the solution until the pH was 7.0 and the solvent removed under vacuum. The organic material was removed from the residue with methylene chloride; the extract dried with sodium sulfate and evaporated to give 58 mg. of crystalline material. This was dissolved in a mixture of methylene chloride and ethyl acetate and chromatographed on a column of 5.0 g. of Florisil synthetic magnesium silicate previously wetted with Skellysolve B hexanes. Light colored crystals were obtained from the 30% acetone:Skellysolve B eluates. These fractions were pooled and crystallized from a mixture of acetone and Skellysolve B to give 19 mg. of 6α-fluoromethyl-11β,17α,21-trihydroxy-1,4-pregnadiene-3,20-dione (IX) with a melting point of 232 to 235° C.

*Anal.*—Calcd. for $C_{22}H_{29}FO_5$: C, 67.35; H, 7.4; F, 4.85. Found: C, 67.77; H, 7.95; F, 5.24.

Following the procedure of Example 6, but substituting (1) 17:20,20:21 - bismethylenedioxy - 6α - fluoromethy-2-methyl-11β-hydroxy-1,4-pregnadien-3-one, (2) 17:20,20:21 - bismethylenedioxy - 6α-fluoromethyl-16α-methyl-11β-hydroxy-1,4-pregnadien-3-one and (3) 17:20,20:21-bismethylenedioxy - 6α - fluoromethyl - 16β-methyl-11β-hydroxy-1,4-pregnadien-3-one as starting compounds, there are thus produced, respectively, (1) 6α-fluoro-2-methyl-11β,17α,21 - trihydroxy-1,4-pregnadiene-3,20-dione (IX), (2) 6α-fluoromethyl-16α-methyl-11β,17α,21-trihydroxy-1,4-pregnadiene-3,20-dione (IX) and (3) 6α-fluoromethyl-16β - methyl-11β,17α,21-trihydroxy-1,4-pregnadiene-3,20-dione (IX).

EXAMPLE 7

*6α-fluoromethyl-11β,17α,21-trihydroxy-1,4-pregnadiene-3,20-dione 21-acetate (IX′)*

0.338 g. of 6α-fluoromethyl-11β,17α,21-trihydroxy-1,4-pregnadiene-3,20-dione (IX) was allowed to stand overnight at room temperature in 10 ml. of pyridine containing 2.5 ml. of acetic anhydride. After 18 hours at room temperature the reaction mixture was poured into a mixture of ice and sodium bicarbonate solution and extracted with ethyl acetate. The pooled extracts were washed successively with water, dilute sulfuric acid, water until neutral and dried with sodium sulfate. Removal of the solvent gave a crystalline light-colored solid, which on recrystallization from a mixture of acetone and Skellysolve B yielded 248 mg. of 6α-fluoromethyl-11β,17α,21 - trihydroxy-1,4-pregnadiene-3,20-dione 21-acetate (IX′) with a melting point of 226 to 229° C. An additional crystallization from the same solvents produced purified product with a melting point of 231 to 233° C. The infrared spectrum exhibited by this compound supports the assigned structure.

*Anal.*—Calcd. for $C_{24}H_{31}FO_6$: C, 66.36; H, 7.14; F, 4.38. Found: C, 66.23; H, 7.34; F, 4.81.

6α - fluoromethyl - 11β,17α,21-trihydroxy-1,4-pregnadiene-3,20-dione (IX) is converted to other 21-esters by reaction with the appropriate acid anhydride, acid chloride or bromide, or by other methods known in the art, e.g., by ester exchange, acid in the presence of an esterification catalyst, etc., to produce 6α-fluoromethyl-11β,17α, 21 - trihydroxy - 1,4-pregnadiene-3,20-dione 21-acylates (IX') which include those wherein the acyl radical of the 21-acylate group is the acyl radical of, for example, a lower-aliphatic acid, e.g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, a cyclic acid, e.g., cyclopropylideneacetic, a cycloaliphatic acid, e.g., cyclopentylformic, cyclopentylacetic, β-cyclopentylpropionic, cyclohexylformic, cyclohexylacetic, β-cyclohexylpropionic, an aryl or alkaryl acid, e.g., benzoic, 2, 3, or 4-methylbenzoic, 2,3-, 2,4-, 2,5-, 2,6-, 3,4- and 3,5-dimethylbenzoic, α-naphthoic, 3-methyl-α-naphthoic, an aralkyl acid, e.g., phenylacetic, phenylpropionic, diphenylacetic, triphenylacetic, a dibasic acid (which can be converted to water soluble, e.g., sodium salts), e.g., succinic, glutaric, α-methylglutaric, β-methylglutaric, β,β-dimethylglutaric, adipic, pimelic, suberic, a hydroxy acid, e.g., glycolic, lactic, citric, tartaric, d-maleic, d-glyceric, mannonic, gluconic, salicylic, 2,3,4-trimethoxybenzoic, α-naphthoxy-acetic, or other acyl acid.

Following the procedure of Example 7, but substituting (1) 6α-fluoromethyl-2-methyl-11β,17α,21-trihydroxy-1,4 - pregnadiene-3,20-dione, (2) 6α-fluoromethyl-16α-methyl - 11β,17α,21 - trihydroxy-1,4-pregnadiene-3,20-dione and (3) 6α-fluoromethyl-16β-methyl-11β,17α,21-trihydroxy-1,4-pregnadiene-3,20-dione as starting compounds, there are thus produced, respectively, (1) 6α-fluoromethyl - 2 - methyl-11β,17α,21-trihydroxy-1,4-pregnadiene-3,20-dione 21-acetate (IX'), (2) 6α-fluoromethyl-16α - methyl - 11β,17α,21 - trihydroxy - 1,4 - pregnadiene-3,20-dione 21-acetate (IX') and (3) 6α-fluoromethyl-16β - methyl-11β-,17α,21-trihydroxy-1,4-pregnadiene-3,20-dione 21-acetate (IX').

Similarly, 6α - fluoromethyl-2-methyl-11β,17α,21-trihydroxy-1,4-pregnadiene-3,20-dione, 6α - fluoromethyl-16α-methyl-11β,17α,21-trihydroxy - 1,4 - pregnadiene-3,20-dione and 6α-fluoromethyl - 16β - methyl-11β,17α,21-trihydroxy-1,4-pregnadiene-3,20-dione are converted to any of the other esters named in the paragraph following Example 7 by substituting these compounds for 6α-fluoromethyl - 11β,17α,21 - trihydroxy - 1,4 - pregnadiene-3,20-dione as the starting compound in the acylation reaction.

EXAMPLE 8

*6-fluoromethyl-11β,17α,21-trihydroxy-1,4,6-pregnatriene-3,20-dione 21-acetate (X)*

6α - fluoromethyl - 11β,17α,21-trihydroxy-1,4-pregnadiene-3,20-dione 21-acetate (IX'), recrystallized 2,3,5,6-tetrachloro-1,4-benzoquinone (chloranil) and tertiary amyl alcohol were heated together to boiling under nitrogen with a few boiling chips and gently refluxed for a period of about 6 hours. The mixture was cooled and evaporated to dryness under reduced pressure. The solid residue with the exception of some insoluble chloranil was dissolved in ether and filtered. The ether filtrate was washed with cold 2% sodium hydroxide, cold water (until the washings were neutral), then with saturated sodium chloride solution. The ether solution was dried over sodium sulfate and evaporated to dryness. The residue was readily crystallized from cold acetone to yield 6 - fluoromethyl-11β,17α,21-trihydroxy-1,4,6-pregnatriene-3,20-dione 21-acetate (X).

The ester thus obtained can be hydrolyzed with potassium hydroxide or potassium carbonate in methanol or ethanol at room temperature in a nitrogen atmosphere to give the free triol, 6α-fluoromethyl-11β,17α,21-trihydroxy-1,4,6-pregnatriene-3,20-dione. The triol can be reesterified to the 21-acylate by reacting it at room temperature in pyridine solution with the anhydride or acyl halide of an organic carboxylic acid.

In the same manner as in Example 8, substitution of 6α - fluoromethyl-11β,17α,21-trihydroxy-1,4-pregnadiene-3,20-dione as the starting steroid is productive of 6-fluoromethyl - 11β,17α,21 - trihydroxy-1,4,6-pregnatriene-3,20-dione.

Similarly, substituting as the starting steroid another 21-acylate of 6α-fluoromethyl-11β,17α,21-trihydroxy-1,4-pregnadiene-3,20-dione for the 21-acetate employed in the 6-dehydrogenation reaction described in Example 8, wherein the acyl radical is, e.g., that of an acid named in the paragraph following Example 7, there is thus produced the corresponding 21-acylate of 6-fluoromethyl-11β,17α,21-trihydroxy-1,4,6-pregnatriene-3,20-dione.

Following the procedure of Example 8, but substituting 6α - fluoromethyl - 2-methyl-11β,17α,21-trihydroxy-1,4-pregnadiene-3,20-dione 21-acetate, 6α-fluoromethyl-16α-methyl-11β,17α,21-trihydroxy-1,4-pregnadiene-3,20- dione 21-acetate and 6α-fluoromethyl-16β-methyl-11β,17α,21-trihydroxy-1,4-pregnadiene 21-acetate as starting compounds, there are thus produced the corresponding 1,4,6-pregnatriene 21-acetates (X).

Similarly, substituting as the starting steroids other 21-acylates of 6α-fluoromethyl-2α-methyl-11β,17α,21-trihydroxy - 1,4-pregnadiene-3,20-dione, 6α-fluoromethyl-16α-methyl - 11β,17α,21 - trihydroxy - 1,4-pregnadiene-3,20-dione and 6α - fluoromethyl-16β-methyl-11β,17α,21-trihydroxy - 1,4 - pregnadiene-3,20-dione for the 21-acetate, there are thus produced the corresponding 1,4,6-pregnatriene 21-acylates.

EXAMPLE 9

*17:20,20:21-bismethylenedioxy-6α-fluoromethyl-11β-hydroxy-4-pregnen-3-one (XI)*

250 mg. of 17:20,20:21-bismethylenedioxy-6α-fluoromethyl-11β-hydroxy-5α-pregnan-3-one (VII) in 10 ml. of dioxane was acidified with one drop of 4 Normal hydrogen bromide in dioxane and 215 mg. of bromine added over a period of about 1 minute. After about 1 hour at room temperature an excess of sodium bicarbonate solution was added to the reaction mixture. The precipitated dibromo derivative of 17:20,20:21-bismethylenedioxy-6α-fluoromethyl-11β-hydroxy-5α-pregnan-3-one (VII) was treated with 0.9 g. of sodium iodide in 15 ml. of acetone containing bromoacetone, and the mixture heated under reflux for about 2.5 hours. 0.3 g. of oxalic acid was then added and refluxing continued for a period of about 1 hour. After cooling, ethyl acetate was added and the solution filtered. The filtrate was washed with water and sodium bicarbonate solution, then dried with sodium sulfate. The filtrate was stirred with 500 mg. of zinc dust in 2 ml. of acetic acid for about 1 hour and filtered. The organic layer was washed successively with water, sodium bicarbonate solution and dried with sodium sulfate. Evaporation of the solvent gave the crude α,β-unsaturated ketone, which on purification by means of the derivative formed with the Girard reagent, followed by subsequent crystallization yielded pure 17:20,20:21-bismethylenedioxy-6α-fluoromethyl-11β-hydroxy-4-pregnen-3-one (XI). Alternatively, if desired, the crude α,β-unsaturated ketone can be purified by chromatography over Florisil synthetic magnesium silicate with increasing proportions of acetone in Skellysolve B hexanes followed by recrystallization.

Following the procedure of Example 9, but substituting (1) 17:20,20:21-bismethylenedioxy-6α-fluoromethyl-2α-methyl-11β-hydroxy-5α-pregnan-3-one, (2) 17:20,20:21-bismethylene - dioxy - 6α - fluoromethyl - 16α - methyl-11β-hydroxy-5α-pregnan-3-one and (3) 17:20,20:21-bismethylenedioxy - 6α - fluoromethyl - 16β - methyl - 11β-hydroxy-5α-pregnan-3-one as starting compounds, there are thus produced, respectively, (1) 17:20,20:21-bismethylenedioxy - 2α - methyl - 11β - hydroxy - 4 - pregnen-3-one (XI), (2) 17:20,20:21-bismethylenedioxy-6α-fluoromethyl-16α-methyl-11β-hydroxy-4-pregnen-3-one (XI)

and (3) 17:20,20:21-bismethylenedioxy-6α-fluoromethyl-16β-methyl-11β-hydroxy-4-pregnen-3-one (XI).

EXAMPLE 10

6α-fluoromethyl-11β,17α,21-trihydroxy-4-pregnene-3,20-dione (XII)

120 mg. of 17:20,20:21-bismethylenedioxy-6α-fluoromethyl-11β-hydroxy-4-pregnen-3-one (XI) was heated on a steam bath in 20 ml. of 60% formic acid for a period of about 15 minutes while a stream of nitrogen was continuously passed through the solution. After cooling, the solution was poured into a mixture of ice and aqueous sodium bicarbonate and the organic material extracted with methylene chloride. The extracts were washed with water, dried with sodium sulfate and the solvent removed by evaporation. The residue was dissolved in 40 ml. of methanol previously purged with nitrogen. A solution of 200 mg. of potassium bicarbonate in 20 ml. of water, previously purged with nitrogen, was added to the methanol solution and the combined liquids stirred for about 48 hours at room temperature. Acetic acid was added until the pH dropped to 7.0 and the solvent removed under vacuum. The residue was extracted with methylene chloride; the extract was dried with sodium sulfate and then evaporated to give a solid. Purification of the solid, e.g., by recrystallization, yielded 6α-fluoromethyl-11β,17α,21-trihydroxy-4-pregnene-3,20-dione (XII).

Following the procedure of Example 10, but substituting (1) 17:20,20:21-bismethylenedioxy-6α-fluoromethyl-2α - methyl - 11β - hydroxy - 4 - pregnen - 3 - one, (2) 17:20,20:21 - bismethylene - dioxy - 6α - fluoromethyl-16α-methyl-11β-hydroxy-4-pregnen-3-one and (3) 17:20, 20:21 - bismethylenedioxy - 6α - fluoromethyl - 16β-methyl-11β-hydroxy-4-pregnen-3-one as starting compounds, there are thus produced, respectively, in the form of light-colored crystalline solids (1) 6α-fluoromethyl-2α-methyl - 11β,17α,21 - trihydroxy - 4 - pregnene - 3,20 dione (XII), (2) 6α-fluoromethyl-16α-methyl-11β,17α,21-trihydroxy-4-pregnene-3,20-dione (XII) and (3) 6α-fluoromethyl - 16β - methyl - 11β,17α,21 - trihydroxy - 4-pregnene-3,20-dione (XII).

EXAMPLE 11

6α-fluoromethyl-11β,17α,21-trihydroxy-4-pregnene-3,20-dione (XII)

A medium consisting of 1% dextrose hydrate, 2% cornsteep liquor of 60% solids and tap water was adjusted to pH 4.9 with sodium hydroxide. The medium was stream sterilized at 15 pounds pressure for 30 minutes, cooled, and then inoculated with a 24-hour growth, from spores, of NRRL B–1332 (Streptomyces sp.). The medium was agitated, and sparged with sterile air at the rate of one-tenth volume of air per volume of medium per minute. At the end of 24 hours of fermentation at room temperature, the pH was about 7.4. To this culture there was added a solution of 6α-fluoromethyl-11β,17α,21-trihydroxy-1,4-pregnadiene-3,20-dione (IX) dissolved in a minimal amount of dimethylformamide. The solution was prepared by dissolving five parts of the steroid in 100 parts of the solvent and adding about 10 cc. of the solution per liter of the medium. Fermentation was continued for a period of 48 hours whereupon the mycelium and beer were extracted thoroughly with methylene chloride. The extract was washed with sodium bicarbonate solution and then with water, dried and concentrated in vacuo to give 6α-fluoro-methyl-11β,17α,21-trihydroxy-4-pregnene-3,20-dione (XII).

Instead of NRRL B–1332 used in Example 11 to produce fermentative hydrogenation at the 1,2-position of the steroid nucleus, other microorganisms may be similarly effectively employed; included are those chosen from the group consisting of: ATCC 6947 (Arthrobacter tumescens); ATCC 3352 (S. olivaceous) and ATCC 3313.

Following the procedure of Example 11, but substituting (1) α-fluoromethyl-2-methyl-11β,17α,21-trihydroxy-1,4-pregnadiene-3,20-dione, (2) 6α-fluoromethyl-16α-methyl - 11β,17α,21 - trihydroxy - 1,4 - pregnadiene - 3,20-dione and (3) 6α-fluoromethyl-16β-methyl-11β,17α,21-trihydroxy-1,4-pregnadiene-3,20-dione as starting compounds, there are thus produced, respectively, (1) 6α-fluoromethyl - 2α - methyl - 11β,17α,21 - trihydroxy - 4-pregnene-3,20-dione (XII), (2) 6α-fluoromethyl-16α-methyl - 11β,17α,21 - trihydroxy - 4 - pregnene - 3,20-dione (XII) and (3) 6α-fluoromethyl-16β-methyl-11β, 17α,21-trihydroxy-4-pregnene-3,20-dione (XII).

EXAMPLE 12

6α-fluoromethyl-11β,17α,21-trihydroxy-4-pregnene-3,20-dione 21-acetate (XII′)

Following the procedure of Example 7, but substituting 6α - fluoromethyl - 11β,17α,21 - trihydroxy - 4 - pregnene-3,20-dione (XII) as starting compound, there is thus produced 6α - fluoromethyl - 11β,17α,21 - trihydroxy - 4-pregnene-3,20-dione 21-acetate (XII′).

Following the procedure of Example 7, but substituting 6α - fluoromethyl-11β,17α,21-trihydroxy-4-pregnene-3,20-dione (XII) as starting compound, other 21-acylates corresponding to those named in Example 7 are produced.

Following the procedures of Example 7, but substituting (1) 6α - fluoromethyl - 2α-methyl-11β,17α,21-trihydroxy - 4 - pregnene - 3,20-dione, (2) 6α-fluoromethyl-16α - methyl - 11β,17α,21 - trihydroxy - 4 - pregnene-3,20-dione and (3) 6α-fluoromethyl-16β-methyl-11β,17α, 21-trihydroxy-4-pregnene - 3,20 - dione as starting compounds, there are thus produced, respectively, the corresponding 21-acetates and other 21-acylates thereof as named in Example 7.

EXAMPLE 13

6-fluoromethyl - 11β,17α,21 - trihydroxy - 4,6 - pregnadiene - 3,20 - dione 21-acetate (XIII)

6α - fluoromethyl - 11β,17α,21 - trihydroxy - 4 - pregnene-3,20-dione 21-acetate (XII′), recrystallized chloranil and tertiary amyl alcohol were heated to boiling under nitrogen and refluxed for about 6 hours. The reaction mixture was cooled, evaporated to dryness; the residue (with the exception of chloranil, which is insoluble) dissolved in ether and filtered. The ether filtrate was washed twice with cold 2% sodium hydroxide, cold water, saturated sodium chloride solution, dried over sodium sulfate and evaporated to dryness. The residue crystallized readily from cold acetone to give 6-fluoromethyl-11β,17α,21-trihydroxy-4,6-pregnadiene-3,20-dione 21-acetate (XIII).

The esters thus obtained can be hydrolyzed with potassium carbonate in methanol or ethanol at room temperature in an atmosphere of nitrogen to yield 6-fluoromethyl-11β,17α,21-trihydroxy-4,6-pregnadiene-3,20 - dione. The triol can be reesterified to form the 21-acylate desired by by reacting at room temperature in pyridine with the anhydride or acyl halide of an organic carboxylic acid as disclosed in the paragraph following Example 7.

In the same manner as in Example 13, substitution of 6α-fluoromethyl-11β,17α,21-trihydroxy-4-pregnene - 3,20-dione as the starting compound is productive of 6-fluoromethyl-11β,17α,21-trihydroxy-4,6-pregnadiene-3,20-dione.

Similarly, substituting as the starting steroid, another 21-acylate of 6α - fluoromethyl-11β,17α,21-trihydroxy-4-pregnene-3,20-dione for the 21-acetate employed in the 6-dehydrogenation reaction described in Example 13, wherein the acyl radical is, e.g., that of an acid named in the paragraph following Example 7, there is thus produced the corresponding 21-acylate of 6-fluoromethyl-11β,17α,21-trihydroxy-4,6-pregnadiene-3,20-dione.

Following the procedure of Example 13, but substituting 6α - fluoromethyl-2α-methyl-11β,17α,21-trihydroxy-4-pregnene-3,20-dione 21-acetate, 6α - fluoromethyl - 16α-methyl-11β,17α,21-trihydroxy-4-pregnene-3,20 - dione 21- acetate and 6α-fluoromethyl-16β-methyl-11β,17α,21-trihydroxy-4-pregnene-3,20-dione 21-acetate as starting compounds, there are thus produced the corresponding 4,6-pregnadiene 21-acetates (XIII).

Similarly, substituting other 21-acylates instead of the 21-acetates employed as starting compounds in the preceding paragraph, there are thus produced the corresponding 4,6-pregnadiene 21-acylates.

EXAMPLE 14

6 - fluoromethyl - 11β,17α,21 - trihydroxy - 1,4,6 - pregnatriene-3,20-dione 21-acetate (X)

A medium consisting of 1% dextrose hydrate, 2% cornsteep liquor of 60% solids and tap water was adjusted to pH 4.9 with sodium hydroxide. The medium was steam sterilized at 15 pounds pressure for 30 minutes, cooled, and then inoculated with a 24-hour growth, from spores, of Septomyxa affinis, ATCC 6737. The medium was agitated, and sparged with sterile air at the rate of one-tenth volume of air per volume of medium per minute. At the end of 24 hours of fermentation at room temperature, the pH was about 7.4. To this culture there was added a solution of 6α-fluoromethyl-11β,17α,21-trihydroxy-4,6-pregnadiene-3,20-dione 21-acetate (XIII) dissolved in a minimal amount of dimethylformamide. The solution was prepared by dissolving five parts of the steroid in 100 parts of the solvent and adding about 10 cc. of the solution per liter of the medium. Fermentation was continued for a period of 48 hours whereupon the mycelium and beer were extracted thoroughly with methylene chloride. The extract was washed with sodium bicarbonate solution and then with water, dried and concentrated in vacuo to give 6-fluoromethyl-11β,17α,21-trihydroxy-1,4,6 - pregnatriene - 3,20-dione.

6 - fluoromethyl - 11β,17α,21 - trihydroxy - 1,4,6 - pregnatriene-3,20-dione dissolved in pyridine and acetic anhydride was heated at 40° C. for about 4 hours. The reaction mixture was cooled, diluted with water and the precipitate that formed removed by filtration. The precipitate was washed with water and dried to give 6α-fluoromethyl - 11β,17α,21 - trihydroxy - 1,4,6 - pregnatriene-3,20-dione 21-acetate (X).

Carrying out the procedure of the method disclosed in Example 7 for the preparation of 21-acylates in addition to the 21-acetate, but substituting 6-fluoromethyl-11β,17α,21 - trihydroxy - 1,4,6 - pregnatriene - 3,20-dione as starting compound, there is thus produced the corresponding 6 - fluoromethyl - 11β,17α,21 - trihydroxy-1,4,6-pregnatriene 21-acylates.

Following the procedure of Example 14, but substituting 6-fluoromethyl-2α-methyl-11β,17α,21-trihydroxy-4,6-pregnadiene-3,20-dione 21-acetate, 6-fluoromethyl - 16α-methyl - 11β,17α,21 - trihydroxy - 4,6 - pregnadiene-3,20-dione 21-acetate and 6-fluoromethyl-16β-methyl-11β,17α,21-trihydroxy-4,6-pregnadiene - 3,20 - dione as starting compounds, there are thus produced the corresponding 21-hydroxy-1,4,6-pregnatrienes. These 21-hydroxy compounds can be converted to their 21-acetates by heating with pyridine and acetic anhydride at about 40° C. for a period of about 4 hours. The alcohols can be reesterified to form 21-acylates in addition to 21-acetates by reacting them at approximately 40° C. in pyridine with the desired anhydride of an organic carboxylic acid named in the paragraph following Example 7.

EXAMPLE 15

6α - fluoromethyl - 11β,17α-21-trihydroxy-1,4-pregnadiene-3,20-dione 21-acetate (IX')

Following the procedures of Example 14, but substituting the corresponding 4-pregnene compounds (XII') for 4,6-pregnadienes (XIII) as starting steroids, there are thus produced the respective 1,4-pregnadienes, e.g., 6α-fluoromethyl - 11β,17α,21 - trihydroxy - 1,4 - pregnadiene-3,20-dione 21-acetate and 6α-fluoromethyl-2-methyl-11β,17α,21-trihydroxy-1,4-pregnadiene-3,20-dione 21 - acetate (IX') instead of 6-fluoromethyl-11β,17α,21-trihydroxy-1,4,6-pregnatriene-3,20-dione 21-acetate and 6 - fluoromethyl-2-methyl-11β,17α,21-trihydroxy - 1,4,6 - pregnatriene-3,20-dione 21-acetate (X).

EXAMPLE 16

6α-fluoromethyl-17α,21-dihydroxy-4-pregnene-3,11,20-trione 21-acetate (XV)

To a solution of 6α- fluoromethyl-11β,17α,21-trihydroxy-4-pregnene-3,20-dione 21-acetate (XII' and XIV), and pyridine in tertiary butanol was added N-bromoacetamide. The reaction mixture was maintained at room temperature for a period of about 16 hours, diluted with water containing about 1% sodium sulfite and the mixture concentrated under reduced pressure to a small volume. The distillation residue was refrigerated, filtered, the filter cake washed with water and dried. It consisted of 6α-fluoromethyl-17α,21-dihydroxy-4-pregnene-3,11,20-trione 21-acetate (XV).

Following the procedure of Example 16, but substituting 6α - fluoromethyl-2α-methyl-11β,17α,21-trihydroxy-4-pregnene - 3,20 - dione 21-acetate, 6α-fluoromethyl-16α-methyl-11β,17α,21-trihydroxy-3,20-dione 21-acetate and 6α - fluoromethyl-16β-methyl-11β,17α,21-trihydroxy-3,20-dione 21-acetate as starting steroids, there is thus produced the corresponding 11-keto analogues (XV).

EXAMPLE 17

6α-fluoromethyl-17α,21-dihydroxy-1,4-pregnadiene-3,11,20-trione 21-acetate (XV)

Following the procedures of Example 16, but substituting the corresponding 1,4-pregnadienes (IX') for 4- pregnenes (XII') as starting steroids, there are thus produced the respective 1,4-pregnadienes, e.g., 6α-fluoromethyl-17α,21-dihydroxy-1,4-pregnadiene - 3,11,20 - trione 21-acetate and 6α-fluoromethyl-2-methyl-17α,21-dihydroxy-1,4-pregnadiene-3,11,20-trione 21-acetate (XV) instead of 6α-fluoromethyl - 17α,21 - dihydroxy - 4 - pregnene-3,11,20-trione 21-acetate and 6α-fluoromethyl-2α-methyl-17α,21-dihydroxy-4-pregnene-3,11,20-trione 21-acetate (XV).

EXAMPLE 18

6-fluoromethyl-17α,21-dihydroxy-4,6-pregnadiene-3,11,20-trione 21-acetate (XV)

Following the procedure of Example 16, but substituting the corresponding 4,6-pregnadienes (XIII) for 4-pregnenes (XII') as starting steroids, there are thus produced the respective 4,6-pregnadienes, e.g., 6-fluoromethyl-17α,21-dihydroxy - 4,6 - pregnadiene-3,11,20-trione 21-acetate and 6-fluoromethyl-2α-methyl-17α,21-dihydroxy-4,6-pregnadiene-3,11,20-trione 21-acetate (XV) instead of 6α-fluoromethyl-17α,21-dihydroxy - 4 - pregnene-3,11,20-trione 21-acetate and 6α-fluoromethyl-2α-methyl-17α,21-dihydroxy-4-pregnene-3,11,20-trione 21-acetate (XV).

EXAMPLE 19

6-fluoromethyl-17α,21-dihydroxy-1,4,6-pregnatriene-3,11,20-trione 21-acetate (XV)

Following the procedure of Example 16, but substituting the corresponding 1,4,6-pregnatrienes (X) for 4-pregnenes (XII') as starting steroids, there are thus produced the respective 1,4,6-pregnatrienes, e.g., 6-fluoromethyl-17α,21-dihydroxy - 1,4,6 - pregnatriene - 3,11,20-trione 21-acetate and 6-fluoromethyl-2-methyl-17α,21-dihydroxy-1,4,6-pregnatriene - 3,11,20 - trione 21 - acetate (XV) instead of 6α-fluoromethyl - 17α,21 - dihydroxy-4-pregnene-3,11,20-trione 21-acetate and 6α-fluoromethyl-2α-methyl-17α,21-dihydroxy - 4 - pregnene-3,11,20-trione 21-acetate (XV).

EXAMPLE 20

*6α-fluoromethyl-17α,21-dihydroxy-4,9(11)-pregnadiene-3,20-dione 21-acetate (XVI)*

To a solution of 1.0 g. of 6α-fluoromethyl-11β,17α,21-trihydroxy-4-pregnene-3,20-dione 21-acetate (XII′ and XIV) in 30 ml. of pyridine was added 0.6 g. of N-bromoacetamide. After standing at room temperature for a period of 15 minutes, the reaction solution was cooled to 5 to 10° C. and sulfur dioxide gas was passed over the surface of the solution while shaking the flask, until the solution gave no color with acidified starch-iodide paper. During the addition of the sulfur dioxide, the reaction mixture became warm. The temperature was kept under 30° C. by external cooling and by varying the rate of sulfur dioxide addition. Thereafter ice water was added to the reaction mixture and the resulting precipitate collected by filtration. This material was recrystallized from acetone-Skellysolve B hexanes to give 6α-fluoromethyl-17α,21-dihydroxy-4,9(11)-pregnadiene-3,20-dione 21-acetate (XVI).

Following the procedure of Example 20, but substituting 6α-fluoromethyl-2α-methyl-11β,17α,21-trihydroxy-4-pregnene-3,20-dione 21-acetate, 6α-fluoromethyl-16α-methyl-11β,17α,21-trihydroxy-4-pregnene-3,20-dione 21-acetate and 6α-fluoromethyl-16β-methyl-11β,17α,21-trihydroxy-4-pregnene-3,20-dione 21-acetate as starting steroids, there are thus produced, respectively, as light-colored crystalline solids the corresponding 6α-fluoromethyl-2α-methyl-17α,21-dihydroxy-4,9(11)-pregnadiene-3,20-dione 21-acetate (XVI), 6α-fluoromethyl-16α-methyl-17α,21-dihydroxy-4,9(11)-pregnadiene-3,20-dione 21-acetate (XVI) and 6α-fluoromethyl-16β-methyl-17α,21-dihydroxy-3,20-dione 21-acetate (XVI).

EXAMPLE 21

*6α-fluoromethyl-17α,21-dihydroxy-1,4,9(11)-pregnatriene-3,20-dione 21-acetate (XVI)*

Following the procedure of Example 20, but substituting the corresponding 1,4-pregnadienes (IX′) for 4-pregnenes (XII′) as starting steroids, there are thus produced as light-colored crystalline solids the respective 1,4,9(11)-pregnatrienes, e.g., 6α-fluoromethyl-17α,21-dihydroxy-1,4,9(11)-pregnatriene-3,20-dione 21-acetate and 6α-fluoromethyl-2-methyl-17α,21-dihydroxy-1,4-9(11)-pregnatriene-3,20-dione 21-acetate (XVI) instead of 6α-fluoromethyl-17α,21-dihydroxy-4,9(11)-pregnadiene-3,20-dione 21-acetate and 6α-fluoromethyl-2α-methyl-17α,21-dihydroxy-4,9(11)-pregnadiene-3,20-dione 21-acetate (XVI).

EXAMPLE 22

*6α-fluoromethyl-17α,21-dihydroxy-4,6,9(11)-pregnatriene-3,20-dione 21-acetate (XVI)*

Following the procedure of Example 20, but substituting the corresponding 4,6-pregnadienes (XIII) for 4-pregnenes (XII′) as starting steroids, there are thus produced the respective 4,6,9(11)-pregnatrienes, e.g., 6-fluoromethyl-17α,21-dihydroxy-4,6,9-(11)-pregnatrienes, e.g., 6-fluoromethyl-17α,21-dihydroxy-4,6,9(11)-pregnatriene-3,20-dione 21-acetate and 6-fluoromethyl-2α-methyl-17α,21-dihydroxy-4,6,9(11)-pregnatriene-3,20-dione 21-acetate (XVI) instead of 6α-fluoromethyl-17α,21-dihydroxy-4,9(11)-pregnadiene-3,20-dione 21-acetate and 6α-fluoromethyl-2α-methyl-17α,21-dihydroxy-4,9(11)-pregnadiene-3,20-dione 21-acetate (XVI).

EXAMPLE 23

*6-fluoromethyl-17α,12-dihydroxy-1,4,6,9(11)-pregnatetraene-3,20-dione 21-acetate (XVI)*

Following the procedure of Example 20, but substituting the corresponding 1,4,6-pregnatrienes (X) for 4-pregnenes (XII′) as starting steroids, there are thus produced the respective 1,4,6,9(11)-pregnatetraenes, e.g., 6-fluoromethyl 17α,21-dihydroxy-1,4,6,9(11)-pregnatetraene-3,20-dione 21-acetate and 6-fluoromethyl-2-methyl-17α, 21-dihydroxyl-1,4,6,9(11)-pregnatetraene-3,20-dione 21-acetate (XVI) instead of 6α-fluoromethyl-17α,21-dihydroxy-4,9(11)-pregnadiene-3,20-dione 21-acetate and 6α-fluoromethyl-2α-methyl-17α,21-dihydroxy-4,9(11)-pregnadiene-3,20-dione 21-acetate (XVI).

Substituting for the 21-acetates of the starting steroids of Examples 20, 21, 22 and 23 other 21-acylates wherein the acyl radical is that of an acid named in the paragraph following Example 7, as the starting compound in the dehydration reaction described in Example 20, there are thus produced the corresponding 21-acylates instead of the 21-acetates of the 4,9(11)-pregnadienes, 1,4,9(11)-pregnatrienes, 4,6,9(11)-pregnatrienes and 1,4,6,9(11)-pregnatetraenes prepared in Examples 20, 21, 22 and 23.

EXAMPLE 24

*6α-fluoromethyl-11β, 17α,21-trihydroxy-9α-bromo-4-pregnene-3,20-dione 21-acetate (XVII)*

To a solution of 6.0 g. of 6α-fluoromethyl-17α,21-dihydroxy-4,9(11)-pregnadiene-3,20-dione 21-acetate (XVI) in 100 ml. of methylene chloride and 200 ml. tertiary butyl alcohol was added a solution of 14 ml. of 72% perchloric acid in 100 ml. of water followed by a solution of 2.5 g. of N-bromoacetamide in 60 ml. of tertiary butyl alcohol. After stirring the reaction mixture for 15 minutes, a solution of 3.0 g. of sodium sulfite in 150 ml. of water was added and the reaction mixture was concentrated to a small volume under reduced pressure at about 50° C. The concentrate was cooled in an ice bath and while stirring an equal volume of water was added. After stirring for a period of 1 hour, the precipitated product was isolated by filtration, and the cake washed with water and air-dried to give 6α-fluoromethyl-11β,17α,21-trihydroxy-9α-bromo-4-pregnene-3,20-dione 21-acetate (XVII).

Following the procedure of Example 24, but substituting 6α-fluoromethyl-2α-methyl-17α,21-dihydroxy-4,9(11)-pregnadiene-3,20-dione 21-acetate, 6α-fluoromethyl-16α-methyl-17α,21-dihydroxy-4,9(11)-pregnadiene-3,20-dione 21-acetate and 6α-fluoromethyl-17β-methyl-17α,21-dihydroxy-4,9(11)-pregnadiene-3,20-dione 21-acetate as starting steroids, there are thus produced, respectively, the corresponding 6α-fluoromethyl-2α-methyl-11β,17α,21-trihydroxy-9α-bromo-4-pregnene-3,20-dione 21-acetate, 6α-fluoromethyl-16α-methyl-11β,17α-21-trihydroxy-9α-bromo-4-pregnene-3,20-dione 21-acetate and 6α-fluoromethyl-16β-methyl-11β,17α,21-trihydroxy-9α-bromo-4-pregnene-3,20-dione 21-acetate (XVII).

EXAMPLE 25

*6α-fluoromethyl-11β,17α,21-trihydroxy-9α-bromo-1,4-pregnadiene-3,20-dione 21-acetate (XVII)*

Following the procedure of Example 24, but substituting the corresponding 1,4,9(11)-pregnatrienes for 4,9(11)-pregnadienes as starting compounds, there are thus produced the respective 9α-bromo-1,4-pregnadienes, e.g., 6α-fluoromethyl-11β,17α,21-trihydroxy-9α-bromo-1,4-pregnadiene-3,20-dione 21-acetate and 6α-fluoromethyl-2-methyl-11β,17α,21-trihydroxy-9α-bromo-1,4-pregnadiene-3,20-dione 21-acetate (XVII) instead of 6α-fluoromethyl-11β,17α,21-trihydroxy-9α-bromo-4-pregnene-3,20-dione 21-acetate and 6α-fluoromethyl-2α-methyl-11β,17α,21-trihydroxy-9α-bromo-4-pregnene-3,20-dione 21-acetate (XVII).

EXAMPLE 26

*6α-fluoro-11β,17α,21-trihydroxy-9α-bromo-4,6-pregnadiene-3,20-dione 21-acetate (XVII)*

Following the procedure of Example 24, but substituting the corresponding 4,6,9(11)-pregnatrienes for 4,9(11)-pregnadienes as starting compounds, there are thus produced the respective 9α-bromo-4,6-pregnadienes, e.g., 6-fluoromethyl-11β,17α,21-trihydroxy-9α-bromo- 4,6-pregnadiene-3,20-dione 21-acetate and 6-fluoromethyl-2α-methyl - 11β,17α,21 - trihydroxy-9α-bromo-4,6-pregnadiene-3,20-dione 21-acetate (XVII) instead of 6α-fluoromethyl - 11β,17α,21 - trihydroxy-9α-bromo-4-pregnene-3,20-dione 21-acetate and 6α-fluoromethyl-2α-methyl-11β,17α,21 - trihydroxy - 9α - bromo-4-pregnene-3,20-dione 21-acetate (XVII).

EXAMPLE 27

*6α-fluoromethyl-11β,17α,21-trihydroxy-9α-bromo-1,4,6-pregnatriene-3,20-dione 21-acetate* (XVII)

Following the procedure of Example 24, but substituting the corresponding 1,4,6,9(11)-pregnatetraenes for 4,9(11)-pregnadienes as starting compounds, there are thus produced the respective 9α-bromo-4,6-pregnatrienes, e.g., 6-fluoromethyl-11β,17α,21-trihydroxy-9α,bromo-1,4,6-pregnatriene-3,20-dione 21-acetate and 6-fluoromethyl-2 - methyl - 11β,17α,21 - trihydroxy - 9α - bromo,1,4,6,pregnatriene-3,20-dione 21-acetate (XVII) instead of 6α - fluoromethyl - 11β,17α,21 - trihydroxy - 9α-bromo-4-pregnene-3,20-dione 21-acetate and 6α-fluoromethyl-2α-methyl-11β,17α,21-trihydroxy-9αα-bromo-4-pregnene 21-acetate (XVII).

Substituting for the 21-acetates of the starting steroids of Examples 24, 25, 26 and 27 other 21-acylates wherein the acyl radical is that of an acid named in the paragraph following Example 7, as the starting compounds in the bromination reaction described in Example 24, there are thus produced the corresponding 21-acylates instead of the 21-acetates of the 9α-bromo-4-pregnenes, 9α-bromo-1,4-pregnadienes, 9α-bromo-4,6-pregnadienes and 9α-bromo-1,4,6-pregnatrienes prepared in Examples 24, 25, 26 and 27.

Substituting N-chlorosuccinimide for the N-bromoacetamide in the reactions described in Examples 24, 25, 26 and 27 is productive of the corresponding 9α-chloro compounds, .eg., 6α-fluoromethyl-11β,17α,21-trihydroxy-9α-chloro-4-pregnene-3,20-dione 21-acetate, 6α-fluoromethyl - 11β,17α,21 - trihydroxy-9α,-chloro-1,4-pregnadiene-3,20-dione 21-acetate, 6-fluoromethyl-11β,17α,21-trihydroxy-9α-chloro-4,6-pregnadiene-3,20-dione 21-acetate, 6-fluoromethyl-11β,17α,21-trihydroxy-9α-chloro-1,4,6-pregnatriene-3,20-dione 21-acetate and the 2α-methyl, 16α-methyl and 16β-methyl derivatives of these compounds.

EXAMPLE 28

*6α-fluoromethyl-9β,11β-epoxy-17α,21-dihydroxy-4-pregnene-3,20-dione 21-acetate* (XVIII)

To a solution of 7.0 g. of 6α-fluoromethyl-11β,17α,21-trihydroxy-9α-bromo-4-pregnene-3,20-dione 21-acetate in 200 ml. of acetone was added 7.0 g. of potassium acetate and the resulting suspension was heated under reflux for a period of about 17 hours. The mixture was then concentrated to a small volume at reduced pressure on the steam bath, diluted with water and extracted with methylene chloride. The methylene chloride extracts were combined, washed with water, dried over anhydrous sodium sulfate and evaporated. The residue was redissolved in methylene chloride and chromatographed over Florisil synthetic magnesium silicate. The column was eluted with hexanes (Skellysolve B) containing increasing proportions of acetone. There was thus eluted 6α-fluoromethyl - 9β,11β - epoxy - 17α,21-dihydroxy-4-pregnene-3,20-dione 21-acetate (XVIII) which was freed of solvent by evaporation of the eluates.

Following the procedure of Example 28, but substituting 6α - fluoromethyl - 2α - methyl-11β,17α,21-trihydroxy-9α-bromo-4-pregnene-3,20-dione 21-acetate, 6α-fluoromethyl - 16α - methyl - 11β,17α,21 - trihydroxy-9α-bromo-4-pregnene-3,20-dione 21-acetate and 6α-fluoromethyl - 16β - methyl - 11β,17α,21-trihydroxy-9α-bromo-4-pregnene-3,20-dione 21-acetate as starting compounds, there are thus produced, respectively, the corresponding 6α - fluoromethyl - 2α-methyl-9β,11β-epoxy-17α,21-dihydroxy-4-pregnene-3,20-dione 21-acetate, 6α-fluoromethyl-16α - methyl - 9β,11β - epoxy,17α,21-dihydroxy-4-pregnene-3,20-dione 21-acetate and 6α-fluoromethyl-16β-methyl - 9β,11β - epoxy-17α,21-dihydroxy-4-pregnene-3,20-dione 21-acetate (XVIII).

EXAMPLE 29

*6α-fluoromethyl-9β,11β-epoxy,17α,21-dihydroxy-1,4-pregnadiene-3,20-dione 21-acetate* (XVIII)

Following the procedure of Example 28, but substituting the corresponding 9α-bromo-1,4-pregnadienes for 9α-bromo-4-pregnenes as starting compounds, there are thus produced the respective 9β,11β-epoxy-1,4-pregnadienes, e.g., 6α - fluoromethyl - 9β,11β-epoxy-17α,21-dihydroxy-1,4-pregnadiene-3,20-dione 21-acetate and 6α-fluoromethyl-2 - methyl - 9β,11β-epoxy-17α,21-dihydroxy-1,4-pregnadiene-3,20-dione 21-acetate (XVIII) instead of 6α-fluoromethyl - 9β,11β-epoxy-17α,21-dihydroxy-4-pregnene-3,20-dione 21-acetate and 6α-fluoromethyl-2α-methyl-17α,21-dihydroxy-4-pregnene-3,20-dione 21-acetate (XVIII).

EXAMPLE 30

*6α-fluoromethyl-9β,11β-epoxy-17α,21-dihydroxy-4,6-pregnadiene-3,20-dione 21-acetate* (XVIII)

Following the procedure of Example 28, but substituting the corresponding 9α-bromo-4,6-pregnadienes for 9α-bromo-4-pregnenes as starting compounds, there are thus produced the respective 9β,11β-epoxy-4,6-pregnadienes, e.g., 6-fluoromethyl-9β,11β-epoxy-17α,21-dihydroxy-4,6-pregnadiene-3,20-dione 21-acetate and 6-fluoromethyl-2α-methyl-9β,11β-epoxy-4,6-pregnadiene-3,20-dione 21-acetate (XVIII) instead of 6α-fluoromethyl-9β,11β-epoxy-4-pregnene-3,20-dione 21-acetate and 6α-fluoromethyl-2α-methyl - 9β,11β - epoxy-4-pregnene-3,20-dione 21-acetate (XVIII).

EXAMPLE 31

*6-fluoromethyl-9β,11β-epoxy-17α,21-dihydroxy-1,4,6-pregnatriene-3,20-dione 21-acetate* (XVIII)

Following the procedure of Example 28, but substituting the corresponding 9α-bromo-1,4,6-pregnatrienes for 9α-bromo-4-pregnenes as starting compounds, there are thus produced the respective 9β,11β-epoxy-1,4,6-pregnatrienes, e.g., 6 - fluoromethyl - 9β,11β-epoxy,17α,21-dihydroxy - 1,4,6 - pregnatriene - 3,20-dione 21-acetate and 6-fluoromethyl - 2-methyl-9β,11β-epoxy-1,4,6-pregnatriene-3,20-dione 21-acetate (XVIII) instead of 6α-fluoromethyl - 9β,11β-epoxy-17α,21-dihydroxy-4-pregnene-3,20-dione 21-acetate and 6α-fluoromethyl-2α-methyl-9β,11β-epoxy-17α,21-dihydroxy-4-pregnene-3,20-dione 21-acetate (XVIII).

Substituting for the 21-acetates of the starting steroids of Examples 28, 29, 30 and 31 other 21-acylates wherein the acyl radical is that of an acid named in the paragraph following Example 7, as the starting compounds in the epoxidation reaction described in Example 28, there are thus produced the corresponding 21-acylates instead of the 21-acetates of the 9β,11β-epoxy-4-pregnenes, 9β,11β-epoxy-1,4 - pregnadienes, 9β,11β-epoxy-4,6-pregnadienes and 9β,11β-epoxy-1,4,6-pregnatrienes prepared in Examples 28, 29, 30 and 31.

EXAMPLE 32

*6α-fluoromethyl-11β,17α,21-trihydroxy-9α-fluoro-1,4-pregnadiene-3,20-dione 21-acetate* (XIX)

To approximately 1.3 g. of hydrogen fluoride contained in a polyethylene bottle and maintained at minus 60° C. was added 2.3 ml. of tetrahydrofuran and then a solution of 500 mg. of 6α-fluoromethyl-9β,11β-epoxy-17α,21-dihydroxy-4-pregnene-3,20-dione 21-acetate (XVIII) in 2 ml. of methylene chloride. The steroid solution was rinsed in with an additional 1 ml. of methylene chloride. The light-red colored solution was then kept at approximately minus 30° C. for about 1 hour and at plus 5° C. for about 18 hours. At the end of this period it was mixed cautiously with an excess of cold sodium bicarbonate solution and the organic material extracted with the aid of additional methylene chloride. The combined extracts were washed with water, dried over anhydrous sodium sulfate and concentrated to a small volume. The solution was chromatographed over Florisil anhydrous magnesium silicate. The column was developed with hexanes (Skellysolve B) containing increasing proportions of acetone. There was thus eluted 6α-fluoromethyl-11β,17α,21 - trihydroxy-9α-fluoro-1,4-pregnadiene-3,20-dione 21-acetate (XIX) which was freed of solvent by evaporation of the eluate fractions and purified by recrystallization from acetone:Skellysolve B to give material with a melting point of 215–217° C.

Anal.—Calcd. for $C_{24}H_{30}F_2O_6$: F. 8.41. Found: F, 8.47.

Following the procedure of Example 32, but substituting 6α-fluoromethyl-2-methyl-9β,11β-epoxy-17α,21-dihydroxy-1,4-pregnadiene-3,20-dione 21-acetate, 6α-fluoromethyl - 16α - methyl-9β,11β-epoxy-1,4-pregnadiene-3,20-dione 21-acetate and 6α-fluoromethyl-16β-methyl-9β,11β-epoxy-1,4-pregnadiene-3,20-dione 21-acetate as starting compounds, there are thus produced, respectively, as light-colored crystalline solids the corresponding 6α-fluoromethyl - 2 - methyl - 11β,17α,21-trihydroxy-9α-fluoro-1,4-pregnadiene-3,20-dione 21-acetate, 6α-fluoromethyl-16α-methyl - 11β,17α,21-trihydroxy-9α-fluoro-1,4-pregnadiene-3,20-dione 21-acetate and 6α-fluoromethyl-16β-methyl-11β,17α,21 - trihydroxy - 9α-fluoro-1,4-pregnadiene-3,20-dione 21-acetate (XIX).

Example 33

*6α - fluoromethyl - 2α - methyl-11β,17α,21-trihydroxy-9α-fluoro-4-pregnene-3,20-dione 21-hemisuccinate, sodium salt (XIX)*

(a) To 6α-fluoromethyl-2α-methyl-11β,17α,21-trihydroxy-9α-fluoro-4-pregnene-3,20-dione 21-acetate (obtained in the manner described in Example 32) dissolved in methanol and a small amount of water, previously purged of air and oxygen by passing nitrogen through it, was added solid potassium carbonate. The mixture was allowed to stand at room temperature for a period of about 6 hours in a nitrogen atmosphere, then neutralized with 5% aqueous hydrochloric acid solution, diluted with water and refrigerated. The mixture was filtered and the solids recrystallized from acetone:Skellysolve B hexanes to yield pure 6α-fluoromethyl-2α-methyl-11β,17α,21-trihydroxy-9α-fluoro-4-pregnene-3,20-dione.

(b) A solution was prepared containing excess succinic anhydride and 6α - fluoromethyl-2α-methyl - 9α - fluoro-11β,17α,21-trihydroxy-4-pregnene-3,20-dione in pyridine. The solution was allowed to stand for about 20 hours, diluted with water and the mixture refrigerated and filtered. The precipitate collected on the filter was recrystalized twice from methanol to yield 6α-fluoromethyl-2α-methyl-9α-fluoro - 11β,17α,21 - trihydroxy - 4 - pregnene-3,20-dione 21-hemisuccinate (XIX).

(c) 0.1 Normal sodium hydroxide solution was slowly added to a stirred solution of 6α-fluoromethyl-2α-methyl-11β,17α,21-trihydroxy-9α-fluoro - 4 - pregnene-3,20-dione 21-hemisuccinate dissolved in acetone, until the pH rose to about 7.4. During the addition of sodium hydroxide solution a small amount of water was also added. The solution was concentrated at room temperature under vacuum to remove the acetone. The aqueous solution was filtered, freeze-dried and recrystallized to give pure 6α-fluoromethyl-2α - methyl - 11β,17α,21 - trihydroxy-9α-fluoro - 4 - pregnene - 3,20-dione-21-hemisuccinate, sodium salt (XIX).

Example 34

*6α-fluoromethyl-11β,17α,21-trihydroxy-9α-fluoro-4-pregnene-3,20-dione 21-acetate (XIX)*

Following the procedure of Example 32, but substituting the corresponding 9β,11β-epoxy - 4 - pregnenes for 9β,11β-epoxy-1,4-pregnadienes as starting compounds, there are thus produced as crystalline solids the respective 9α - fluoro - 4 - pregnenes, e.g., 6α - fluoromethyl-11β,17α,21-trihydroxy-9α-fluoro - 4 - pregnene-3,20-dione 21-acetate and 6α-fluoromethyl - 2α - methyl-9α-fluoro-4-pregnene-3,20-dione 21-acetate (XIX) instead of 6α-fluoromethyl-11β,17α,21-trihydroxy-9α-fluoro - 1,4 - pregnadiene-3,20-dione 21-acetate and 6α-fluoromethyl-2-methyl-11β,17α,21-trihydroxy - 9α - fluoro-1,4-pregnadiene-3,20-dione 21-acetate (XIX).

Example 35

*6α-fluoromethyl-11β,17α,21-trihydroxy-9α-fluoro-4,6-pregnadiene-3,20-dione 21-acetate (XIX)*

Following the procedure of Example 32, but substituting the corresponding 9β,11β-epoxy-4,6-pregnadienes for 9β,11β-epoxy-4-pregnenes as starting compounds, there are thus produced the respective 9α-fluoro-4,6-pregnadienes, e.g., 6 - fluoromethyl - 11β,17α,21 - trihydroxy-9α-fluoro-4,6-pregnadiene-3,20-dione 21-acetate and 6-fluoromethyl-2α-methyl - 11β,17α,21 - trihydroxy-9α-fluoro-4,6-pregnadiene-3,20-dione 21-acetate (XIX) instead of 6α-fluoromethyl-11β,17α,21-trihydroxy - 9α - fluoro - 4 - pregnene-3,20-dione 21-acetate and 6α-fluoromethyl-2α-methyl-11β,17α,21 - trihydroxy - 9α - fluoro - 4 - pregnene-3,20-dione 21-acetate (XIX).

Example 36

*6-fluoromethyl-11β,17α,21-trihydroxy-9α-fluoro-1,4,6-pregnatriene-3,20-dione 21-acetate (XIX)*

Following the procedure of Example 32, but substituting the corresponding 9β,11β-epoxy-1,4,6-pregnatrienes for 9β,11β-epoxy-4-pregnenes as starting compounds, there are thus produced the respective 9α-fluoro-1,4,6-pregnatrienes, e.g., 6-fluoromethyl-11β,17α,21-trihydroxy-9α-fluoro-1,4,6-pregnatriene-3,20-dione 21-acetate and 6-fluoromethyl-2-methyl-11β,17α,21 - trihydroxy-9α-fluoro-1,4,6-pregnatriene-3,20-dione 21-acetate (XIX) instead of 6α-fluoromethyl - 11β,17α,21 - trihydroxy-9α-fluoro-4-pregnene-3,20-dione 21-acetate and 6α-fluoromethyl-2α-methyl-11β,17α,21 - trihydroxy - 9α - fluoro-4-pregnene-3,20-dione 21-acetate (XIX).

Substituting for the 21-acetates of the starting steroids of Examples 32, 34, 35 and 36 other 21-acylates wherein the acyl radical is that of an acid named in the paragraph following Example 7, as the starting compounds in the 9α-fluorination reaction described in Example 32, there are thus produced the corresponding 21-acylates instead of the 21-acetates of the 9α-fluoro-4-pregnenes, 9α-fluoro-1,4-pregnadienes, 9α-fluoro-4,6-pregnadienes and 9α-fluoro-1,4,6-pregnatrienes prepared in Examples 32, 34, 35 and 36.

Example 37

*6α-fluoromethyl-17α,21-dihydroxy-9α-fluoro-4-pregnene-3,11,20-trione 21-acetate (XX)*

A solution was prepared containing 10 ml. of acetic acid, 0.5 g. of 6α-fluoromethyl-11β,17α,21-trihydroxy-9α-fluoro-4-pregnene-3,20-dione 21-acetate (XIX), 0.2 g. of chromic anhydride and a small amount of water. This mixture was shaken several times at room temperature and allowed to stand for about 4 hours. Thereafter it was poured into water and refrigerated for about 20 hours at approximately 5° C. The steroid which separated from the aqueous mixture was collected on filter paper and dried to give 6α-fluoromethyl-17α,21-dihydroxy-9α-fluoro-4-pregnene-3,11,20-trione 21-acetate (XX).

Following the procedure of Example 37, but substituting 6α fluoromethyl-2α-methyl-11β,17α,21-trihydroxy-9α- fluoro-4-pregnene-3,20-dione 21-acetate, 6α-fluoromethyl-16α-methyl-11β,17α,21 - trihydroxy-9α-fluoro-4-pregnene-3,20-dione 21-acetate and 6α-fluoromethyl-16β-methyl-11β,17α,21-trihydroxy-9α-fluoro - 4 - pregnene-3,20-dione 21-acetate as starting compounds, there are thus produced, respectively, the corresponding 6α-fluoromethyl-2α-methyl-17α,21-dihydroxy-9α-fluoro-4-pregnene - 3,11,20-trione 21-acetate, 6α-fluoromethyl-16α-methyl-17α,21-dihydroxy-9α-fluoro-4-pregnene-3,11,20-trione 21-acetate and 6α-fluoromethyl-16β-methyl-17α,21-dihydroxy - 9α - fluoro-4-pregnene-3,11,20-trione 21-acetate (XX).

EXAMPLE 38

*6α-fluoromethyl-17α,21-dihydroxy-9α-fluoro-1,4-pregnadiene-3,11,20-trione 12-acetate* (XX)

Following the procedure of Example 37, but substituting the corresponding 1,4-pregnadienes for 4-pregnenes as starting compounds, there are thus produced the respective 1,4-pregnadiene-3,11,20-triones, e.g., 6α-fluoromethyl - 17α,21 - dihydroxy - 9α - fluoro-1,4-pregnadiene-3,11,20-trione 21-acetate and 6α-fluoromethyl-2-methyl-17α,21-dihydroxy - 9α - fluoro - 1,4 - pregnadiene-3,11,20-trione 21-acetate (XX) instead of 6α-fluoromethyl-17α,21-dihydroxy-9α-fluoro-4-pregnene-3,11,20-trione 21-acetate and 6α-fluoromethyl-2α-methyl-17α,21-dihydroxy-9α-fluoro-4-pregnene-3,11,20-trione 21-acetate (XX).

EXAMPLE 39

*6α-fluoromethyl-17α,21-dihydroxy-9α-fluoro-4,6-pregnadiene-3,11,20-trione 12-acetate* (XX)

Following the procedure of Example 37, but substituting the corresponding 4,6-pregnadienes for 4-pregnenes as starting compounds, there are thus produced the respective 4,6-pregnadiene-3,11,20-triones, e.g., 6-fluoromethyl - 17α,21 - dihydroxy - 9α - fluoro-4,6-pregnadiene-3,11,20-trione 21-acetate and 6-fluoromethyl-2α-methyl-17α,21-dihydroxy-9α-fluoro - 4,6 - pregnadiene-3,11,20-trione 21-acetate (XX) instead of 6α-fluoromethyl-17α,21-dihydroxy-9α-fluoro-4-pregnene-3,11,20-trione 21-acetate and 6α-fluoromethyl-2α-methyl-17α,21-dihydroxy-9α-fluoro-4-pregnene-3,11,20-trione 21-acetate (XX).

EXAMPLE 40

*6-fluoromethyl-17α,21-dihydroxy-9α-fluoro-1,4,6-pregnatriene-3,11,20-trione 21-acetate* (XX)

Following the procedure of Example 37, but substituting the corresponding 1,4,6-pregnatrienes for 4-pregnenes as starting compounds, there are thus produced the respective 1,4,6-pregnatriene-3,11,20-triones, e.g., 6-fluoromethyl - 17α,21 - dihydroxy - 9α - fluoro - 1,4,6 - pregnatriene-3,11,20-trione 21-acetate and 6-fluoromethyl-2-methyl - 17α,21 - dihydroxy - 9α - fluoro - 1,4,6 - pregnatriene-3,11,20-trione 21-acetate (XX) instead of 6α-fluoromethyl - 17α,21 - dihydroxy - 9α - fluoro - 4 - pregnene-3,11,20-trione 21-acetate and 6α-fluoromethyl-2α-methyl-17α,21-dihydroxy-9α-fluoro-4-pregnene-3,11,20-trione 21-acetate (XX).

Substituting for the 21-acetates of the starting steriods of Examples 37, 38, 39 and 40 other 21-acylates wherein the acyl radical is that of an acid named in the paragraph following Example 7, as the starting compounds in the oxidation described in Example 37, there are thus produced the corresponding 21-acylates instead of the 21-acetates of the 4-pregnene-3,11,20-trione, 1,4-pregnadiene-3,11,20-triones, 4,6-pregnadiene-3,11,20-triones and 1,4,6-pregnatriene-3,11,20-triones prepared in Examples 37, 38, 39 and 40.

EXAMPLE 41

*6α-fluoromethyl-11β,17α,21-trihydroxy-9α-fluoro-4-pregnene-3,20-dione* (XXI)

Three grams of 6α-fluoromethyl-11β,17α,21-trihydroxy-9α-fluoro-4-pregnene-3,20-dione 21-acetate (XIX) was dissolved in 300 ml. of methanol, previously purged of air-oxygen by passing nitrogen through it for 10 minutes and thereto was added 25 ml. of 5% aqueous solution of potassium bicarbonate, similarly purged of oxygen. The mixture was allowed to stand at room temperature for a period of about 5 hours in a nitrogen atmosphere, thereupon neutralized with acetic acid in water. The mixture was concentrated to approximately one-third volume at reduced pressure on a 60° C. water bath. Thereupon water was added and the mixture chilled. The crystalline product was collected on a filter, washed with water and dried to give 6α-fluoromethyl-11β,17α,21-trihydroxy-9α-fluoro-4-pregnene-3,20-dione (XXI).

Following the procedure of Example 41, but substituting 6α-fluoromethyl-2α-methyl-11β,17α,21-trihydroxy-4-pregnene-3,20-dione 21-acetate, 6α-fluoromethyl-16α-methyl - 11β,17α,21 - trihydroxy - 9α - fluoro - 4 - pregnene-3,20-dione 21-acetate and 6α-fluoromethyl-16β-methyl - 11β,17α,21 - trihydroxy - 9α - fluoro - 4 - pregnene-3,20-dione 21-acetate (XIX) as starting compounds, there are thus produced, respectively, as light-colored crystalline solids 6α-fluoromethyl-2α-methyl-11β,17α,21-trihydroxy-9α-fluoro-4-pregnene-3,20 - dione, 6α - fluoromethyl - 16α - methyl - 11β,17α,21 - trihydroxy - 9α - fluoro-4-pregnene-3,20-dione and 6α-fluoromethyl-16β-methyl - 11β,17α,21 - trihydroxy - 9α - fluoro - 4 - pregnene-3,20-dione (XXI).

EXAMPLE 42

*6α-fluoromethyl-9α-fluoro-11β,17α,21-trihydroxy-1,4-pregnadiene-3,20-dione* (XXI)

Following the procedure of Example 41, but substituting the corresponding 1,4-pregnadienes for 4-pregnenes as starting compounds, there are thus produced the respective 1,4-pregnadiene-3,20-diones, e.g., 6α-fluoromethyl-11β,17α-21 - trihydroxy - 9α - fluoro - 1,4 - pregnadiene-3,20-dione and 6α-fluoromethyl-2-methyl-11β,17α,21-trihydroxy-9α-fluoro-1,4-pregnadiene-3,20-dione (XXI) instead of 6α-fluoromethyl-11β,17α,21-trihydroxy-9α-fluoro-4-pregnene-3,20-dione and 6α-fluoromethyl-2α-methyl-11β,17α,21 - trihydroxy - 9α - fluoro-4-pregnene-3,20-dione (XXI).

EXAMPLE 43

*6-fluoromethyl-11β,17α,21-trihydroxy-9α-fluoro-4,6-pregnadiene-3,20-dione* (XXI)

Following the procedure of Example 41, but substituting the corresponding 4,6-pregnadienes for 4-pregnenes as starting compounds, there are thus produced the respective 4,6-pregnadiene-3,20-diones, e.g., 6-fluoromethyl-11β,17α,21 - trihydroxy - 9α - fluoro - 4,6 - pregnadiene-3,20-dione and 6-fluoromethyl - 2α-methyl-11β,17α,21-trihydroxy-9α-fluoro-4,6-pregnadiene-3,20-dione (XXI) instead of 6α-fluoromethyl-11β,17α,21-trihydroxy-9α-fluoro-4-pregnene-3,20-dione and 6α - fluoromethyl-2α-methyl-11β,17α,21 - trihydroxy - 9α - fluoro-4-pregnene-3,20-dione (XXI).

EXAMPLE 44

*6-fluoromethyl-11β,17α,21-trihydroxy-9α-fluoro-1,4,6-pregnatriene-3,20-dione* (XXI)

Following the procedure of Example 41, but substituting the corresponding 1,4,6-pregnatrienes for 4-pregnenes as starting compounds, there are thus produced the respective 1,4,6-pregnatriene-3,20-diones, e.g., 6-fluoromethyl - 11β,17α,21 - trihydroxy - 9α - fluoro - 1,4,6 - pregnatriene-3,20-dione and 6-fluoromethyl-2-methyl-11β,17α, 21 - trihydroxy - 9α - fluoro - 1,4,6-pregnatriene-3,20-dione (XXI) instead of 6α-fluoromethyl-11β,17α,21-trihydroxy-9α-fluoro-4-pregnene-3,20-dione and 6α-fluoromethyl-2α-methyl - 11β,17α,21 - trihydroxy - 9α - fluoro - 4 - pregnene-3,20-dione (XXI).

Substituting for the 21-acetates of the starting steroids of Examples 41, 42, 43 and 44 other 21-acylates wherein the acyl radical is that of an acid named in the paragraph following Example 7, as the starting compounds in the hydrolysis described in Example 41, there are thus produced the 21-hydroxy compounds prepared in Examples 41, 42, 43 and 44.

The corresponding 9α-chloro compounds are similarly prepared by hydrolysis of their 21-acetates, e.g., 6α-fluoromethyl - 11β,17α,21 - trihydroxy - 9α - chloro - 4 - pregnene-3,20-dione 21-acetate, 6α-fluoromethyl-11β,17α,21-trihydroxy - 9α - chloro - 1,4 - pregnadiene - 3,20 - dione 21-acetate, 6 - fluoromethyl - 11β,17α,21 - trihydroxy - 9α-chloro-4,6-pregnadiene-3,20-dione 21-acetate and 6-fluoromethyl - 11β,17α,21 - trihydroxy - 9α - chloro - 1,4,6 - pregnatriene-3,20-dione 21-acetate are converted to their corresponding 21-hydroxy compounds.

Following the procedures of Examples 41, 42, 43 and 44, the corresponding 11-keto compounds represented by Formula XX are similarly hydrolyzed to their respective 21-hydroxy compounds.

EXAMPLE 45

*6α-fluoromethyl-11β,17α,21-trihydroxy-4-pregnene-3,20-dione 21-methanesulfonate (XXII)*

6α - fluoromethyl - 11β,17α,21 - trihydroxy - 4 - pregnene-3,20-dione (XII) (prepared as in Example 10) was dissolved in pyridine. This solution was cooled to 0° C. and treated with methanesulfonyl chloride. Thereafter the solution was allowed to stand at 0 to 5° C. for a period of about 2 hours, after which it was diluted with water and extracted with several portions of methylene chloride. The extracts were combined, washed with cold dilute hydrochloric acid until the aqueous layer had a pH of two to three, then washed again with cold sodium bicarbonate solution, water and finally dried over anhydrous sodium sulfate. Evaporation of the methylene chloride extract at reduced pressure left a residue of 6α - fluoromethyl - 11β,17α,21 - trihydroxy - 4 - pregnene-3,20-dione 21-methanesulfonate (XXII).

Following the procedure of Example 45, but substituting 6α-fluoromethyl-2α-methyl-11β,17α,21-trihydroxy-4-pregnene-3,20-dione, 6α-fluoromethyl-16α-methyl-11β,17α, 21-trihydroxy-4-pregnene-3,20-dione and 6α-fluoromethyl-16β-methyl-11β, 17α,21-trihydroxy-4-pregnene - 3,20-dione as starting compounds, there are thus produced, respectively, the corresponding 6α-fluoromethyl-2α-methyl-11β, 17α,21-trihydroxy-4-pregnene-3,20 - dione 21-methanesulfonate, 6α-fluoro-methyl-16α-methyl - 11β,17α,21 - trihydroxy-4-pregnene-3,20-dione 21-methanesulfonate and 6α-fluoromethyl-16β-methyl-11β,17α,21-trihydroxy - 4 - pregnene-3,20-dione 21-methanesulfonate.

The corresponding 9α-fluoro and 9α-chloro 21-methanesulfonates are similarly prepared by substituting 6α-fluoromethyl-9α-fluoro - 11β,17α,21 - trihydroxy - 4 - pregnene-3,20-dione and 6α-fluoromethyl-9α-chloro-11β,17α,21-trihydroxy-4-pregnene-3,20-dione as starting compounds.

EXAMPLE 46

*6α-floromethyl-11β,17α,21-trihydroxy-1,4-pregnadiene-3,20-dione 21-methanesulfonate (XXII)*

Following the procedure of Example 45, but substituting the corresponding 1,4-pregnadienes (IX) (prepared as in Example 6) for 4-pregnenes as starting compounds, there are thus produced the respective 1,4-pregnadiene-21-methanesulfonate, e.g., 6α-fluoromethyl-11β,17α,21-trihydroxy-1,4-pregnadiene-3,20-dione 21-methanesulfonate and 6α-fluoromethyl-2-methyl-11β,17α,21-trihydroxy-1,4-pregnadiene-3,20-dione 21-methanesulfonate (XXII) instead of 6α-fluoromethyl-11β,17α,21-trihydroxy - 4 - pregnene-3,20-dione 21-methanesulfonate and 6α-fluoromethyl-2α-methyl-11β,17α,21-trihydroxy-4-pregnene - 3,20-dione 21-sulfonate (XXII).

The corresponding 9α-fluoro and 9α-chloro 21-methanesulfonates are similarly prepared by substituting 6α-fluoromethyl-9α-fluoro-11β,17α,21-trihydroxy - 1,4-pregnadiene-3,20-dione and 6α-fluoromethyl-9α-chloro-11β,17α,21-trihydroxy - 1,4 - pregnadiene - 3,20 - dione as starting compounds.

EXAMPLE 47

*6-floromethyl-11β,17α,21-trihydroxy-4,6-pregnadiene-3,20-dione 21-methanesulfonate (XXII)*

Following the procedure of Example 45, but substituting the corresponding 4,6-pregnadienes (XIII) (prepared as in Example 13) for 4-pregnenes as starting compounds, there are thus produced the respective 4,6-pregnadiene-21-methane-sulfonates, e.g., 6-fluoromethyl-11β,17α,21-trihydroxy-4,6-pregnadiene-3,20-dione 21-methanesulfonate and 6-fluoro-methyl-2α - methyl - 11β,17α,21 - trihydroxy-4,6-pregnadiene-3,20-dione 21-methanesulfonate (XXII) instead of 6α-fluoro-methyl-11β,17α,21-trihydroxy-4-pregnene-3,20-dione 21-methanesulfonate and 6α-fluoromethyl-2α-methyl-11β,17α,21-trihydroxy-4-pregnene - 3,20 - dione 21-methanesulfonate (XXII).

The corresponding 9α-fluoro and 9α-chloro 21-methanesulfonates are similarly prepared by substituting 6α-fluoromethyl-9α - fluoro - 11β,17α,21 - trihydroxy - 4,6 - pregnadiene-3,20-dione and 6-fluoromethyl-9α-chloro-11β,17α, 21-trihydroxy-4,6-pregnadiene-3,20-dione as starting compounds.

EXAMPLE 48

*6-fluoromethyl-11β,17α,21-trihydroxy-1,4,6-pregnatriene-3,20-dione 21-methanesulfonate (XXII)*

Following the procedure of Example 45, but substituting the corresponding 1,4,6-pregnatrienes (X) (prepared as in Example 8) for 4-pregnenes as starting compounds, there are thus produced the respective 1,4,6-pregnatriene 21-methanesulfonates, e.g., 6 - fluoromethyl - 11β,17α,21-trihydroxy-1,4,6-pregnatriene-3,20 - dione 21-methanesulfonate and 6-fluoromethyl-2 - methyl - 11β,17α,21 - trihydroxy-1,4,6-pregnatriene-3,20-dione 21-methanesulfonate (XXII) instead of 6α-fluoromethyl-11β,17α,21-trihydroxy-4-pregnene-3,20-dione 21-methanesulfonate and 6α-fluoromethyl-2α-methyl - 11β,17α,21 - trihydroxy - 4 - pregnene-3,20-dione 21-methanesulfonate (XXII).

The corresponding 9α-fluoro and 9α-chloro 21-methanesulfonates are similarly prepared by substituting 6α-fluoromethyl-9α-fluoro - 11β,17α,21 - trihydroxy - 1,4,6 - pregnatriene-3,20-dione and 6-fluoromethyl-9α-chloro-11β,17α, 21-trihydroxy-1,4,6-pregnatriene - 3,20 - dione as starting compounds.

EXAMPLE 49

*6α-fluoromethyl-11β,17α-dihydroxy-21-iodo-4-pregnene-3,20-dione (XXVI)*

The crude 6α-fluoromethyl - 11β,17α,21 - trihydroxy-4-pregnene-3,20-dione 21 - methanesulfonate (XXII) described in Example 45 was dissolved in 15 ml. of acetone and treated with 10 ml. of a 12.5% solution of sodium iodide in acetone. The mixture was heated under reflux with stirring for a period of about 15 minutes, the heat then reduced and the mixture concentrated to one-third volume at reduced pressure. Ice and water were added and the precipitated product collected on a filter, washed with water and dried to yield 6α-fluoromethyl-11β,17α-dihydroxy-21-iodo-4-pregnene-3,20-dione (XXVI).

Following the procedure of Example 49, but substituting 6α-fluoromethyl-2α-methyl - 11β,17α,21-trihydroxy-4-pregnene-3,20-dione 21-methanesulfonate, 6α-fluoromethyl-16α-methyl-11β,17α,21 - trihydroxy - 4 - pregnene - 3,20-dione 21-methanesulfonate and 6α-fluoromethyl-16β-methyl-11β,17α,21-trihydroxy-4-pregnene-3,20-dione 21-methanesulfonate as starting compounds, there are thus produced, respectively, the corresponding 6α-fluoromethyl-2α-methyl-11β,17α-dihydroxy - 21 - iodo - 4 - pregnene - 3,20-dione, 6α-fluoromethyl-16α-methyl-11β,17α-dihydroxy-21-iodo-4-pregnene - 3,20 - dione and 6α - fluoromethyl - 16β-methyl-11β,17α-dihydroxy-21-iodo-4-pregnene-3,20-dione.

The corresponding 9α-fluoro and 9α-chloro analogues of the compounds prepared in Example 49 are similarly produced.

Example 50

*6α-fluoromethyl-11β,17α-dihydroxy-21-iodo-1,4-pregnadiene-3,20-dione* (XXVI)

Following the procedure of Example 49, but substituting the corresponding 1,4-pregnadienes for 4-pregnenes as starting compounds, there are thus produced the respective 1,4 - pregnadiene 21 - iodides, e.g., 6α-fluoromethyl-11β,17α-dihydroxy-21-iodo-1,4 - pregnadiene - 3,20 - dione and 6α-fluoromethyl-2-methyl-11β,17α-dihydroxy-21-iodo-1,4-pregnadiene-3,20-dione (XXVI) instead of 6α-fluoromethyl-11β,17α-dihydroxy-21-iodo-4-pregnene-3,20-dione, and 6α-fluoromethyl-2α - methyl - 11β,17α - dihydroxy-21-iodo-4-pregnene-3,20-dione (XXVI).

The corresponding 9α-fluoro and 9α-chloro analogues of the compounds prepared in Example 50 are similarly produced.

Example 51

*6-fluoromethyl-11β,17α-dihydroxy-21-iodo-4,6-pregnadiene-3,20-dione* (XXVI)

Following the procedure of Example 49, but substituting the corresponding 4,6-pregnadienes for 4-pregnenes as starting compounds, there are thus produced the respective 4,6-pregnadiene 21-iodides, e.g., 6-fluoromethyl-11β,17α - dihydroxy - 21 - iodo - 4,6 - pregnadiene - 3,20-dione and 6-fluoromethyl-2α-methyl-11β,17α-dihydroxy-21-iodo-4,6-pregnadiene-3,20-dione (XXVI) instead of 6α - fluoromethyl - 11β,17α - dihydroxy - 21 - iodo - 4-pregnene-3,20-dione and 6α-fluoromethyl - 2α - methyl-11β,17α - dihydroxy - 21 - iodo - 4 - pregnene - 3,20-dione (XXVI).

The corresponding 9α-fluoro and 9α-chloro analogues of the compounds prepared in Example 51 are similarly produced.

Example 52

*6-fluoromethyl-11β,17α-dihydroxy-21-iodo-1,4,6-pregnatriene-3,20-dione* (XXVI)

Following the procedure of Example 49, but substituting the corresponding 1,4,6-pregnatrienes for 4-pregnenes as starting compounds, there are thus produced the respective 1,4,6-pregnatriene 21-iodides, e.g., 6-fluoromethyl - 11β,17α - dihydroxy - 21 - iodo - 1,4,6 - pregnatriene-3,20-dione and 6-fluoromethyl-2-methyl-11β,17α-dihydroxy-21-iodo-1,4,6-pregnatriene-3,20-dione (XXVI) instead of 6α-fluoromethyl-11β,17α-dihydroxy-21-iodo-4-pregnene-3,20-dione and 6α - fluoromethyl - 2α - methyl-11β,17α-dihydroxy - 21 - iodo - 4 - pregnene - 3,20 - dione (XXVI).

The corresponding 9α-fluoro and 9α-chloro compounds corresponding otherwise to the compounds prepared in Example 52 are similarly produced.

Example 53

*6α-fluoromethyl-11β,17-dihydroxy-21-fluoro-4-pregnene-3,20-dione* (XXVIII)

One gram of 6α-fluoromethyl-11β,17α-dihydroxy-21-iodo-4-pregnene-3,20-dione (XXVI) was dissolved in 150 ml. of boiling acetonitrile. After cooling to about 40° C., the solution was protected from light and 1.0 ml. of a 50% aqueous solution of silver fluoride was added with stirring. Stirring was continued for 1 hour at about 40° C., then an additional equal portion of silver fluoride solution was added. After another hour of stirring a third portion of the same quantity of aqueous silver fluoride solution was added. Heating and stirring was then continued for a period of 2 hours. The brown mixture was then filtered through a bed of diatomaceous earth (Celite) and the filtrate evaporated at reduced pressure at a bath temperature of 50° C. The brown residue was thoroughly extracted with two portions of warm methylene chloride, the combined extracts washed with water and dried over anhydrous sodium sulfate. The dried solution was concentrated to a small volume and then chromatographed over a column of magnesium silicate (Florisil). The column was eluted with hexanes containing increasing proportions of acetone to give 6α-fluoromethyl - 11β,17α - dihydroxy - 21 - fluoro - 4-pregnene-3,20-dione (XXIII).

In the same manner as given in Example 53, but substituting 6α - fluoromethyl - 11β,17α - dihydroxy - 9α-fluoro-21-iodo-4-pregnene-3,20-dione (XXVI) as starting compound, the corresponding 6α-fluoromethyl-11β,17α-dihydroxy-9α,21-difluoro-4-pregnene-3,20-dione (XXIII) is thus produced. The corresponding 9α-chloro compounds are similarly prepared.

Following the procedure of Example 53, but substituting as starting compounds 6α-fluoromethyl-2α-methyl-11β,17α - dihydroxy - 21 - iodo - 4 - pregnene - 3,20-dione, 6α - fluoromethyl - 16α - methyl - 11β,17α - dihydroxy - 21 - iodo - 4 - pregnene - 3,20 - dione, 6α-fluoromethyl - 16β - methyl - 11β,17α - dihydroxy - 21-iodo-4-pregnene-3,20-dione and their corresponding 9α-fluoro and their corresponding 9α-fluoro and 9α-chloro analogues (XXVI), there are thus produced, respectively, 6α - fluoromethyl - 2α - methyl - 11β,17α - dihydroxy-21 - fluoro - 4 - pregnene - 3,20 - dione, 6α - fluoromethyl-16α - methyl - 11β,17α - dihydroxy - 21 - fluoro - 4 - pregnene - 3,20 - dione, 6α - fluoromethyl - 16β - methyl-11β,17α - dihydroxy - 21 - fluoro - 4 - pregnene - 3,20-dione and their corresponding 9α-fluoro and 9α-chloro analogues (XXIII).

Example 54

*6α-fluoromethyl-11β,17α-dihydroxy-12-fluoro-1,4-pregadiene-3,20-dione* (XXIII)

Following the procedure of Example 53, but substituting as starting compounds the corresponding 1,4-pregnadienes for 4-pregnenes, there are thus produced the respective 21 - fluoro - 1,4 - pregnadienes, e.g., 6α-fluoromethyl-11β,17α-dihydroxy-21 - fluoro - 1,4 - pregnadiene-3,20-dione 6α - fluoromethyl - 2 - methyl - 11β,17α - dihydroxy-21-fluoro-1,4-pregnadiene - 3,20 - dione and 6α-fluoromethyl - 11β,17α - dihydroxy - 9α,21 - difluoro-1,4-pregnadiene-3,20-dione (XXIII) instead of 6α-fluoromethyl - 11β,17α - dihydroxy - 21 - fluoro - 4 - pregnene - 3,20 - dione, 6α - fluoromethyl - 2α - methyl-11β,17α - dihydroxy - 21 - fluoro - 4 - pregnene - 3,20-dione and 6α-fluoromethyl-11β,17α-dihydroxy-9α,21-difluoro-4-pregnene-3,20-dione (XXIII).

Example 55

*6-fluoromethyl-11β,17α-dihydroxy-12-fluoro-4,6-pregnadiene-3,20-dione* (XXIII)

Following the procedure of Example 53, but substituting as starting compounds the corresponding 4,6-pregnadienes for 4-pregnenes, there are thus produced the respective 21-fluoro-4,6-pregnadienes, e.g., 6-fluoromethyl 11β,17α - dihydroxy - 21 - fluoro - 4,6 - pregnadiene-3,20 - dione, 6 - fluoromethyl - 2α - methyl - 11β,17α-dihydroxy-21-fluoro - 4,6 - pregnadiene-3,20-dione and 6-fluoromethyl - 11β,17α - dihydroxy - 9α,21 - difluoro-4,6-pregnadiene-3,20-dione, instead of 6α-fluoromethyl-2α - methyl - 11β,17α - dihydroxy - 21 - fluoro - 4 - pregnene-3,20-dione and 6α-fluoromethyl-11β,17α-dihydroxy-9α,21-difluoro-4-pregnene-3,20-dione (XXIII).

Example 56

*6-fluoromethyl-11β,17α-dihydroxy-21-fluoro-1,4,6-pregnatriene-3,20-dione* (XXIII)

Following the procedure of Example 53, but substituting as starting compounds the corresponding 1,4,6-pregnatrienes for 4-pregnenes, there are thus produced the respective 21-fluoro-1,4,6-pregnatrienes, e.g., 6 - fluoromethyl - 11β,17α - dihydroxy - 21 - fluoro - 1,4,6 - pregnatriene - 3,20 - dione, 6 - fluoromethyl - 2 - methyl-11β,17α - dihydroxy - 21 - fluoro - 1,4,6 - pregnatriene-3,20-dione and 6-fluoromethyl-11β,17α-dihydroxy-9α,21- difluoro-1,4,6-pregnatriene-3,20-dione (XXIII) instead of 6α - fluoromethyl - 11β,17α - dihydroxy - 21 - fluoro - 4-pregnene - 3,20 - dione, 6α - fluoromethyl - 2α - methyl-11β,17α - dihydroxy - 21 - fluoro - 4 - pregnene - 3,20-dione and 6α-fluoromethyl-11β,17α-dihydroxy-9α,21-difluoro-4-pregnene-3,20-dione (XXIII).

EXAMPLE 57

*6α-fluoromethyl-11β,17α-dihydroxy - 21 - fluoro-4-pregnene-3,20-dione (XXIII) and 6α-fluoromethyl-11β-hydroxy-17α,21-epoxy-4-pregnene-3,20-dione (XXIV)*

A solution of 1.0 g. of 6α-fluoromethyl-11β,17α,21-trihydroxy-4-pregnene - 3,20 - dione 21-methanesulfonate (XXII) and 0.50 g. of anhydrous potassium fluoride in 10 ml. of dimethylsulfoxide was heated at 100° C. for 12 hours. The cooled solution was diluted with water and then extracted with methylene chloride. The extracts were dried and chromatographed over magnesium silicate in the manner well known in the art to give substantially pure 6α-fluoromethyl-11β,17α-dihydroxy - 21-fluoro-4-pregnene-3,20-dione (XXIII) and a minor amount of 6α-fluoromethyl-11β-hydroxy-17α,21-epoxy-4-pregnene-3,20-dione (XXIV), a light-colored crystalline solid.

In the same manner as in Example 57, but substituting 6α - fluoromethyl-11β,17α,21-trihydroxy - 9α - fluoro-4-pregnene-3,20-dione 21 - methanesulfonate (XXII) as starting compound, the corresponding 6α-fluoromethyl-11β,17α-dihydroxy-9α,21-difluoro-4-pregnene - 3,20-dione (XXIII) and 6α-fluoromethyl-11β-hydroxy-17α,21-epoxy-9α-fluoro-4-pregnene-3,20-dione (XXIV) are thus produced. The corresponding 9α-chloro compounds are similarly produced.

Following the procedure of Example 57, but substituting as starting compounds 6α-fluoromethyl-2α-methyl-11β,17α,21-trihydroxy-4-pregnene-3,20-dione 21-methanesulfonate, 6α-fluoromethyl-16α-methyl - 11β,17α,21 - trihydroxy-4-pregnene-3,20-dione 21-methanesulfonate, 6α-fluoromethyl-16β-methyl-11β,17α,21-trihydroxy - 4 - pregnene-3,20-dione 21-methanesulfonate and their corresponding 9α-fluoro and 9α-chloro analogues (XXII), there are thus produced, respectively, 6α-fluoromethyl-2α-methyl-11β,17α-dihydroxy - 21 - fluoro-4-pregnene-3,20-dione (XXIII) plus 6α-fluoromethyl-2α-methyl-11β-hydroxy-17α,21-epoxy-4-pregnene-3,20-dione (XXIV), 6α-fluoromethyl-16α-methyl - 11β,17α - dihydroxy-21-fluoro-4-pregnene-3,20-dione (XXIII) plus 6α-fluoromethyl-16α-methyl-11β-hydroxy-17α,21-epoxy - 4 - pregnene - 3,20-dione (XXIV) and 6α-fluoromethyl-16β-methyl-11β,17α-dihydroxy-21-fluoro-4-pregnene-3,20-dione (XXIII) plus 6α - fluoromethyl-16β-methyl - 11β - hydroxy-17α,21-epoxy-4-pregnene-3,20-dione (XXIV) and their corresponding 9α-fluoro and 9α-chloro analogues.

EXAMPLE 58

*6α-fluoromethly-11β,17α-dihydroxy-21-fluoro - 1,4 - pregnadiene-3,20-dione (XXIII) and 6α-fluoromethyl-11β-hydroxy - 17α,21 - epoxy-1,4-pregnadiene-3,20-dione (XXIV)*

Following the procedure of Example 57, but substituting as starting compounds, the corresponding 1,4-pregnadienes for 4-pregnenes, there are thus produced the respective 21-fluoro-1,4-pregnadienes plus 17α,21-epoxy-1,4-pregnadienes, e.g., 6α-fluoromethyl-11β,17α-dihydroxy-21-fluoro-1,4-pregnadiene-3,20-dione (XXIII) plus 6α-fluoromethyl-11β-hydroxy-17α,21-epoxy-1,4-pregnadiene - 3,20-dione (XXIV), 6α-fluoromethyl-2-methyl-11β,17α-dihydroxy-21-fluoro-1,4-pregnadiene-3,20-dione (XXIII) plus 6α-fluoromethyl-2-methyl-11β-hydroxy - 17α,21 - epoxy-1,4-pregnadiene-3,20-dione (XXIV) and 6α-fluoromethyl-11β,17α-dihydroxy-9α,21-difluoro-1,4-pregnadiene - 3,20-dione (XXIII) plus 6α-fluoromethyl-11β-hydroxy - 9α-fluoro-17α,21-epoxy-1,4-pregnadiene-3,20-dione (XXIV) instead of 6α-fluoromethyl-11β,17α-dihydroxy-21-fluoro-4-pregnene-3,20-dione (XXIII) plus 6α-fluoromethyl-11β-hydroxy-17α,21-epoxy-4-pregnene-3,20 - dione (XXIV), 6α - fluoromethyl-2α-methyl - 11β,17α - dihydroxy-21-fluoro-4-pregnene-3,20-dione (XXIII) plus 6α - fluoromethyl-2α-methyl - 11β - hydroxy-17α,21 - epoxy-4-pregnene-3,20-dione (XXIV) and 6α-fluoromethyl-11β,17α-dihydroxy-9α,21-difluoro-4-pregnene-3,20-dione (XXIII) plus 6α-fluoromethyl-11β-hydroxy - 9α - fluoro-17α,21-epoxy-4-pregnene-3,20-dione (XXIV).

EXAMPLE 59

*6α-fluoromethyl-11β,17α-dihydroxy - 21 - fluoro-4,6-pregnadieine-3,20-dione (XXIII) and 6-fluoromethyl-11β-hydroxy - 17α,21-epoxy-4,6-pregnadiene - 3,20 - dione (XXIV)*

Following the procedure of Example 57, but substituting as starting compounds, the corresponding 4,6-pregnadienes for 4-pregnenes, there are thus produced the respective 21-fluoro-4,6-pregnadienes plus 17α,21-epoxy-4,6-pregnadienes, e.g., 6-fluoromethyl-11β,17α-dihydroxy-21-fluoro-4,6-pregnadiene-3,20-dione (XXIII) plus 6-fluoromethyl-11β-hydroxy-17α,21-epoxy - 4,6 - pregnadiene-3,20-dione (XXIV), 6-fluoromethyl-2α-methyl-11β,17α-dihydroxy-21-fluoro-4,6-pregnadiene-3,20 - dione (XXIII) plus 6-fluoromethyl-2α-methyl-11β-hydroxy-17α,21-epoxy-4,6-pregnadiene-3,20-dione (XXIV) and 6-fluoromethyl-11β,17α-dihydroxy-9α,21-difluoro - 4,6 - pregnadiene-3,20-dione (XXIII) plus 6-fluoromethyl-11β-hydroxy-17α,21-epoxy-9α-fluoro-4,6-pregnadiene-3,20 - dione (XXIV) instead of 6α-fluoromethyl-11β,17α-dihydroxy-21-fluoro-4-pregnene-3,20-dione (XXIII) plus 6α-fluoromethyl-11β-hydroxy - 17α,21-epoxy-4-pregnene-3,20-dione (XXIV), 6α - fluoromethyl - 2α - methyl-11β,17α,-dihydroxy-21-fluoro-4-pregnene-3,20 - dione (XXIII) plus 6α-fluoromethyl - 2α - methyl-11β-hydroxy-17α,21-epoxy-4-pregnene-3,20-dione (XXIV) and 6α-fluoromethyl-11β,17α-dihydroxy-9α,21-difluoro-4-pregnene-3,20 - dione (XXIII) plus 6α-fluoromethyl-11β-hydroxy - 17α,21 - epoxy-9α-fluoro-4-pregnene-3,20-dione (XXIV).

EXAMPLE 60

*6-fluoromethyl-11β,17α-dihydroxy - 21 - fluoro-1,4,6-pregnatriene-3,20-dione (XXII) and 6-fluoromethyl-11β-hydroxy - 17α,21 - epoxy-1,4,6 - pregnatriene-3,20-dione (XXIV)*

Following the procedure of Example 57, but substituting as starting compounds, the corresponding 1,4,6-pregnatrienes for 4-pregnenes, there are thus produced the respective 21-fluoro-1,4,6-pregnatrienes plus 17α,21-epoxy-1,4,6 - pregnatrienes, e.g., 6-fluoromethyl-11β,17α-dihydroxy-21-fluoro-1,4,6-pregnatriene-3,20 - dione (XXIII) plus 6-fluoromethyl-11β-hydroxy-17α,21-epoxy-1,4,6-pregnatriene-3,20-dione (XXIV), 6 - fluoromethyl-2-methyl-11β,17α - dihydroxy-21-fluoro-1,4,6-pregnatrienes - 3,20-dione (XXIII) plus 6-fluoromethyl-2-methyl-11β-hydroxy-17α,21-epoxy-1,4,6-pregnatriene-3,20-dione (XXIV) and 6-fluoromethyl-11β,17α-dihydroxy - 9α,21 - difluoro-1,4,6-pregnatriene-3,20-dione (XXIII) plus 6-fluoromethyl-11β-hydroxy - 17α,21 - epoxy-9α-fluoro-1,4,6-pregnatriene-3,20-dione (XXIV) instead of 6α-fluoromethyl-11β,17α-dihydroxy-21-fluoro-4-pregnene-3,20-dione (XXIII) plus 6α-fluoromethyl-11β-hydroxy - 17α,21 - epoxy-4-pregnene-3,20-dione (XXIV), 6α-fluoromethyl-2α-methyl-11β,17α-dihydroxy-21-fluoro-4-pregnene-3,20-dione (XXIII) plus 6α - fluoromethyl-2α-methyl-11β-hydroxy-17α,21 - epoxy-4-pregnene-3,20-dione (XXIV) and 6α-fluoromethyl-11β, 17α - dihydroxy-9α,21-difluoro-4-pregnene - 3,20 - dione (XXIII) plus 6α-fluoromethyl-11β-hydroxy-17α,21-epoxy-9α-fluoro-4-pregnene-3,20-dione (XXIV).

Example 61

*6α-fluoromethyl-17α-hydroxy-21-fluoro-4-pregnene-3,11,20-trione (XXV)*

A solution was prepared containing 6α-fluoromethyl-11β,17α - dihydroxy - 21 - fluoro - 4 - pregnene-3,20-dione (XXIII), chromic acid, glacial acetic acid and a small quantity of water. This mixture was stirred and then maintained for about 8 hours at room temperature. Thereafter the mixture was poured into ice water, neutralized by the addition of dilute sodium hydroxide and the thus-obtained precipitate collected on a filter and recrystallized three times from a mixture of ethyl acetate and Skellysolve B hexanes to give 6α-fluoromethyl-17α-hydroxy-21-fluoro-4-pregnene-3,11,20-trione (XXV).

In the same manner as in Example 61, but substituting 6α - fluoromethyl - 11β,17α - dihydroxy - 9α,21 - difluoro-4-pregnene-3,20-dione (XXIII) as starting compounds, the corresponding 6α-fluoromethyl-17α-hydroxy-9α,21-difluoro-4-pregnene-3,11,20-trione (XXV) is thus produced. The corresponding 9α-chloro compound is similarly prepared.

In the same manner as in Example 61, but substituting as starting compounds 6α-fluoromethyl-2α-methyl-11β,17α - dihydroxy-21-fluoro-4-pregnene-3,20-dione, 6α-fluoromethyl - 16α - methyl - 11β,17α - dihydroxy - 21-fluoro-4-pregnene-3,20-dione, 6α - fluoromethyl-16β-methyl - 11β,17α - dihydroxy - 21 - fluoro - 4 - pregnene - 3,20-dione and their corresponding 9α-fluoro and 9α-chloro analogues (XXIII), there are thus produced, respectively, 6α - fluoromethyl - 2α - methyl - 17α - hydroxy - 21 - fluoro - 4 - pregnene - 3,11,20 - trione, 6α - fluoromethyl-16α - methyl - 17α - hydroxy - 21 - fluoro - 4 - pregnene-3,11,20-trione, 6α - fluoromethyl - 16β - methyl - 17α - hydroxy-21-fluoro-4-pregnene-3,11,20-trione and their corresponding 9α-fluoro and 9α-chloro analogues (XXV).

Example 62

*6α-fluoromethyl-17α-hydroxy-21-fluoro-1,4-pregnadiene-3,11,20-trione (XXV)*

Following the procedure of Example 61, but substituting as starting compounds, the corresponding 1,4-pregnadienes for 4-pregnenes, there are thus produced the respective 21-fluoro-1,4-pregnadienes, e.g., 6α-fluoromethyl-17α - hydroxy - 21 - fluoro - 1,4 - pregnadiene - 3,11,20-trione, 6α - fluoromethyl-2-methyl-17α-hydroxy-21-fluoro-1,4-pregnadiene-3,11,20-trione and 6α-fluoromethyl-17α-hydroxy-9α,21-difluoro - 1,4 - pregnadiene - 3,11,20-trione (XXV) instead of 6α-fluoromethyl-17α-hydroxy-21-fluoro-4-pregnene-3,11,20-trione, 6α-fluoromethyl-2α-methyl-17α-hydroxy-21-fluoro-4-pregnene-3,11,20-trione and 6α-fluoromethyl - 17α - hydroxy - 9α,21 - difluoro - 4 - pregnene-3,11,20-trione (XXV).

Example 63

*6-fluoromethyl-17α-hydroxy-21-fluoro-4,6-pregnadiene-3,11,20-trione (XXV)*

Following the procedure of Example 61, but substituting as starting compounds, the corresponding 4,6-pregnadienes for 4-pregnenes, there are thus produced the respective 21-fluoro-4,6-pregnadienes, e.g., 6-fluoromethyl-17α-hydroxy-21-fluoro-4,6-pregnadiene-3,11,20 - trione, 6 - fluoromethyl - 2α - methyl - 17α - hydroxy - 21 - fluoro-4,6-pregnadiene-3,11,20-trione and 6-fluoromethyl-17α-hydroxy-9α,21 - difluoro - 4,6 - pregnadiene - 3,11,20 - trione (XXV) instead of 6α-fluoromethyl-17α-hydroxy-21-fluoro - 4 - pregnene - 3,11,20 - trione, 6α - fluoromethyl - 2α-methyl-17α-hydroxy-21-fluoro-4-pregnene-3,11,20 - trione and 6α - fluoromethyl-17α-hydroxy-9α,21-difluoro-4-pregnene-3,11,20-trione (XXV).

Example 64

*6-fluoromethyl-17α-hydroxy-21-fluoro-1,4,6-pregnatriene-3,11,20-trione (XXV)*

Following the procedure of Example 61, but substituting as starting compounds, the corresponding 1,4,6-pregnatrienes for 4-pregnenes, there are thus produced the respective 21-fluoro - 1,4,6 - pregnatrienes, e.g., 6-fluoromethyl - 17α - hydroxy - 21 - fluoro - 1,4,6 - pregnatriene-3,11,20 - trione, 6-fluoromethyl-2-methyl-17α-hydroxy-21-fluoro-1,4,6-pregnatriene-3,11,20-trione and 6-fluoromethyl - 17α - hydroxy - 9α,21 - difluoro - 1,4,6 - pregnatriene-3,11,20-trione (XXV) instead of 6α-fluoromethyl-17α-hydroxy - 21 - fluoro - 4 - pregnene - 3,11,20 - trione, 6α-fluoromethyl - 2α - methyl - 17α - hydroxy - 21 - fluoro - 4-pregnene-3,11,20-trione and 6α-fluoromethyl-17α-hydroxy-9α,21-difluoro-4-pregnene-3,11,20-trione (XXV).

Example 65

*6α-fluoromethyl-11β,17α-dihydroxy-4-pregnene-3,20-dione (XXVII)*

150 mg. of 6α-fluoromethyl-11β,17α-dihydroxy-21-iodo-4-pregnene-3,20-dione (XXVI) was slurried with 5 ml. of acetic acid and stirred for a period of about 45 minutes. Then an aqueous solution of 250 mg. of sodium thiosulfate pentahydrate was added causing the iodine color to disappear. Additional water was added and the mixture extracted with three portions of methylene chloride. The methylene chloride extracts were combined, washed with water and cold sodium bicarbonate solution until all the acetic acid was neutralized. After drying over anhydrous sodium sulfate, the solution was concentrated to a small volume and chromatographed over a column of magnesium silicate (Florisil). The column was developed with hexanes containing increasing proportions of acetone, to give substantially pure 6α-fluoromethyl - 11β,17α - dihydroxy - 4 - pregnene - 3,20 - dione (XXVII).

Following the procedure of Example 65, 6α - fluoromethyl - 11β,17α - dihydroxy - 9α - fluoro - 21 - iodo - 4-pregnene-3,20-dione (XXVI) is converted to 6α-fluoromethyl - 11β,17α - dihydroxy - 9α - fluoro - 4 - pregnene-3,20-dione (XXVII). The corresponding 9α-chloro compound is similarly prepared.

Following the procedure of Example 65, but substituting as starting compounds, 6α - fluoromethyl-2α-methyl-11β,17α-dihydroxy-21-iodo-4-pregnene-3,20-dione, 6α - fluoromethyl - 16β - methyl-11β,17α-dihydroxy-4-pregnene-3,20-dione, 6α-fluoromethyl-16β-methyl-11β,17α-dihydroxy-4-pregnene-3,20-dione and their corresponding 9α-fluoro and 9α-chloro analogues (XXVI), there are thus produced, respectively, 6α-fluoromethyl-2α-methyl-11β,17α-dihydroxy-4-pregnene-3,20-dione, 6α - fluoromethyl-16α-methyl-11β,7α-dihydroxy-4-pregnene - 3,20 - dione, 6α - fluoromethyl-16β - methyl - 11β,17α - dihydroxy - 4 - pregnene - 3,20-dione and their corresponding 9α-fluoro and 9α-chloro analogues (XXVII).

Example 66

*6α-fluoromethyl-11β,17α-dihydroxy-1,4-pregnadiene-3,20-dione (XXVII)*

Following the procedure of Example 65, but substituting as starting compounds, the corresponding 1,4-pregnadienes for 4-pregnenes, there are thus produced the respective 21-methyl-1,4-pregnadienes, e.g., 6α-fluoromethyl-11β,17α-dihydroxy-1,4-pregnadiene-3,20-dione, 6α-fluoromethyl - 2 - methyl - 11β,17α - dihydroxy - 1,4 - pregnadiene-3,20-dione and 6α-fluoromethyl-11β,17α-dihydroxy-9α-fluoro-1,4-pregnadiene - 3,20 - dione (XXVII) instead of 6α - fluoromethyl-11β,17α-dihydroxy-4-pregnene-3,20-dione, 6α - fluoromethyl-2α-methyl-11β,17α-dihydroxy-4-pregnene-3,20-dione and 6α - fluoromethyl-11β,17α-dihydroxy-9α-fluoro-4-pregnene-3,20-dione (XXVII).

EXAMPLE 67

*6-fluoromethyl-11β,17α-dihydroxy-4,6-pregnadiene-3,20-dione* (XXVII)

Following the procedure of Example 65, but substituting as starting compounds, the corresponding 4,6-pregnadienes for 4-pregnenes, there are thus produced the respective 21-methyl-1,4-pregnadienes, e.g., 6-fluoromethyl-11β,17α-dihydroxy-4,6-pregnadiene - 3,20-dione, 6-fluoromethyl-12α-methyl-11β,17α-dihydroxy-4,6 - pregnadiene-3,20-dione and 6 - fluoromethyl - 11β,17α-dihydroxy-9α-fluoro-4,6-pregnadiene-3,20-dione (XXVII) instead of 6α-fluoromethyl-11β,17α-dihydroxy-4-pregnene - 3,20 - dione, 6α-fluoromethyl-2α-methyl-11β,17α-dihydroxy - 4 - pregnene - 3,20-dione and 6α-fluoromethyl-11β,17α-dihydroxy-9α-fluoro-4-pregnene-3,20-dione (XXVII).

EXAMPLE 68

*6-fluoromethyl-11β,17α-dihydroxy-1,4,6-pregnatriene-3,20-dione* (XXVII)

Following the procedure of Example 65, but substituting as starting compounds, the corresponding 1,4,6-pregnatrienes for 4-pregnenes, there are thus produced the respective 21-methyl-1,4,6-pregnatrienes, e.g., 6-fluoromethyl-11β,17α-dihydroxy-1,4,6-pregnatriene-3,20, - dione, 6-fluoromethyl-2-methyl-11β,17α-dihydroxy - 1,4,6 - pregnatriene - 3,20 - dione and 6-fluoromethyl-11β,17α-dihydroxy-9α-fluoro-1,4,6-pregnatriene-3,20 - dione (XXVII) instead of 6α-fluoromethyl-11β-17α-dihydroxy-4-pregnene-3,20 - dione, 6α - fluoromethyl-2α-methyl-11β,17α-dihydroxy-4-pregnene-3,20-dione and 6α-fluoromethyl-11β,17α dihydroxy-9α-fluoro-4-pregnene-3,20-dione (XXVIII).

EXAMPLE 69

*6α-fluoromethyl-17α-hydroxy-4-pregnene-3,11,20-trione* (XXVIII)

A mixture was prepared containing 1.0 g. of 6α-fluoromethyl - 11β,17α - dihydroxy - 4 - pregnene - 3,20 - dione (XXVII), 350 mg. of chromic anhydride, 35 ml. of glacial acetic acid and a small amount of water. This mixture was stirred and then maintained for about 8 hours at room temperature. Thereafter the mixture was poured into ice water, neutralized by the addition of dilute sodium hydroxide and the thus-obtained precipitate collected on a filter and dried to give 6α-fluoromethyl-17α-hydroxy-4-pregnene-3,11,20-trione (XXVIII).

Following the procedure of Example 69, 6α-fluoromethyl-11β,17α-dihydroxy-9α-fluoro - 4 - pregnene - 3,20-dione (XXVII) was oxidized to 6α-fluoromethyl-17α-hydroxy-9α-fluoro-4-pregnene - 3,11,20 - trione (XXVIII). The corresponding 9α-chloro compound is similarly produced.

In the same manner as in Example 69, but substituting as starting compounds 6α-fluoromethyl-2α-methyl-11β, 17α-dihydroxy-4-pregnene-3,20 - dione, 6α - fluoromethyl-16α-methyl-11β,17α-dihydroxy-4-pregnene - 3,20 - dione, 6α-fluoromethyl-16β-methyl-11β,17α-dihydroxy - 4 pregnene-3,20-dione and their corresponding 9α-fluoro and 9α-chloro analogues (XXVII), there are thus produced, respectively, 6α - fluoromethyl - 2α-methyl-17α-hydroxy-4-pregnene-3,11,20-trione, 6α-fluoromethyl-16α-methyl-17α-hydroxy-4-pregnene-3,11,20-trione, 6α-fluoromethyl-16β-methyl-17α-hydroxy-4-pregnene-3,11,20-trione and their corresponding 9α-fluoro and 9α - chloro analogues (XXVIII).

EXAMPLE 70

*6α-fluoromethyl-17α-hydroxy-1,4-pregnadiene 3,11-20-trione* (XXVIII)

Following the procedure of Example 69, but substituting as starting compounds, the corresponding 11β-hydroxy-1,4-pregnadienes for 11β-hydroxy-4-pregnenes, there are thus produced the respective 11-keto-1,4-pregnadienes, e.g., 6α-fluoromethyl-17α-hydroxy-1,4 - pregnadiene - 3,11,20-trione, 6α-fluoromethyl-2-methyl-17α-hydroxy-1,4-pregnadiene-3,11,20-trione and 6α-fluoromethyl-17α-hydroxy-9α-fluoro-1,4-pregnadiene-3,11,20-trione (XXVIII) instead of 6α-fluoromethyl-17α-hydroxy-4-pregnene-3,11,20 - trione, 6α-fluoromethyl-2α-methyl-17α - hydroxy - 4 - pregnene-3,11,20-trione and 6α - fluoromethyl - 17α - hydroxy - 9α-fluoro-4-pregnene-3,11,20-trione (XXVIII).

EXAMPLE 71

*6-fluoromethyl-17α-hydroxy-4,6-pregnadiene-3,11-20-trione* (XXVIII)

Following the procedure of Example 69, but substituting as starting compounds, the corresponding 11β-hydroxy-4,6-pregnadienes for 11β-hydroxy-4-pregnenes, there are thus produced the respective 11-keto-4,6-pregnadienes, e.g., 6-fluoromethyl-17α-hydroxy-4,6-pregnadiene-3,11,20-trione, 6-fluoromethyl-2α-methyl-17α-hydroxy-4,6-pregnadiene-3,11,20-trione and 6-fluoromethyl-17α-hydroxy-9α-fluoro-4,6-pregnadiene-3,11,20-trione (XXVIII) instead of 6α-fluoromethyl-17α-hydroxy-4-pregnene-3,11,20 - trione, 6α-fluoromethyl-2α-methyl - 17α - hydroxy-4 - pregnene-3,11,20 - trione and 6α - fluoromethyl - 17α-hydroxy-9α-fluoro-4-pregnene-3,11,20-trione (XXVIII).

EXAMPLE 72

*6-fluoromethyl-17α-hydroxy-1,4,6-pregnatriene-3,11,20-trione* (XXVIII)

Following the procedure of Example 69, but substituting as starting compounds, the corresponding 11β-hydroxy-1,4,6-pregnatrienes for 11β-hydroxy-4-pregnenes, there are thus produced the respective 11-keto-1,4,6-pregnatrienes, e.g., 6-fluoromethyl-17α-hydroxy-1,4,6-pregnatriene-3,11,20 - trione, 6 - fluoromethyl-2-methyl-17α-hydroxy-1,4,6-pregnatriene-3,11,20-trione and 6-fluoromethyl-17α-hydroxy - 9α - fluoro - 1,4,6-pregnatriene-3,11,20-trione (XXVIII) instead of 6α-fluoromethy-17α-hydroxy-4-pregnene-3,11,20 - trione, 6α-fluoromethyl-2α-methyl-17α-hydroxy-4-pregnene-3,11,20-trione and 6α-fluoromethyl-17α-hydroxy-9α-fluoro-4-pregnene-3,11,20-trione (XXVIII).

EXAMPLE 73

*6α-fluoromethyl-11β,17α-dihydroxy-4-pregnene-3,20-dione 17-acetate* (XXIX)

A solution of 2.0 g. of 6α-fluoromethyl-11β,17α-dihydroxy-4-pregnene-3,20-dione (XXVII), 5 ml. of distilled acetic anhydride, 0.5 g. of p-toluenesulfonic acid and 5 ml. of acetic acid was stirred for about 90 minutes. The mixture was poured with vigorous stirring into water. The precipitated solid was separated by filtration, dried and the 6α - fluoromethyl-11β,17α-dihydroxy-4-pregnene-3,20-dione 17-acetate (XXIX) thus obtained was chromatographed over Florisil synthetic magnesium silicate with increasing proportions of acetone in Skellysolve B hexane and was recrystallized from ethyl acetate to give light-colored crystals.

Substituting another lower-hydrocarbon carboxylic acid anhydride for the acetic anhydride is productive of other 6α - fluoromethyl - 11β,17α - dihydroxy-4-pregnene-3,20-dione 17-acylates (XXIX) wherein the acyl radical of the acylate group is the acyl radical of, for example, a lower-aliphatic acid, e.g., formic (formic acid plus acetic anhydride), propionic, butyric, isobutyric, valeric, isovaleric, trimethylacetic, 2-methylbutyric, 3-ethylbutyric, hexanoic, diethylacetic, triethylacetic heptanoic, octanoic, α-ethylisovaleric, a cyclic acid, e.g., cyclopropylideneacetic, a cycloaliphatic acid, e.g., cyclopentylformic, cyclopentylacetic, β - cyclopentylpropionic, cyclohexylformic, cyclohexylacetic, β-cyclohexylpropionic, an aryl or alkaryl acid, e.g., benzoic, methylbenzoic, dimethylbenzoic, ethylbenzoic, trimethylbenzoic, α-naphthoic, 3-methyl-α-naphthoic, an aralkyl acid, e.g., phenylacetic, phenylpropionic, diphenylacetic, and triphenylacetic acid.

In the same manner as in Example 73, but substituting 6α-fluoromethyl-11β,17α-dihydroxy-9α-fluoro-4-pregnene- 3,20-dione (XXVII) as starting compound, the corresponding 6α-fluoromethyl-11β,17α-dihydroxy-9α-fluoro-4-pregnene-3,20-dione 17-acetate (XXIX) is thus produced. Other 17-acylates are prepared in a like manner by substituting one of the lower-hydrocarbon carboxylic acid anhydrides listed in Example 73 in place of acetic anhydride. The corresponding 9α-chloro compounds are similarly prepared.

Following the procedure of Example 73, but substituting as starting compounds 6α-fluoromethyl-2α-methyl-11β,17α-dihydroxy-4-pregnene-3,20-dione, 6α-fluoromethyl-16α-methyl-11β,17α-dihydroxy-4-pregnene-3,20-dione, 6α-fluoromethyl - 16β-methyl-11β,17α-dihydroxy-4-pregnene-3,20-dione and their corresponding 9α-fluoro and 9α-chloro analogues (XXVII), there are thus produced their respective 17-acetates or other 17-acylates (XXIX).

EXAMPLE 74

6α-fluoromethyl-11β,17α-dihydroxy-1,4-pregnadiene-3,20-dione 17-acetate (XXIX)

Following the procedure of Example 73, but substituting as starting compounds, the corresponding 1,4-pregnadienes for 4-pregnenes, there are thus produced the respective 1,4-pregnadiene-3,20-dione 17-acylates, e.g., 6α-fluoromethyl - 11β,17α - dihydroxy-1,4-pregnadiene-3,20-dione 17-acetate, 6α-fluoromethyl-2-methyl-11β,17α-dihydroxy-1,4-pregnadiene-3,20-dione 17-acetate and 6α-fluoromethyl - 11β,17α-dihydroxy-9α-fluoro-1,4-pregnadiene-3,20-dione 17-acetate (XXIX) instead of 6α-fluoromethyl-11β,17α-dihydroxy-4-pregnene-3,20-dione 17-acetate, 6α-fluoromethyl - 2α-methyl-11β,17α-dihydroxy-4-pregnene-3,20-dione 17-acetate and 6α-fluoromethyl-11β,17α-dihydroxy-9α - fluoro - 4 - pregnene - 3,20 - dione 17 - acetate (XXIX).

EXAMPLE 75

6-fluoromethyl-11β,17α-dihydroxy-4,6-pregnadiene-3,20-dione 17-acetate (XXIX)

Following the procedure of Example 73, but substituting as starting compounds, the corresponding 4,6-pregnadienes for 4-pregnenes, there are thus produced the respective 4,6-pregnadiene-3,20-dione 17-acylates, e.g., 6-fluoromethyl-11β,17α-dihydroxy-4,6-pregnadiene-3,20-dione 17 - acetate, 6-fluoromethyl-2α-methyl - 11β,17α - dihydroxy-4,6-pregnadiene-3,20-dione 17-acetate and 6-fluoromethyl-11β,17α - dihydroxy-9α-fluoro-4,6-pregnadiene-3,20-dione 17-acetate (XXIX) instead of 6α-fluoromethyl-11β,17α-dihydroxy - 4 - pregnene-3,20-dione 17-acetate, 6α-fluoromethyl - 2α - methyl-11β,17α-dihydroxy-4-pregnene-3,20-dione 17-acetate and 6α-fluoromethyl-11β,17α-dihydroxy-9α-fluoro-4-pregnene-3,20-dione 17-acetate (XXIX).

EXAMPLE 76

6-fluoromethyl-11β,17α-dihydroxy-1,4,6-pregnatriene-3,20-dione 17-acetate (XXIX)

Following the procedure of Example 73, but substituting as starting compounds, the corresponding 1,4,6-pregnatrienes for 4-pregnenes, there are thus produced the respective 1,4,6-pregnatriene-3,20-dione 17-acylates, e.g., 6-fluoromethyl - 11β,17α-dihydroxy-1,4,6-pregnatriene-3,20-dione 17 - acetate, 6-fluoromethyl-2-methyl-11β,17α-dihydroxy-1,4,6-pregnatriene-3,20-dione 17-acetate and 6-fluoromethyl - 11β,17α-dihydroxy-9α-fluoro-1,4,6-pregnatriene-3,20-dione 17-acetate (XXIX) instead of 6α-fluoromethyl-11β,17α-dihydroxy-4-pregnene-3,20-dione 17-acetate, 6α-fluoromethyl-2α-methyl - 11β,17α - dihydroxy-4-pregnene-3,20-dione 17-acetate and 6α-fluoromethyl-11β,17α-dihydroxy-9α-fluoro-4-pregnene-3,20-dione 17-acetate (XXIX).

EXAMPLE 76A

Following the procedures of Examples 73, 74, 75 and 76, but substituting the 11-keto analogues of the 11β,17α-dihydroxy steroids used as starting compounds in these examples, there is thus produced the corresponding 11-keto 17-acylates instead of the 11β-hydroxy 17-acylates prepared in Examples 73, 74, 75 and 76.

EXAMPLE 76B

6α-fluoromethyl-11β,16α,17α,21-tetrahydroxy-4-pregnene-3,20-dione (XII)

The conversion of 6α-fluoromethyl-11β,17α,21-trihydroxy-4-pregnene-3,20-dione (XII) to the corresponding 16α-hydroxy derivative is brought about by subjecting the starting compound to fermentation with the microorganism *Streptomyces roseochromogenus* (ATCC 3347; NRRL B1233) in the manner disclosed in U.S. Patent 2,855,343.

100 ml. of 2% cornsteep liquor of 60% solids was adjusted to pH of 6.8 to 7.4 with sodium hydroxide and was sterilized at 15 pounds pressure for 30 minutes. To this was added a similarly sterile solution of 2 g. of Cerelose (technical grade of dextrose) in 4 ml. of water. This sterile medium was inoculated with a suspension of spores and mycelium of *Streptomyces roseochomogenus* (ATCC 3347; NRRL B1233) and was agitated on a rotatory shaker for a period of 24 hours by which time a good growth of the organism had taken place. To this 24-hour culture, 20 mg. of 6α-fluoromethyl-11β,17α,21-trihydroxy-4-pregnene-3,20-dione (6α-fluoromethylhydrocortisone) dissolved in 0.2 ml. of dimethylformamide was added. Incubation of the steroid with the microorganism was maintained (with agitation) for 5 days, at which time the pH was 8.6. The fermentation broth was then separated into the mycelium and the beer by centrifugation. The mycelium was extracted first with two 25-ml. portions of acetone and then with four successive 25-ml. portions of methyl isopropyl ketone. The beer was extracted with four successive 25-ml. portions of methyl isopropyl ketone. All of the extracts were combined, washed with 2% aqueous sodium bicarbonate solution and with water, dried with anhydrous sodium sulfate, and evaporated to dryness. The residue, which on paper chromatograph analysis showed the presence of 6α-fluoromethyl - 11β,16α,17α,21 - tetrahydroxy-4-pregnene-3,20-dione, was purified by chromatography over synthetic magnesium silicate (Florisil) and crystallization from acetone to give 6α-fluoromethyl-11β,16α,17α,21-tetrahydroxy-4-pregnene-3,20-dione (XII).

Following the procedure of Example 76B above, but substituting other steroid compounds of this invention having a methylene group in the 16-position as starting materials therein, is productive of the corresponding 16α hydroxy compounds. Starting materials that can be employed in this manner include:

6α-fluoromethyl-2α-methyl-11β,17α,21-trihydroxy-4-pregnene-3,20-dione (XII),
6α-fluoromethyl-11β,17α,21-trihydroxy-4-pregnene-3,20-dione 21-acetate (XIV),
6α-fluoromethyl-2α-methyl-11β,17α,21-trihydroxy-4-pregnene-3,20-dione 21-acetate (XIV),
6α-fluoromethyl-11β,17α,21-trihydroxy-1,4-pregnadiene-3,20-dione 21-acetate (XIV),
6-fluoromethyl-11β,17α,21-trihydroxy-4,6-pregnadiene-3,20-dione 21-acetate (XIV),
6-fluoromethyl-11β,17α,21-trihydroxy-1,4,6-pregnatriene-3,20-dione 21-acetate (XIV),
6α-fluoromethyl-2α-methyl-11β,17α,21-trihydroxy-1,4-pregnadiene-3,20-dione 21-acetate (XIV),
6-fluoromethyl-2α-methyl-11β,17α,21-trihydroxy-4,6-pregnadiene-3,20-dione 21-acetate (XIV),
6-fluoromethyl-2-methyl-11β,17α,21-trihydroxy-1,4,6-pregnatriene-3,20-dione 21-acetate (XIV),
6α-fluoromethyl-11β,17α,21-trihydroxy-9α-fluoro-4-pregnene-3,20-dione 21-acetate (XIX),
6α-fluoromethyl-11β,17α,21-trihydroxy-9α-fluoro-1,4-pregnadiene-3,20-dione 21-acetate (XIX),
6-fluoromethyl-11β,17α,21-trihydroxy-9α-fluoro-4-pregnene-3,20-dione 21-acetate (XIX),
6-fluoromethyl-11β,17α,21-trihydroxy-9α-fluoro-1,4,6-pregnatriene-3,20-dione 21-acetate (XIX), 6α-fluoromethyl-2α-methyl-11β,17α,21-trihydroxy-9α-fluoro-4-pregnene-3,20-dione 21-acetate (XIX),
6α-fluoromethyl-2-methyl-11β,17α,21-trihydroxy-9α-fluoro-1,4-pregnadiene-3,20-dione 21-acetate (XIX),
6-fluoromethyl-2α-methyl-11β,17α,21-trihydroxy-9α-fluoro-4,6-pregnadiene-3,20-dione 21-acetate (XIX),
6-fluoromethyl-2-methyl-11β,17α,21-trihydroxy-9α-fluoro-1,4,6-pregnatriene-3,20-dione 21-acetate (XIX),
6α-fluoromethyl-11β,17α-dihydroxy-9α-halo-4-pregnene-3,11,20-trione 21-acetate (XX),
6α-fluoromethyl-11β,17α-dihydroxy-9α-halo-1,4-pregnadiene-3,11,20-trione 21-acetate (XX),
6-fluoromethyl-11β,17α-dihydroxy-9α-halo-4,6-pregnadiene-3,11,20-trione 21-acetate (XX),
6-fluoromethyl-11β,17α-dihydroxy-9α-halo-1,4,6-pregnatriene-3,11,20-trione 21-acetate (XX),
6α-fluoromethyl-2α-methyl-11β,17α-dihydroxy-9α-halo-4-pregnene-3,11,20-trione 21-acetate (XX),
6α-fluoromethyl-2-methyl-11β,17α-dihydroxy-9α-halo-1,4-pregnadiene-3,11,20-trione 21-acetate (XX),
6-fluoromethyl-2α-methyl-11β,17α-dihydroxy-9α-halo-4,6-pregnadiene-3,11,20-trione 21-acetate (XX),
6-fluoromethyl-2-methyl-11β,17α-dihydroxy-9α-halo-1,4,6-pregnatriene-3,11,20-trione 21-acetate (XX),
6-fluoromethyl-11β,17α,21-trihydroxy-9α-fluoro-4-pregnene-3,20-dione (XXI),
6α-fluoromethyl-11β,17α,21-trihydroxy-9α-fluoro-1,4-pregnadiene-3,20-dione (XXI),
6-fluoromethyl-11β,17α,21-trihydroxy-9α-fluoro-4,6-pregnadiene-3,20-dione (XXI),
6-fluoromethyl-11β,17α,21-trihydroxy-9α-fluoro-1,4,6-pregnatriene-3,20-dione (XXI),
6α-fluoromethyl-2α-methyl-11β,17α,21-trihydroxy-9α-fluoro-4-pregnene-3,20-dione (XXI),
6α-fluoromethyl-2-methyl-11β,17α,21-trihydroxy-9α-fluoro-1,4,-pregnadiene-3,20-dione (XXI),
6-fluoromethyl-2α-methyl-11β,17α,21-trihydroxy-9α-fluoro-4,6-pregnadiene-3,20-dione (XXI),
6-fluoromethyl-2-methyl-11β,17α,21-trihydroxy-9α-fluoro-1,4,6-pregnatriene-3,20-dione (XXI),
6α-fluoromethyl-11β,17α,21-trihydroxy-9α-chloro-4-pregnene-3,20-dione (XXI),
6α-fluoromethyl-11β,17α,21-trihydroxy-9α-chloro-1,4-pregnadiene-3,20-dione (XXI),
6-fluoromethyl-11β,17α,21-trihydroxy-9α-chloro-4,6-pregnadiene-3,20-dione (XXI),
6-fluoromethyl-11β,17α,21-trihydroxy-9α-chloro-1,4,6-pregnatriene-3,20-dione (XXI),
6α-fluoromethyl-2α-methyl-11β,17α,21-trihydroxy-9α-chloro-4-pregnene-3,20-dione (XXI),
6α-fluoromethyl-2-methyl-11β,17α,21-trihydroxy-9α-chloro-1,4-pregnadiene-3,20-dione (XXI),
6-fluoromethyl-2α-methyl-11β,17α,21-trihydroxy-9α-chloro-4,6-pregnadiene-3,20-dione (XXI),
6-fluoromethyl-11β,17α,21-trihydroxy-9α-chloro-1,4,6-pregnatriene-3,20-dione (XXI),
6α-fluoromethyl-11β,17α-dihydroxy-21-fluoro-4-pregnene-3,20-dione (XXIII),
6α-fluoromethyl-11β,17α-dihydroxy-21-fluoro-1,4-pregnadiene-3,20-dione (XXIII),
6-fluoromethyl-11β,17α-dihydroxy-21-fluoro-4,6-pregnadiene-3,20-dione (XXIII),
6-fluoromethyl-11β,17α-dihydroxy-21-fluoro-1,4,6-pregnatriene-3,20-dione (XXIII),
6α-fluoromethyl-2α-methyl-11β,17α-dihydroxy-21-fluoro-4-pregnene-3,20-dione (XXIII),
6α-fluoromethyl-2-methyl-11β,17α-dihydroxy-21-fluoro-1,4-pregnadiene-3,20-dione (XXIII),
6-fluoromethyl-2α-methyl-11β,17α-dihydroxy-21-fluoro-4,6-pregnadiene-3,20-dione (XXIII),
6-fluoromethyl-2-methyl-11β,17α-dihydroxy-21-fluoro-1,4,6-pregnatriene-3,20-dione (XXIII),
6α-fluoromethyl-11β,17α-dihydroxy-9α,21-difluoro-4-pregnene-3,20-dione (XXIII),
6α-fluoromethyl-11β,17α-dihydroxy-9α,21-difluoro-1,4-pregnadiene-3,20-dione (XXIII),
6-fluoromethyl-11β,17α-dihydroxy-9α,21-difluoro-4,6-pregnadiene-3,20-dione (XXIII),
6-fluoromethyl-11β,17α-dihydroxy-9α,21-difluoro-1,4,6-pregnatriene-3,20-dione (XXIII),
6α-fluoromethyl-2α-methyl-11β,17α-dihydroxy-9α,21-difluoro-4-pregnene-3,20-dione (XXIII),
6α-fluoromethyl-2-methyl-11β,17α-dihydroxy-9α,21-difluoro-1,4-pregnadiene-3,20-dione (XXIII),
6-fluoromethyl-2α-methyl-11β,17α-dihydroxy-9α,21-difluoro-4,6-pregnadiene-3,20-dione (XXIII),
6-fluoromethyl-2-methyl-11β,17α-dihydroxy-9α,21-difluoro-1,4,6-pregnatriene-3,20-dione (XXIII),
6α-fluoromethyl-11β,17α-dihydroxy-9α-chloro-21-fluoro-4-pregnene-3,20-dione (XXIII),
6α-fluoromethyl-11β,17α-dihydroxy-9α-chloro-21-fluoro-1,4-pregnadiene-3,20-dione (XXIII),
6-fluoromethyl-11β,17α-dihydroxy-9α-chloro-21-fluoro-4,6-pregnadiene-3,20-dione (XXIII),
6-fluoromethyl-11β,17α-dihydroxy-9α-chloro-21-fluoro-1,4,6-pregnatriene-3,20-dione (XXIII),
6α-fluoromethyl-2α-methyl-11β,17α-dihydroxy-9α-chloro-21-fluoro-4-pregnene-3,20-dione (XXIII),
6α-fluoromethyl-2-methyl-11β,17α-dihydroxy-9α-chloro-21-fluoro-1,4-pregnadiene-3,20-dione (XXIII),
6-fluoromethyl-2α-methyl-11β,17α-dihydroxy-9α-chloro-21-fluoro-4,6-pregnadiene-3,20-dione (XXIII),
6-fluoromethyl-2-methyl-11β,17α-dihydroxy-9α-chloro-21-fluoro-1,4,6-pregnatriene-3,20-dione (XXIII),
6α-fluoromethyl-17α-hydroxy-21-fluoro-4-pregnene-3,11,20-trione (XXV),
6α-fluoromethyl-17α-hydroxy-21-fluoro-1,4-pregnadiene-3,11,20-trione (XXV),
6-fluoromethyl-17α-hydroxy-21-fluoro-4,6-pregnadiene-3,11,20-trione (XXV),
6-fluoromethyl-17α-hydroxy-21-fluoro-1,4,6-pregnatriene-3,11,20-trione (XXV),
6α-fluoromethyl-2α-methyl-17α-hydroxy-21-fluoro-4-pregnene-3,11,20-trione (XXV),
6α-fluoromethyl-2-methyl-17α-hydroxy-21-fluoro-1,4-pregnadiene-3,11,20-trione (XXV),
6-fluoromethyl-2α-methyl-17α-hydroxy-21-fluoro-4,6-pregnadiene-3,11,20-trione (XXV),
6-fluoromethyl-2-methyl-17α-hydroxy-21-fluoro-1,4,6-pregnatriene-3,11,20-trione (XXV),
6α-fluoromethyl-17α-hydroxy-9α,21-difluoro-4-pregnene-3,11,20-trione (XXV),
6α-fluoromethyl-17α-hydroxy-9α,21-difluoro-1,4-pregnadiene-3,11,20-trione (XXV),
6-fluoromethyl-17α-hydroxy-9α,21-difluoro-4,6-pregnadiene-3,11,20-trione (XXV),
6-fluoromethyl-17α-hydroxy-9α,21-difluoro-1,4,6-pregnatriene-3,11,20-trione (XXV),
6α-fluoromethyl-17α-hydroxy-9α-chloro-21-fluoro-4-pregnene-3,11,20-trione (XXV),
6α-fluoromethyl-17α-hydroxy-9α-chloro-21-fluoro-1,4-pregnadiene-3,11,20-trione (XXV),
6-fluoromethyl-17α-hydroxy-9α-chloro-21-fluoro-4,6-pregnadiene-3,11,20-trione (XXV),
6-fluoromethyl-17α-hydroxy-9α-chloro-21-fluoro-1,4,6-pregnatriene-3,11,20-trione (XXV),
6α-fluoromethyl-2α-methyl-17α-hydroxy-9α,21-difluoro-4-pregnene-3,11,20-trione (XXV),
6-fluoromethyl-2-methyl-17α-hydroxy-9α,21-difluoro-1,4-pregnadiene-3,11,20-trione (XXV),
6-fluoromethyl-2α-methyl-17α-hydroxy-9α,21-difluoro-4,6-pregnadiene-3,11,20-trione (XXV),
6-fluoromethyl-2-methyl-17α-hydroxy-9α,21-difluoro-1,4,6-pregnatriene-3,11,20-trione (XXV),
6α-fluoromethyl-2α-methyl-17α-hydroxy-9α-chloro-21-fluoro-4-pregnene-3,11,20-trione (XXV),
6α-fluoromethyl-2-methyl-17α-hydroxy-9α-chloro-21-fluoro-1,4-pregnadiene-3,11,20-trione (XXV), 6-fluoromethyl-2α-methyl-17α-hydroxy-9α-chloro-21-fluoro-4,6-pregnadiene-3,11,20-trione (XXV),
6-fluoromethyl-2-methyl-17α-hydroxy-9α-chloro-21-fluoro-1,4,6-pregnatriene-3,11,20-trione (XXV),
6α-fluoromethyl-11β,17α-dihydroxy-4-pregnene-3,20-dione (XXVII),
6α-fluoromethyl-11β,17α-dihydroxy-1,4-pregnadiene-3,20-dione (XXVII),
6-fluoromethyl-11β,17α-dihydroxy-4,6-pregnadiene-3,20-dione (XXVII),
6-fluoromethyl-11β,17α-dihydroxy-1,4,6-pregnatriene-3,20-dione (XXVII),
6α-fluoromethyl-11β,17α-dihydroxy-9α-fluoro-4-pregnene-3,20-dione (XXVII),
6-fluoromethyl-11β,17α-dihydroxy-9α-fluoro-1,4-pregnadiene-3,20-dione (XXVII),
6-fluoromethyl-11β,17α-dihydroxy-9α-fluoro-4,6-pregnadiene-3,20-dione (XXVII),
6-fluoromethyl-11β,17α-dihydroxy-9α-fluoro-1,4,6-pregnatriene-3,20-dione (XXVII),
6α-fluoromethyl-11β,17α-dihydroxy-9α-chloro-4-pregnene-3,20-dione (XXVII),
6α-fluoromethyl-11β,17α-dihydroxy-9α-chloro-1,4-pregnadiene-3,20-dione (XXVII),
6-fluoromethyl-11β,17α-dihydroxy-9α-chloro-4,6-pregnadiene-3,20-dione (XXVII),
6-fluoromethyl-11β,17α-dihydroxy-9α-chloro-1,4,6-pregnatriene-3,20-dione (XXVII),
6α-fluoromethyl-2α-methyl-11β,17α-dihydroxy-4-pregnene-3,20-dione (XXVII),
6α-fluoromethyl-2-methyl-11β,17α-dihydroxy-1,4-pregnadiene-3,20-dione (XXVII),
6-fluoromethyl-2α-methyl-11β,17α-dihydroxy-4,6-pregnadiene-3,20-dione (XXVII),
6-fluoromethyl-2-methyl-11β,17α-dihydroxy-1,4,6-pregnatriene-3,20-dione (XXVII),
6α-fluoromethyl-2α-methyl-11β,17α-dihydroxy-9α-fluoro-4-pregnene-3,20-dione (XXVII),
6α-fluoromethyl-2-methyl-11β,17α-dihydroxy-9α-fluoro-1,4-pregnadiene-3,20-dione (XXVII),
6-fluoromethyl-2α-methyl-11β,17α-dihydroxy-9α-fluoro-4,6-pregnadiene-3,20-dione (XXVII),
6-fluoromethyl-2-methyl-11β,17α-dihydroxy-9α-fluoro-1,4,6-pregnatriene-3,20-dione (XXVII),
6α-fluoromethyl-2α-methyl-11β,17α-dihydroxy-9α-chloro-4-pregnene-3,20-dione (XXVII),
6α-fluoromethyl-2-methyl-11β,17α-dihydroxy-9α-chloro-1,4-pregnadiene-3,20-dione (XXVII),
6-fluoromethyl-2α-methyl-11β,17α-dihydroxy-9α-chloro-4,6-pregnadiene-3,20-dione (XXVII),
6-fluoromethyl-2-methyl-11β,17α-dihydroxy-9α-chloro-1,4,6-pregnatriene-3,20-dione (XXVII),
6α-fluoromethyl-17α-hydroxy-4-pregnene-3,11,20-trione (XXVIII),
6α-fluoromethyl-17α-hydroxy-1,4-pregnadiene-3,11,20-trione (XXVIII),
6-fluoromethyl-17α-hydroxy-4,6-pregnadiene-3,11,20-trione (XXVIII),
6-fluoromethyl-17α-hydroxy-1,4,6-pregnatriene-3,11,20-trione (XXVIII),
6α-fluoromethyl-17α-hydroxy-9α-fluoro-4-pregnene-3,11,20-trione (XXVIII),
6α-fluoromethyl-17α-hydroxy-9α-fluoro-1,4-pregnadiene-3,11,20-trione (XXVIII),
6-fluoromethyl-17α-hydroxy-9α-fluoro-4,6-pregnadiene-3,11,20-trione (XXVIII),
6-fluoromethyl-17α-hydroxy-9α-fluoro-1,4,6-pregnatriene-3,11,20-trione (XXVIII),
6α-fluoromethyl-17α-hydroxy-9α-chloro-4-pregnene-3,11,20-trione (XXVIII),
6α-fluoromethyl-17α-hydroxy-9α-chloro-1,4-pregnadiene-3,11,20-trione (XXVIII),
6-fluoromethyl-17α-hydroxy-9α-chloro-4,6-pregnadiene-3,11,20-trione (XXVIII),
6-fluoromethyl-17α-hydroxy-9α-chloro-1,4,6-pregnatriene-3,11,20-trione (XXVIII),
6α-fluoromethyl-2α-methyl-17α-hydroxy-4-pregnene-3,11,20-trione (XXVIII),
6α-fluoromethyl-2-methyl-17α-hydroxy-1,4-pregnadiene-3,11,20-trione (XXVIII),
6-fluoromethyl-2α-methyl-17α-hydroxy-4,6-pregnadiene-3,11,20-trione (XXVIII),
6-fluoromethyl-2-methyl-17α-hydroxy-1,4,6-pregnatriene-3,11,20-trione (XXVIII),
6α-fluoromethyl-2α-methyl-17α-hydroxy-9α-fluoro-4-pregnene-3,11,20-trione (XXVIII),
6α-fluoromethyl-2-methyl-17α-hydroxy-9α-fluoro-1,4-pregnadiene-3,11,20-trione (XXVIII),
6-fluoromethyl-2α-methyl-17α-hydroxy-9α-fluoro-4,6-pregnadiene-3,11,20-trione (XXVIII),
6-fluoromethyl-2-methyl-17α-hydroxy-9α-fluoro-1,4,6-pregnatriene-3,11,20-trione (XXVIII),
6α-fluoromethyl-2α-methyl-17α-hydroxy-9α-chloro-4-pregnene-3,11,20-trione (XXVIII),
6α-fluoromethyl-2-methyl-17α-hydroxy-9α-chloro-1,4-pregnadiene-3,11,20-trione (XXVIII),
6-fluoromethyl-2α-methyl-17α-hydroxy-9α-chloro-4,6-pregnadiene-3,11,20-trione (XXVIII) and
6-fluoromethyl-2-methyl-17α-hydroxy-9α-chloro-1,4,6-pregnatriene-3,11,20-trione (XXVIII).

EXAMPLE 77

*6α-fluoromethyl-11β,16α,17α,21-tetrahydroxy-4-pregnene-3,20-dione 16α,17α-acetonide (XXX)*

A mixture was prepared containing 1 g. of 6α-fluoromethyl-11β,16α,17α,21 - tetrahydroxy-4-pregnene - 3,20-dione (XII) in 100 ml. of acetone. 0.25 ml. of 72% perchloric acid was added thereto and the resulting mixture stirred for about 5 hours at room temperature. After a period of about 5 hours the reaction mixture was concentrated under reduced pressure at 40° C. to about 25 ml. The reaction mixture was then cooled to about 20° C. and 50 ml. of water added, whereupon a white solid separated. The solid was isolated by filtration on a filter paper and recrystallized from ethyl alcohol to yield 6α-fluoromethyl - 11β,16α,17α,21 - tetrahydroxy-4-pregnene-3,20-dione 16α,17α-acetonide (XXX).

EXAMPLE 78

*6α-fluoromethyl-11β,16α,17α,21-tetrahydroxy-9α-fluoro-4-pregnene-3,20-dione 16α,17-acetonide (XXX)*

Following the procedure of Example 77, but substituting 6α-fluoromethyl - 11β,16α,17α,21 - tetrahydroxy - 9α-fluoro-4-pregnene-3,20-dione (XXI) as starting compound, there is thus produced 6α-fluoromethyl-11β,16α,17α,21-tetrahydroxy-9α-fluoro-4-pregnene-3,20-dione 16α,17α-acetonide (XXX).

EXAMPLE 79

*6α-fluoromethyl-11β,16α,17α,21-tetrahydroxy-9α-fluoro-1,4-pregnadiene-3,20-dione 16α,17α-acetonide (XXX)*

Following the procedure of Example 77, but substituting 6α-fluoromethyl - 11β,16α,17α,21-tetrahydroxy - 9α-fluoro-1,4-pregnadiene-3,20-dione (XXI) as starting compound, there is thus produced 6α-fluoromethyl-11β,16α,17α,21 - tetrahydroxy - 9α-fluoro - 1,4 - pregnadiene - 3,20-dione 16α,17α-acetonide (XXX).

EXAMPLE 80

*6-fluoromethyl-11β,16α,17α,21-tetrahydroxy-4,6-pregnadiene-3,20-dione 16α,17α-acetonide (XXX)*

Following the procedure of Example 77, but substituting 6-fluoromethyl-11β,16α,17α,21-tetrahydroxy-4,6-pregnadiene-3,20-dione (XXI) as starting compound, there is thus produced 6 - fluoromethyl - 11β,16α,17α,21 - tetrahydroxy - 4,6-pregnadiene - 3,20-dione 16α,17α-acetonide (XXX)

EXAMPLE 81

*6α-fluoromethyl-11β,16α,17α,21-tetrahydroxy-1,4,6-pregnatriene-3,20-dione 16α,17α-acetonide* (XXX)

Following the procedure of Example 77, but substituting 6-fluoromethyl - 11β,16α,17α,21-tetrahydroxy - 1,4,6-pregnatriene-3,20-dione (XXI) as starting compound, there is thus produced 6-fluoromethyl-11β,16a,17a,21-tetrahydroxy - 1,4,6-pregnatriene-3,20-dione 16α,17α-acetonide (XXX)

EXAMPLE 82

Following the procedure of Example 77, but substituting as starting compounds, those steroids represented by Formulae XII, XIV, XV, XIX, XX, XXI, XXIII, XXV, XXVI and XXVIII of the flow sheets set forth above (wherein the 16-substituent is α-hydroxy) there are thus produced the corresponding 16α,17α-acetonides thereof.

Representative compounds thus converted to their corresponding 16α,17α-acetonides include:

6α-fluoromethyl-2α-methyl-11β,16α,17α,21-tetrahydroxy-4-pregnene-3,20-dione (XII),
6α-fluoromethyl-11β,16α,17α,21-tetrahydroxy-4-pregnene-3,20-dione 21-acetate (XII),
6α-fluoromethyl-11β,16α,17α,21-tetrahydroxy-1,4-pregnadiene-3,20-dione 21-acetate (XIV),
6-fluoromethyl-11β,16a,17α,21-tetrahydroxy-1,4,6-pregnatriene-3,20-dione 21-acetate (XIV),
6α-fluoromethyl-2α-methyl-16α,17α,21-trihydroxy-4-pregnene-3,11,20-trione 21-acetate (XV)
6α-fluoromethyl-11β,16α,17α,21-tetrahydroxy-9α-fluoro-4-pregnene-3,20-dione 21-acetate (XIX),
6α-fluoromethyl-2-methyl-11β,16α,17α,21-tetrahydroxy-9α-fluoro-1,4-pregnadiene-3,20-dione 21-acetate (XIX),
6α-fluoromethyl-16α,17α,21-trihydroxy-9α-bromo-4-pregnene-3,11,20-trione 21-acetate (XX),
6α-fluoromethyl-16α,17α,21-trihydroxy-9α-chloro-1,4-pregnadiene-3,11,20-trione 21-acetate (XX),
6α-fluoromethyl-11β,16α,17α,21-tetrahydroxy-4-pregnene-3,20-dione (XXI),
6α-fluoromethyl-11β,16α,17α,21-tetrahydroxy-9α-chloro-1,4-pregnadiene-3,20-dione (XXI),
6-fluoromethyl-2-methyl-11β,16α,17α,21-tetrahydroxy-9α-chloro-1,4,6-pregnatriene-3,20-dione (XXI),
6α-fluoromethyl-11β,16α,17α-trihydroxy-21-fluoro-4-pregnene-3,20-dione (XXIII),
6α-fluoromethyl-2-methyl-11β,16α,17α-trihydroxy-9α,21-difluoro-1,4-pregnadiene-3,20-dione (XXIII),
6α-fluoromethyl-16α,17α-dihydroxy-21-fluoro-4-pregnene-3,11,20-trione (XXV),
6α-fluoromethyl-2-methyl-16α,17α-dihydroxy-9α,21-difluoro-1,4-pregnadiene-3,11,20-trione (XXV),
6-fluoromethyl-16α,17α-dihydroxy-9α-chloro-21-fluoro-1,4,6-pregnatriene-3,11,20-trione (XXV),
6α-fluoromethyl-11β,16α,17α-trihydroxy-4-pregnene-3,20-dione (XXVII),
6α-fluoromethyl-11β,16α,17α-trihydroxy-9α-fluoro-1,4-pregnadiene-3,20-dione (XXVII),
6-fluoromethyl-2-methyl-11β,16α,17α-trihydroxy-9α-fluoro-1,4,6-pregnatriene-3,20-dione (XXVII),
6α-fluoromethyl-16α,17α-dihydroxy-4-pregnene-3,11,20-trione (XXVIII),
6α-fluoromethyl-2-methyl-16α,17α-dihydroxy-9α-fluoro-1,4-pregnadiene-3,11-20-trione (XXVIII) and
6-fluoromethyl-16α,17α-dihydroxy-9α-chloro-1,4,6-pregnatriene-3,11,20-trione (XXVIII).

We claim:
1. 6α-fluoromethyl compounds of the formula:

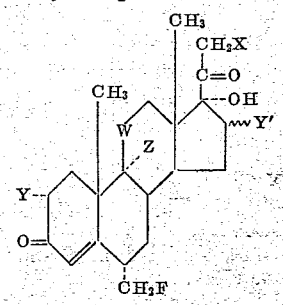

wherein W is selected from the group consisting of the carbonyl radical (>C=O) and the β-hydroxymethylene radical

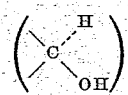

X is selected from the group consisting of hydroxy and OAcyl, the term Acyl representing the acyl radical of a hydrocarboxylic acid containing from 1 to 12 carbon atoms, inclusive; Y is selected from the group consisting of hydrogen and α-methyl, with the proviso that when Y' is selected from the group consisting of α-methyl and β-methyl, Y is hydrogen; Y' is selected from the group consisting of hydrogen, α-methyl, β-methyl, and α-hydroxy, with the proviso that when Y is α-methyl, Y' is selected from the group consisting of hydrogen and α-hydroxy; Z is selected from the group consisting of hydrogen and halogen.

2. 6α-fluoromethyl-11β, 17α, 21-trihydroxy-4-pregnene-3,20-dione.

3. 6α - fluoromethyl - 11β,16α,17α,21 - tetrahydroxy - 4-pregnene-3,20-dione 16α,17α-acetonide represented by the formula:

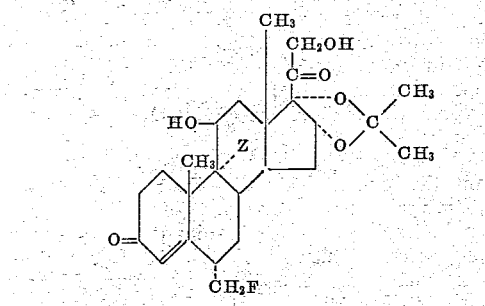

wherein Z is selected from the group consisting of hydrogen and halogen with atomic weight from 19 to 80.

4. 6α-fluoromethyl compounds of the formula:

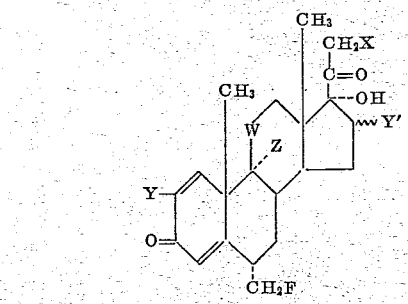

wherein W is selected from the group consisting of the carbonyl radical (>C=O) and the β-hydroxymethylene radical

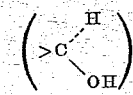

X is selected from the group consisting of hydroxy and OAcyl, the term Acyl representing the acyl radical of a hydrocarbon carboxylic acid containing from 1 to 12 carbon atoms, inclusive; Y is selected from the group consisting of hydrogen and methyl, with the proviso that when Y' is selected from the group consisting of α-methyl and β-methyl, Y is hydrogen; Y' is selected from the group consisting of hydrogen, α-methyl, β-methyl and α-hydroxy, with the proviso that when Y is methyl, Y' is selected from the group consisting of hydrogen and α-hydroxy; Z is selected from the group consisting of hydrogen and halogen with atomic weight from 19 to 80.

5. 6α - fluoromethyl - 11β,17α,21 - trihydroxy - 1,4 - pregnadiene-3,20-dione.

6. 6α - fluoromethyl - 11β,17α,21 - trihydroxy - 1,4 - pregnadiene-3,20-dione 21-acetate.

7. 6α - fluoromethyl - 16α - methyl - 11β,17α,21 - trihydroxy-1,4-pregnadiene-3,20-dione.

8. 6α - fluoromethyl-11β,17α,21-trihydroxy-9α-fluoro-1,4-pregnadiene-3,20-dione.

9. 6α - fluoromethyl - 11β,16α,17α,21 - tetrahydroxy-9α-fluoro-1,4-pregnadiene-3,20-dione 16α,17α-acetonide represented by the formula:

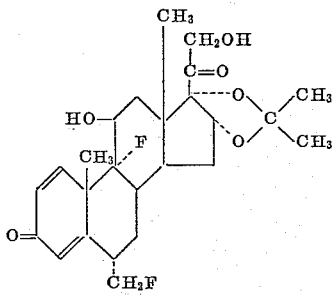

10. 6-fluoromethyl compounds of the formula:

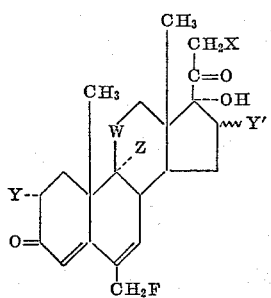

wherein W is selected from the group consisting of the carbonyl radical (>C=O) and the β-hydroxymethylene radical

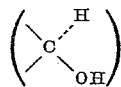

X is selected from the group consisting of hydroxy and OAcyl, the term Acyl representing the acyl radical of a hydrocarbon carboxylic acid containing from 1 to 12 carbon atoms, inclusive; Y is selected from the group consisting of hydrogen and α-methyl, with the proviso that when Y' is selected from the group consisting of α-methyl and β-methyl, Y is hydrogen; Y' is selected from the group consisting of hydrogen, α-methyl, β-methyl, and α-hydroxy, with the proviso that when Y is α-methyl, Y' is selected from the group consisting of hydrogen and α-hydroxy; Z is selected from the group consisting of hydrogen and halogen.

11. 6 - fluoromethyl - 11β,17α,21 - trihydroxy - 9α-fluoro-4,6-pregnadiene-3,20-dione.

12. 6-fluoromethyl compounds of the formula:

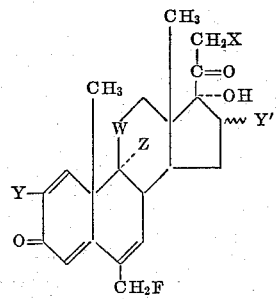

wherein W is selected from the group consisting of the carbonyl radical (>C=O) and the β-hydroxymethylene radical

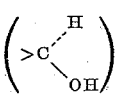

X is selected from the group consisting of hydroxy and OAcyl, the term Acyl representing the acyl radical of a hydrocarbon carboxylic acid containing from 1 to 12 carbon atoms, inclusive; Y is selected from the group consisting of hydrogen and methyl, with the proviso that when Y' is selected from the group consisting of α-methyl and β-methyl, Y is hydrogen; Y' is selected from the group consisting of hydrogen, α-methyl, β-methyl, and α-hydroxy, with the proviso that when Y is methyl, Y' is selected from the group consisting of hydrogen and α-hydroxy; Z is selected from the group consisting of hydrogen and halogen.

13. A process for the production of a compound represented by the formula:

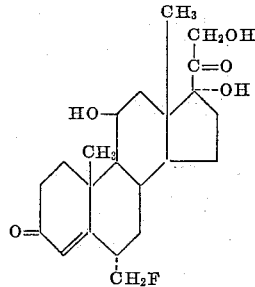

which comprises the steps of (1) reacting a starting compound of the formula:

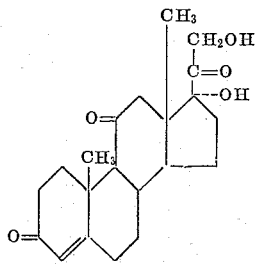

with formaldehyde in the presence of a strong acid to produce the corresponding 17:20, 20:21-bismethylenedioxy-4-pregnene-3,11-dione; (2) treating the thus produced 17:20, 20:21-bismethylenedioxy-4-pregnene-3,11-dione with an alkenyl acylate in the presence of an acid catalyst to give a 17:20, 20:21-bismethylenedioxy-3,5-pregnadien-11-one 3-acylate; (3) reducing the thus produced 17:20, 20:21-bismethylenedioxy-3,5-pregnadien-11-one 3-acylate to give a 17:20, 20:21-bismethylenedioxy-5-pregnene-3β,11β-dihydroxy-3-acylate; (4) hydroxymethylating the thus obtained 17:20, 20:21-bismethylenedioxy-5-pregnene-3β,11β-dihydroxy 3-acylate at the 6-position by reacting said compound with carbon monoxide and hydrogen in the presence of an oxo catalyst under super-atmospheric pressure to produce a 17:20, 20:21 - bismethylenedioxy - 11β - hydroxy - 6α-hydroxymethyl-5α-pregnane 3-acylate; (5) reacting the thus produced 17:20, 20:21-bismethylenedioxy-11β-hydroxy-6α-hydroxymethyl-5α-pregnane 3-acylate with an organic sulfonyl halide to form the corresponding organic sulfonate ester derivative and reacting said sulfonate ester with an alkali metal fluoride to yield 17:20, 20:21 - bismethylenedioxy - 6α - fluoromethyl - 3β,11β-dihydroxy-5α-pregnane; (6) oxidizing the thus produced 17:20, 20:21-bismethylenedioxy-6α-fluoromethyl-3β,11β-dihydroxy-5α-pregnane with an aluminum alkoxide to give the corresponding 17:20, 20:21-bismethylenedioxy-6α-fluoromethyl-11β-hydroxy-5α-pregnan-3-one; (7) dehydrogenating the thus obtained 17:20, 20:21 bismethylenedioxy - 6α - fluoromethyl - 11β - hydroxy - 5α - pregnan-3-one in the 1,2- and 4,5-positions to obtain the corresponding 17:20, 20:21-bismethylenedioxy-6α-fluoromethyl-11β-hydroxy-1,4-pregnadien-3-one; (8) hydrolyzing the thus produced 17:20, 20:21-bismethylenedioxy-6α-fluoromethyl-11β-hydroxy-1,4-pregnadien-3-one to obtain the corresponding 6α-fluoromethyl-11β,17α,21-trihydroxy-1,4-pregnadiene-3,20-dione and (9) selectively hydrogenating at the 1,2-position the thus produced 6α-fluoromethyl-11β,17α,21-trihydroxy-1,4-pregnadiene-3,20-dione to produce the corresponding 6α - fluoromethyl-11β,17α,21-trihydroxy-4-pregnene-3,20-dione.

14. Process for the production of a compound represented by the formula:

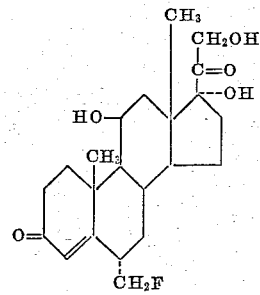

which comprises the steps of (1) reacting a starting compound of the formula:

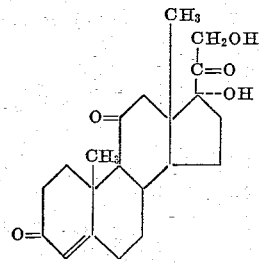

with formaldehyde in the presence of a strong acid to produce the corresponding 17:20, 20:21-bismethylenedioxy-4-pregnene-3,11-dione; (2) treating the thus produced 17:20, 20:21-bismethylenedioxy-4-pregnene-3,11-dione with an alkenyl acylate in the presence of an acid catalyst to give a 17:20, 20:21-bismethylenedioxy-3,5-pregnadien-11-one 3-acylate; (3) reducing the thus produced 17:20, 20:21-bismethylenedioxy-3,5-pregnadien-11-one 3-acylate to give a 17:20, 20:21-bismethylenedioxy-5-pregnene-3β,11β-dihydroxy 3-acylate; (4) hydroxymethylating the thus obtained 17:20, 20:21-bismethylenedioxy-5-pregnene-3β,11β-dihydroxy 3-acylate at the 6-position by reacting said compound with carbon monoxide and hydrogen in the presence of an oxo catalyst under super-atmospheric pressure to produce a 17:20, 20:21-bismethylenedioxy-11β-hydroxy-6α-hydroxymethyl-5α-pregnane 3-acylate; (5) reacting the thus produced 17:20, 20:21-bismethylenedioxy-11β-hydroxy-6α-hydroxymethyl-5α-pregnane 3-acylate with an organic sulfonyl halide to form the corresponding 6-organic sulfonate ester derivative and reacting said sulfonate ester with an alkali metal fluoride to yield 17:20, 20:21-bismethylenedioxy-6α-fluoromethyl-3β,11β-dihydroxy-5α-pregnane; (6) oxidizing the thus produced 17:20, 20:21-bismethylenedioxy - 6α - fluoromethyl - 3β,11β - dihydroxy - 5α - pregnane with an aluminum alkoxide to give the corresponding 17:20, 20:21-bismethylenedioxy-6α-fluoromethyl-11β-hydroxy-5α-pregnan-3-one; (7) halogenating the thus produced 17:20, 20:21-bismethylenedioxy-6α-fluoromethyl-11β-hydroxy-5α-pregnan-3-one in an acidic medium with a member of the group consisting of chlorine and bromine and dehydrohalogenating the thus obtained product with sodium iodide to produce 17:20, 20:21-bismethylenedioxy - 6α - fluoromethyl - 11β - hydroxy - 4 - pregnen-3-one and (8) hydrolyzing the thus obtained 17:20, 20:21-bismethylenedioxy - 6α - fluoromethyl - 11β - hydroxy - 4-pregnen-3-one to produce 6α-fluoromethyl-11β,17α,21-trihydroxy-4-pregnene-3,20-dione.

15. 17:20, 20:21-bismethylenedioxy-5-pregnene-3β,11β-diol 3-acetate of the formula:

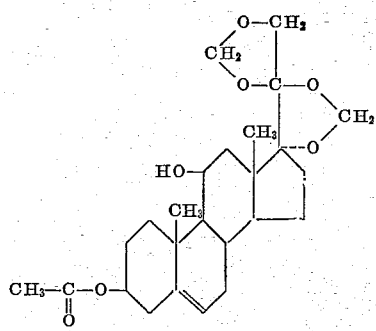

16. 17:20, 20:21-bismethylenedioxy-6α-hydroxymethyl-5α-pregnane-3β,11β-diol 3-acetate of the formula:

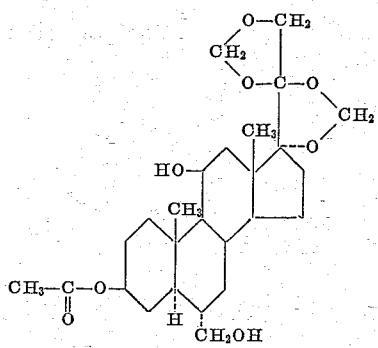

17. 6α - fluoromethyl - 11β,17α,21 - trihydroxy - 9α-fluoro-1,4-pregnadiene-3,20-dione 21-acetate.

18. A compound selected from the group consisting of those having the formula:

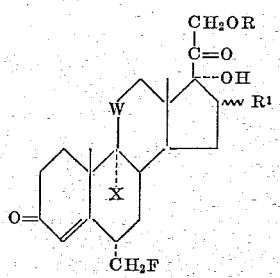

wherein R is selected from the group consisting of hydrogen and a hydrocarbon carboxylic acyl group of less than 12 carbon atoms; $R^1$ is selected from the group consisting of hydrogen and methyl, X is selected from the group consisting of hydrogen and fluorine; and W is selected from the group consisting of the carbonyl radical and the beta-hydroxymethylene radical, and the 1-dehydro, 6-dehydro and 1,6-bisdehydro derivatives thereof.

19. A compound selected from the group consisting of those having the formula:

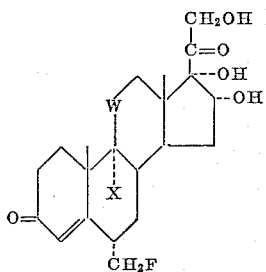

wherein X is selected from the group consisting of hydrogen and fluorine, W is selected from the group consisting of the carbonyl radical and the beta-hydroxymethylene radical; and the 1-dehydro, 6-dehydro and 1,6-bisdehydro derivatives thereof.

References Cited by the Examiner

UNITED STATES PATENTS 2,888,457  5/59  Beyler et al. _____ 260—239.55

OTHER REFERENCES

Beal et al., 81 J.A.C.S., 1231–34 (1959).
Nussbaum et al., 81 J.A.C.S., 1228–31 (1959).

LEWIS GOTTS, *Primary Examiner.*

L. H. GASTON, MORRIS LIEBMAN, *Examiners.*